United States Patent
Zhang et al.

(10) Patent No.: US 10,676,575 B2
(45) Date of Patent: Jun. 9, 2020

(54) TRI-BLOCK PREPOLYMERS AND THEIR USE IN SILICONE HYDROGELS

(71) Applicant: Johnson & Johnson Vision Care, Inc., Jacksonville, FL (US)

(72) Inventors: Yong Zhang, Jacksonville, FL (US); Scott L. Joslin, Ponte Vedra Beach, FL (US); Shivkumar Mahadevan, Jacksonville, FL (US); James D. Ford, Fleming Island, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 15/691,829

(22) Filed: Aug. 31, 2017

(65) Prior Publication Data

US 2018/0100039 A1    Apr. 12, 2018

Related U.S. Application Data

(60) Provisional application No. 62/404,817, filed on Oct. 6, 2016.

(51) Int. Cl.
*C08J 3/075* (2006.01)
*C08G 81/02* (2006.01)
*G02B 1/04* (2006.01)

(52) U.S. Cl.
CPC ............ *C08J 3/075* (2013.01); *C08G 81/024* (2013.01); *G02B 1/043* (2013.01); *C08G 2210/00* (2013.01); *C08J 2383/10* (2013.01)

(58) Field of Classification Search
None
See application file for complete search history.

(56) References Cited

U.S. PATENT DOCUMENTS

| 3,408,429 A | 10/1968 | Wichterle |
| 3,660,545 A | 5/1972 | Wichterle |

(Continued)

FOREIGN PATENT DOCUMENTS

| EP | 0080539 B1 | 6/1983 |
| EP | 0344692 A2 | 12/1989 |

(Continued)

OTHER PUBLICATIONS

Bas et al, Synthesis, Characterization and properties of amphiphilic block copolymers of 2-hydroxyethyl methacrylate and polydimethylsiloxane prepared by atom transfer radical polymerization, Polymer Journal, 2012, vol. 44, pp. 1087-1097.

(Continued)

*Primary Examiner* — Peter A Salamon
(74) *Attorney, Agent, or Firm* — Raef M. Shaltout

(57) ABSTRACT

Described is a tri-block prepolymer having a chemical structure of [A]-[B]-[C], comprising at least one monovalent reactive group, wherein segment [A] and [C] independently comprise polymeric segments based on a first hydrophilic monomer comprising functionality selected from the group consisting of hydroxyalkyl, alkylamine, and mixtures thereof and optionally a second hydrophilic monomer, and [B] comprises a polymeric segment of at least one silicone-containing macromer and optionally a third hydrophilic monomer comprising functionality selected from the group consisting of hydroxyalkyl, alkylamine, and mixtures thereof and optionally a silicone-containing monomer. These prepolymers may be used alone or in combination with other components in reactive monomer mixtures for making silicone hydrogels and ophthalmic devices made therefrom, including contact lenses.

86 Claims, 1 Drawing Sheet

Exemplary Synthesis of Tri-block Prepolymers by TERP and Subsequent Acylation with Methacryloyl Chloride

(56) References Cited

U.S. PATENT DOCUMENTS

| | | | |
|---|---|---|---|
| 3,808,178 A | 4/1974 | Gaylord | |
| 4,113,224 A | 9/1978 | Clark et al. | |
| 4,120,570 A | 10/1978 | Gaylord | |
| 4,136,250 A | 1/1979 | Mueller et al. | |
| 4,153,641 A | 5/1979 | Deichert et al. | |
| 4,197,266 A | 4/1980 | Clark et al. | |
| 4,414,372 A | 11/1983 | Farnham et al. | |
| 4,417,034 A | 11/1983 | Webster | |
| 4,436,887 A | 3/1984 | Chromecek et al. | |
| 4,495,313 A | 1/1985 | Larsen | |
| 4,508,880 A | 4/1985 | Webster | |
| 4,524,196 A | 6/1985 | Farnham et al. | |
| 4,581,428 A | 4/1986 | Farnham et al. | |
| 4,659,782 A | 4/1987 | Spinelli | |
| 4,659,783 A | 4/1987 | Spinelli | |
| 4,740,533 A | 4/1988 | Su et al. | |
| 4,771,116 A | 9/1988 | Citron | |
| 4,889,664 A | 12/1989 | Kindt-Larsen et al. | |
| 4,910,277 A | 3/1990 | Bambury et al. | |
| 4,981,903 A * | 1/1991 | Garbe | A61K 8/895 524/544 |
| 5,006,622 A | 4/1991 | Kunzler et al. | |
| 5,034,461 A | 7/1991 | Lai et al. | |
| 5,039,459 A | 8/1991 | Kindt-Larsen et al. | |
| 5,057,578 A | 10/1991 | Spinelli | |
| 5,070,215 A | 12/1991 | Bambury et al. | |
| 5,164,452 A * | 11/1992 | Tone | C08F 287/00 525/288 |
| 5,236,969 A | 8/1993 | Kunzler et al. | |
| 5,244,981 A | 9/1993 | Seidner et al. | |
| 5,270,418 A | 12/1993 | Kunzler et al. | |
| 5,298,533 A | 3/1994 | Nandu et al. | |
| 5,314,960 A * | 5/1994 | Spinelli | C08F 287/00 525/280 |
| 5,321,108 A | 6/1994 | Kunzler et al. | |
| 5,331,067 A | 7/1994 | Seidner et al. | |
| 5,371,147 A | 12/1994 | Spinelli et al. | |
| 5,387,662 A | 2/1995 | Kunzler et al. | |
| 5,539,016 A | 7/1996 | Kunzler et al. | |
| 5,760,100 A | 6/1998 | Nicolson et al. | |
| 5,776,999 A | 7/1998 | Nicolson et al. | |
| 5,789,461 A | 8/1998 | Nicolson et al. | |
| 5,824,719 A | 10/1998 | Kunzler et al. | |
| 5,849,811 A | 12/1998 | Nicolson et al. | |
| 5,944,853 A | 8/1999 | Molock et al. | |
| 5,962,548 A * | 10/1999 | Vanderlaan | C08L 83/08 523/107 |
| 5,965,631 A | 10/1999 | Nicolson et al. | |
| 5,998,498 A | 12/1999 | Vanderlaan et al. | |
| 6,020,445 A | 2/2000 | Vanderlaan et al. | |
| 6,087,415 A | 7/2000 | Vanderlaan et al. | |
| 6,367,929 B1 * | 4/2002 | Maiden | C08F 230/08 351/159.33 |
| 6,414,049 B1 * | 7/2002 | Alli | C08F 2/46 522/172 |
| 6,420,453 B1 | 7/2002 | Bowers et al. | |
| 6,423,761 B1 | 7/2002 | Bowers et al. | |
| 6,551,531 B1 * | 4/2003 | Ford | B29D 11/00125 249/117 |
| 6,767,979 B1 | 7/2004 | Muir et al. | |
| 6,822,016 B2 | 11/2004 | McCabe et al. | |
| 6,867,245 B2 | 3/2005 | Iwata et al. | |
| 6,943,203 B2 | 9/2005 | Vanderlaan et al. | |
| 6,951,894 B1 | 10/2005 | Nicolson et al. | |
| 7,052,131 B2 | 5/2006 | McCabe et al. | |
| 7,247,692 B2 | 7/2007 | Laredo | |
| 7,249,848 B2 | 7/2007 | Laredo et al. | |
| 7,276,569 B2 | 10/2007 | Yamago et al. | |
| 7,291,690 B2 | 11/2007 | Yamago et al. | |
| 7,396,890 B2 | 7/2008 | Zanini et al. | |
| 7,461,937 B2 | 12/2008 | STeffen et al. | |
| 7,468,398 B2 | 12/2008 | Nicolson et al. | |
| 7,473,735 B2 | 1/2009 | Uchiumi et al. | |
| 7,538,146 B2 | 5/2009 | Nicolson et al. | |
| 7,553,880 B2 | 6/2009 | Nicolson et al. | |
| 7,572,841 B2 | 8/2009 | Chen et al. | |
| 7,615,601 B2 | 11/2009 | Yamago et al. | |
| 7,662,899 B2 | 2/2010 | Yamago et al. | |
| 7,666,921 B2 | 2/2010 | McCabe et al. | |
| 7,691,916 B2 | 4/2010 | McCabe et al. | |
| 7,786,185 B2 | 8/2010 | Rathore et al. | |
| 7,825,170 B2 | 11/2010 | Steffen et al. | |
| 7,879,444 B2 | 2/2011 | Jiang et al. | |
| 7,915,323 B2 | 3/2011 | Awasthi et al. | |
| 7,934,830 B2 | 5/2011 | Blackwell et al. | |
| 7,956,131 B2 | 6/2011 | Arnold et al. | |
| 7,994,356 B2 | 8/2011 | Awasthi et al. | |
| 8,022,158 B2 | 9/2011 | Rathore et al. | |
| 8,138,290 B2 | 3/2012 | Blackwell et al. | |
| 8,163,206 B2 | 4/2012 | Chang et al. | |
| 8,273,802 B2 | 9/2012 | Laredo et al. | |
| 8,389,597 B2 | 3/2013 | Blackwell et al. | |
| 8,399,538 B2 | 3/2013 | Steffen et al. | |
| 8,415,404 B2 | 4/2013 | Nicolson et al. | |
| 8,415,405 B2 | 4/2013 | Maggio et al. | |
| 8,420,711 B2 | 4/2013 | Awasthi et al. | |
| 8,450,387 B2 | 5/2013 | McCabe et al. | |
| 8,470,906 B2 | 6/2013 | Rathore et al. | |
| 8,487,058 B2 | 7/2013 | Liu et al. | |
| 8,507,577 B2 | 8/2013 | Zanini et al. | |
| 8,524,800 B2 | 9/2013 | Phelan | |
| 8,545,983 B2 | 10/2013 | Jiang et al. | |
| 8,568,626 B2 | 10/2013 | Nicolson et al. | |
| 8,637,621 B2 | 1/2014 | Iwata et al. | |
| 8,662,663 B2 | 3/2014 | Matsushita et al. | |
| 8,686,099 B2 | 4/2014 | Guyer et al. | |
| 8,703,891 B2 | 4/2014 | Broad | |
| 8,772,367 B2 | 7/2014 | Saxena et al. | |
| 8,772,422 B2 | 7/2014 | Saxena et al. | |
| 8,835,583 B2 | 9/2014 | Saxena et al. | |
| 8,835,671 B2 | 9/2014 | Jiang et al. | |
| 8,870,372 B2 | 10/2014 | Li et al. | |
| 8,937,110 B2 | 1/2015 | Alli et al. | |
| 8,937,111 B2 | 1/2015 | Aiii et al. | |
| 8,940,812 B2 | 1/2015 | Reboul et al. | |
| 8,974,775 B2 | 3/2015 | Saxena et al. | |
| 8,980,972 B2 | 3/2015 | Driver | |
| 9,056,878 B2 | 6/2015 | Fujisawa et al. | |
| 9,057,821 B2 | 6/2015 | Broad et al. | |
| 9,125,808 B2 | 9/2015 | Alli et al. | |
| 9,140,825 B2 | 9/2015 | Alli et al. | |
| 9,156,934 B2 | 10/2015 | Alli et al. | |
| 9,170,349 B2 | 10/2015 | Mahadevan et al. | |
| 9,200,119 B2 | 12/2015 | Phukan et al. | |
| 9,217,813 B2 | 12/2015 | Liu et al. | |
| 9,244,196 B2 | 1/2016 | Scales et al. | |
| 9,244,197 B2 | 1/2016 | Alli et al. | |
| 9,255,199 B2 | 2/2016 | Guyer et al. | |
| 9,260,544 B2 | 2/2016 | Rathore et al. | |
| 9,296,764 B2 | 3/2016 | Bhat et al. | |
| 9,297,928 B2 | 3/2016 | Molock et al. | |
| 9,297,929 B2 | 3/2016 | Scales et al. | |
| 2001/0049400 A1 * | 12/2001 | Alli | C08F 30/08 522/4 |
| 2002/0016383 A1 | 2/2002 | Iwata et al. | |
| 2002/0099112 A1 * | 7/2002 | Turner | B29C 33/42 523/107 |
| 2002/0107324 A1 * | 8/2002 | Vanderlaan | C08F 230/08 525/100 |
| 2002/0133889 A1 | 9/2002 | Molock et al. | |
| 2003/0052424 A1 * | 3/2003 | Turner | B29C 37/0032 264/1.32 |
| 2004/0209973 A1 * | 10/2004 | Steffen | C08F 230/08 523/107 |
| 2006/0007391 A1 * | 1/2006 | McCabe | A61L 27/18 351/159.33 |
| 2008/0102122 A1 * | 5/2008 | Mahadevan | A01N 59/16 424/484 |
| 2010/0048847 A1 | 2/2010 | Broad | |
| 2010/0099829 A1 * | 4/2010 | Parakka | A61L 15/26 525/421 |

(56) References Cited

U.S. PATENT DOCUMENTS

| | | | |
|---|---|---|---|
| 2012/0083573 A1* | 4/2012 | Parakka | A61L 15/26 525/103 |
| 2013/0155370 A1 | 6/2013 | Zhang | |
| 2013/0168617 A1 | 7/2013 | Alli et al. | |
| 2013/0172440 A1 | 7/2013 | Alli et al. | |
| 2013/0217620 A1 | 8/2013 | Alli et al. | |
| 2014/0024791 A1 | 1/2014 | Alli et al. | |
| 2014/0031447 A1 | 1/2014 | Aiii et al. | |
| 2015/0094395 A1 | 4/2015 | Alli et al. | |
| 2018/0100039 A1 | 4/2018 | Zhang et al. | |

FOREIGN PATENT DOCUMENTS

| | | |
|---|---|---|
| EP | 1735643 B1 | 12/2006 |
| EP | 1541592 B1 | 5/2007 |
| EP | 1541550 B1 | 10/2008 |
| EP | 1595894 B1 | 10/2011 |
| EP | 1619211 B1 | 10/2012 |
| WO | 9631792 A1 | 10/1996 |
| WO | 2003022321 A2 | 3/2003 |
| WO | 2008061992 A2 | 5/2008 |
| WO | 2008112874 A1 | 9/2008 |
| WO | 2013177523 A2 | 11/2013 |
| WO | 2014123959 A1 | 8/2014 |

OTHER PUBLICATIONS

Compendium of Polymer Terminology and Nomenclature: IUPAC Recommendations 2008, edited by: Richard G. Jones, Jaroslav Kahovec, Robert Stepto, Edward S. Wilks, Michael Hess, Tatsuki Kitayama, and W. Val Metanornski.

Crivello, et al, Photoinitiators for Free Radical Cationic & Anionic Photopolymerisation, 2nd Edition, vol. III, pp. 275-298, John Wiley and Sons, New York, 1998.

Goto et al, Mechanism-Based Invention of High-Speed Living Radical Polymerization Using Organotellurium Compounds and Azo-Initiators, Journal of the American Chemical Society, (2003), vol. 125, pp. 8720-8721.

Hawker et al, New polymer synthesis by nitroxide mediated living radical polymerizations, Chem. Rev. 2001, vol. 101, No. 12, pp. 3661-3688.

Hou et al., Synthesis and Surface Analysis of Siloxane-Containing Amphiphilic Graft Copolymers, Poly(2-hydroxyethyl methacrylate-g-dimethylsiloxane) and Poly(2,3-dihydroxypropyl methacrylate-g-dimethylsiloxane), Macromolecules (2002), vol. 35, pp. 5953-5962.

ISO 18369-4:2006: Ophthalmic optics—Contact lenses—Part 4: Physicochemical properties of contact lens materials.

ISO 9913-1: 1996: Optics and optical instruments—Contact Lenses—Part 1: Determination of oxygen permeability and transmissibility by the FATT method.

Kamigaito et al, Metal-catalyzed living radical polymerization, Chem, Rev, 2001, vol. 101, No. 12, pp. 3689-3745.

Matyjaszewski et al, Atom transfer radical polymerization, Chem. Rev. 2001, vol. 101, No. 9, pp. 2921-2990.

Mi et al., pH responsive properties of non-fouling mixed-charge polymer brushes based on quaternary amine and carboxylic acid monomers, Biomaterials (2010), vol. 31, pp. 2919-2925.

Moad et al, Toward living radical polymerization, Accounts of Chemical Research, vol. 41, No. 9, Sep. 2008, pp. 1133-1142.

Nakamura et al., Organotellurium-mediated living radical polymerization under photoirradiation by a low-intensity light-emitting diode, Beilstein Journal of Organic Chemistry, (2013), vol. 9, pp. 1607-1612.

Nakamura et al., Photoinduced Switching from Living Radical Polymerization to a Radical Coupling Reaction Mediated by Organotellurium Compounds, Journal of the American Chemical Society, (2012), vol. 134, pp. 5536-5539.

Ouchi et al, Transition metal-catalyzed living radical polymerization: toward perfection in catalysis and precision polymer synthesis, Chem. Rev. 2009, vol. 109, No. 11, pp. 4963-5050.

Pouget et al, Well-architectured poly(dimethylsiloxane)-containing copolymers obtained by radical chemistry, Chemical Reviews, 2010, vol. 110, No. 3, pp. 1233-1277.

Shinoda et al, Structural Control of Poly(methyl methacrylate)-g-poly(dimethylsiloxane) Copolymers Using Controlled Radical Polymerization: Effect of the Molecular Structure on Morphology and Mechanical Properties, Macromolecules 2003, vol. 36, No. 13, pp. 4772-4778.

Sogah et al, Group Transfer Polymerization. Polymerization of Acrylic Monomers, Macromolecules, Jul. 1987, 1473-1488, 20(7).

Webster et al, Group-Transfer Polymerization. 1. A New Concept for Addition Polymerization with Organosilicon Initiators, Journal of the American Chemical Society, Aug. 24, 1983, 5706-5708, 105(17).

Webster, Group Transfer Polymerization: Mechanism and Comparison with Other Methods for Controlled Polymerization of Acrylic Monomers, Advanced Polymer Science, (2004) 167:1-34.

Yamago et al., Synthesis of structurally well-controlled x-vinylidene functionalized poly (alkyl methacrylate)s and polymethacrylonitrile by organotellurium, organostibine, and organobismuthine-mediated living radical polymerizations, Reactive & Functional Polymers (2009), vol. 69, pp. 416-423.

Yamago et al., Tailored Synthesis of Structurally Defined Polymers by Organotellurium-Mediated Living Radical Polymerization (TERP): Synthesis of Poly(meth)acrylate Derivatives and Their Di- and Tribiock Copolymers, Journal of the American Chemical Society, (2002), vol. 124, pp. 13666-13667.

Yamago, Development of Organotellurium-Mediated and Organostibine-Mediated Living Radical Polymerization Reactions, Journal of Polymer Science: Part A: Polymer Chemistry, vol. 44, pp. 1-12 (2006).

Yamago, Precision polymer synthesis by degenerative transfer controlled/living radical polymerization using organotellurium, organostibine, and organobismuthine chain-transfer agents, Chemical Reviews, 2009, vol. 109, No. 11, pp. 5051-50068.

PCT International Search Report, dated Nov. 30, 2017, for PCT Int'l Appln. No. PCT/US2017/051456.

PCT International Search Report, dated Jul. 8, 2019, for PCT Int'l Appln. No. PCT/IB2019/052187.

* cited by examiner

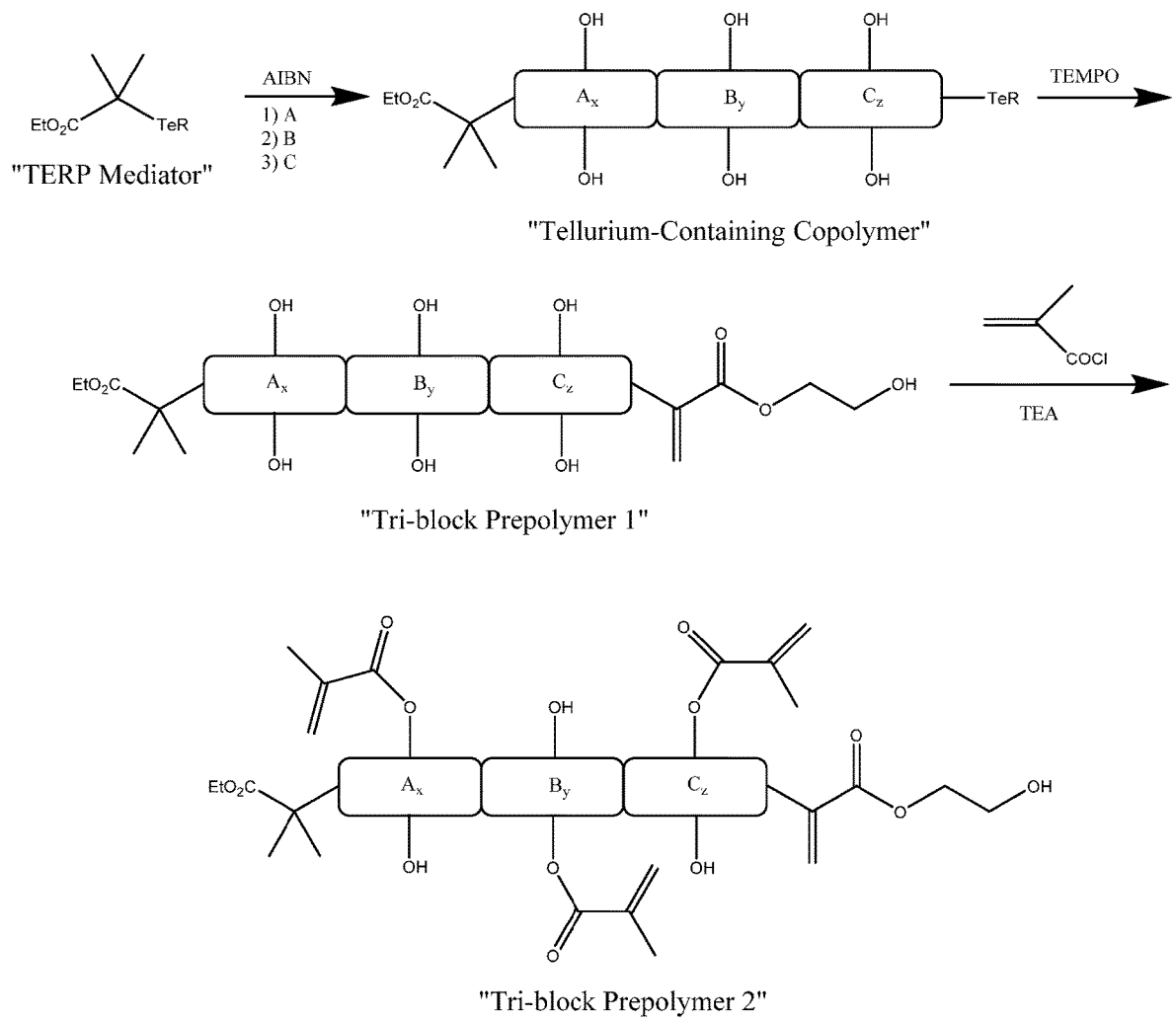
Exemplary Synthesis of Tri-block Prepolymers by TERP and Subsequent Acylation with Methacryloyl Chloride

TRI-BLOCK PREPOLYMERS AND THEIR USE IN SILICONE HYDROGELS

RELATED APPLICATIONS

This application claims priority to U.S. Provisional Patent Application No. 62/404,817, filed Oct. 6, 2016, which is incorporated herein by reference in its entirety.

TECHNICAL FIELD

The present invention relates to silicone hydrogels, prepared from reactive monomer mixtures comprising a tri-block prepolymer, and ophthalmic devices made therefrom, which display excellent combinations of physical, mechanical and biological properties, including enhanced permeability of tear film components.

BACKGROUND

Soft contact lenses are based upon hydrogels. Many users find soft contact lenses comfortable enough to wear all day. There are two main classes of soft contact lens materials, conventional soft contact lenses which are formed from hydrogels containing no silicone, and silicone hydrogels.

Silicone hydrogels are water-swollen polymer networks that have high oxygen permeability. These lenses provide a good level of comfort to many lens wearers, but there are some users who experience discomfort and excessive ocular deposits leading to reduced visual acuity when using these lenses, in particular during extended periods of wear such as for several days in a row, for example, up to about 30 days. Such discomfort and deposits have been attributed to the hydrophobic character of the surfaces of lenses, and the interaction of those surfaces with the protein, lipids and mucin and the hydrophilic surface of the eye.

Silicone hydrogels have typically been prepared by polymerizing mixtures containing at least one silicone-containing monomer or macromer and at least one hydrophilic monomer. This class of lens material is desirable because it reduces the corneal edema and hyper-vasculature associated with conventional hydrogel lenses. Such materials, however, can be difficult to produce because the silicone components and the hydrophilic components are incompatible.

Silicone hydrogels are synthesized from reactive monomer mixtures composed of hydrophilic monomers, silicone monomers, initiators, crosslinking agents, diluents, and other ingredients for specific effects or properties, such as dyes, ultraviolet blockers, and wetting agents. These complex mixtures must be homogeneous and chemically stable. In some cases, the order of addition and mixing conditions are of paramount importance. Macromers or macromonomers have been employed to make graft copolymer segments within the silicone hydrogel to impart or enhance certain physical and mechanical properties. In addition, high molecular weight crosslinking agents or multi-functional prepolymers have also been used for the same reasons.

However, as the number of components increases, the chances of forming homogeneous and stable reactive monomer mixtures decrease which in turn make the formation of contact lenses unpredictable or unreproducible. Even if the reactive monomer mixture is reasonably homogeneous and stable, upon polymerization, the resulting silicone hydrogel may not exhibit the properties, such as transparency and low modulus, for use as a soft contact lens. As a result, there is a need in the art for developing reactive components that compatibilize the other components in the reactive monomer mixture as well as to create durable interphases between the various domains in the resulting silicone hydrogel, thereby resulting in unique physical, mechanical, and biological properties.

Group transfer polymerization (GTP) is a living anionic polymerization process for (meth)acrylate monomers, using trimethylsilyl ketene acetals as initiators and nucleophilic anions as catalysts (see U.S. Pat. Nos. 4,414,372; 4,417,034; 4,508,880; 4,524,196; and 4,581,428). GTP has shown the capability of making a wide range of polymers and block copolymers with good control over molecular weight and its distribution. However, GTP does not work with monomers with active hydrogen atoms such as 2-hydroxyethyl methacrylate or methacrylic acid, and preparing high molecular weight polymers is sometimes problematic because of back-biting reactions or other chain termination events (see J. American Chem. Society 1983, 105, 5706-5707; Macromolecules 1987, 20, 1473-1488; and Adv. Poly Sci. 2004, 167, 1-34).

GTP has been used to prepare linear, branched, block, and star macromers or prepolymers. Prepolymers were synthesized by using 2-trimethylsiloxyethyl methacrylate in the GTP polymerization, followed by deprotection with aqueous acidic methanol and acylation of the pendent hydroxyl groups with an acylating agent such as isopropenyl α,α-dimethylbenzyl isocyanate (TMI). These prepolymers have been incorporated as compatibilizing components in reactive monomer mixtures from which contact lenses are manufactured (see U.S. Pat. Nos. 4,659,782, 4,659,783, 4,771, 116, 5,244,981, 5,314,960, 5,331,067, and 5,371,147). U.S. Pat. No. 6,367,929 discloses a tri-block prepolymer and its use in the fabrication of contact lenses. This tri-block prepolymer was prepared by the sequential addition of reactive monomer mixtures, resulting in a tri-block polymer with end blocks consisting of random copolymers of 2-hydroxyethyl methacrylate (HEMA) and methyl methacrylate (MMA) and a middle block consisting of a random terpolymer of HEMA, mono-n-butyl terminated monomethacryloxypropyl terminated polydimethylsiloxane (mPDMS), and 3-methacryloxypropyl tris(trimethylsiloxy)silane (TRIS), followed by a acylation step using isopropenyl α,α-dimethylbenzyl isocyanate (TMI). Contact lenses were made from reactive monomer mixtures comprising this tri-block prepolymer, dimethyl acrylamide (DMA), polyvinylpyrrolidone (PVP), TRIS, and mPDMS. Evaluations of contact lenses made from such reactive monomer mixtures were inconsistent, perhaps because the reaction conditions for deprotecting the 2-trimethylsiloxyethyl methacrylate repeating units in the tri-block copolymer may have also hydrolyzed some of the TRIS repeating units, and the degree of such hydrolysis may have varied from batch to batch. As a result, GTP has shown to lack reproducible methods of making certain tri-block copolymers, especially those from silyl-protected monomers and other silicone-containing monomers.

Alternatively, there are several living radical polymerization (LRP) or controlled radical polymerization (CRP) techniques that may avoid or minimize some of the side reactions associated with the GTP of (meth)acrylates and thereby enable the reproducible synthesis of tri-block prepolymers. These methods include nitroxide mediated LRPs (see Chem. Rev. 2001, 101, 3661-3688); metal catalyzed LRPs (see Chem. Rev. 2001, 101, 3689-3745 and Chem. Rev. 2009, 109, 4963-5050); atom transfer radical polymerizations (ATRP) (see Chem. Rev. 2001, 101, 2921-2990); reversible addition fragmentation chain transfer (RAFT) polymerizations (see Acc. Chem. Res. 2008, 9, 1133-1142); and organotellurium mediated living free radical polymerizations (TERP) (see Chem. Rev. 2009, 109, 5051-5068) (see U.S. Pat. Nos. 7,276,569; 7,291,690; 7,615,601; and 7,662,899).

TERPs are versatile and relatively insensitive to the types of monomer used and functional groups present. In particular, monomers with active hydrogen atoms may be used in contrast to GTP. Typically, the monomers of interest along with an organotellurium chain transfer agent are mixed with or without a thermal free radical initiator or a photoinitiator under common polymerization conditions to produce a polymer with good molecular weight control (see JACS 2002, 124, 13666-13667 and JACS 2003, 125, 8720-8721). Block copolymers are made by sequential addition of monomer mixtures or by photo-induced radical coupling reactions (see J. Poly. Sci. Pt. A Polym. Chem. 2006, 44, 1-12 and JACS 2012, 134, 5536-5539). Polymers made by TERP have an organotellurium end group that may be reduced, for example, by using 2,2,6,6-tetramethylpiperine 1-oxyl (TEMPO), to create a vinylidene end group, which is also polymerizable, thereby transforming the polymer into a macromer or macromonomer (see Reactive & Functional Polymers 2009, 69, 416-423).

Polydimethylsiloxane (PDMS) copolymers have been studied (see Chem. Rev. 2010, 110, 1233-1277). PDMS block copolymers with HEMA have been prepared by various macroinitiator methods (see Polymer J. 2012, 44, 1087-1097). mPDMS graft copolymers using mPDMS macromers have also been described (see Macromolecules 2002, 35, 5953-5962 and Macromolecules 2003, 36, 4772-4778). Such graft copolymers are not suitable as prepolymers because of the lack of any polymerizable groups.

There is a need in the art for extended wear contact lenses, requiring extended wear silicone hydrogels that exhibit enhanced permeability of tear film components. There is also a need to provide silicone-containing prepolymers that are compatible with the reactive monomer mixtures used in the fabrication of silicone contact lenses.

SUMMARY

Tri-block prepolymers, having an [A]-[B]-[C] structure, comprise at least one monovalent reactive group, wherein [A] and [C] independently comprise polymeric segments based on a first hydrophilic monomer comprising functionality selected from the group consisting of hydroxyalkyl, aminoalkyl, and mixtures thereof, and [B] comprises a polymeric segment of at least one silicone-containing macromer and optionally another silicone-containing monomer and optionally a second hydrophilic monomer comprising functionality selected from the group consisting of hydroxyalkyl, aminoalkyl, and mixtures thereof. The at least one monovalent reactive group may be formed during the synthesis of the tri-block copolymer, for example, by end group modification after an organotellurium mediated living radical polymerization (TERP), and/or thereafter, by a subsequent acylation reaction between the tri-block copolymer and a suitable acylating agent such as methacryloyl chloride. The monovalent reactive group content may vary between about 1 mole percent to about 25 mole percent of the original, or pre-acylated, hydroxyalkyl or aminoalkyl content.

The properties of the tri-block prepolymer are controlled by the composition of the tri-block prepolymer, in particular, the composition, molecular weight, and repeating unit sequence distribution of the segments comprising the tri-block prepolymer as well as the content of monovalent reactive groups. By adjusting these variables, tri-block prepolymers may be designed to compatibilize specific reactive monomer mixtures and impart certain physical, mechanical, and biological properties to the resulting silicone hydrogels formed by the polymerization of such reactive monomer mixtures. These tri-block prepolymers may be used alone or in combination with other components in reactive monomer mixtures for making silicone hydrogels and ophthalmic devices made therefrom. The silicone hydrogels of the present invention display unique combinations of physical, mechanical and biological properties, including enhanced permeability of tear components, especially of proteins.

In a first aspect, a tri-block prepolymer for making biomedical devices comprises formula [A]-[B]-[C], wherein [A] and [C] are independently polymeric segments formed from a first hydrophilic monomer comprising functionality selected from the group consisting of hydroxyalkyl, aminoalkyl, and mixtures thereof and optionally one or more second hydrophilic monomers; [B] is a polymeric segment formed from a silicone-containing macromer; optionally a third hydrophilic monomer comprising functionality selected from the group consisting of hydroxyalkyl, aminoalkyl, and mixtures thereof; and optionally a silicone-containing monomer; and wherein said tri-block prepolymer comprises at least one monovalent reactive group.

In another aspect, a silicone hydrogel formed from a reactive monomer mixture comprises: (a) the tri-block prepolymer according to any tri-block prepolymer disclosed herein; (b) at least one other fourth hydrophilic monomer independent of the hydrophilic monomers of segments [A], [B] and [C]; and (c) at least one silicone-containing component independent of the tri-block prepolymer and the optional silicone-containing monomer of [B].

A further aspect is a silicone hydrogel that is formed from a reactive monomer mixture comprising: (a) a tri-block prepolymer of the formula [A]-[B]-[C], wherein [A] and [C] are homopolymeric segments based on a hydroxyalkyl (meth)acrylate, and [B] is a copolymeric segment based on repeating units of the hydroxyalkyl (meth)acrylate and mono-n-butyl terminated monomethacryloxypropyl terminated polydimethylsiloxanes, having a number average molecular weight in the range of about 500 daltons to about 1500 daltons, wherein said tri-block prepolymer comprises at least one monovalent reactive group selected from the group consisting of (meth)acrylate, (meth)acrylamide, styryl, vinyl, N-vinyl lactam, N-vinylamides, O-vinylethers, O-vinylcarbonates, and O-vinylcarbomates and mixtures thereof; (b) at least one hydrophilic monomer; (c) at least one silicone-containing component; (d) at least one charged monomer; (e) at least one polyamide; (f) at least one crosslinking agent; (g) at least one photoinitiator; and (h) one or more of the following: a UV absorber, a visible light absorber, a photochromic compound, a pharmaceutical, a nutraceutical, an antimicrobial substance, a tint, a pigment, a copolymerizable dye, a nonpolymerizable dye, a release agent, and combinations thereof.

Also provided are contact lenses made from the silicone hydrogels described herein.

A further aspect is a method of making a silicone hydrogel comprising: (a) obtaining any tri-block prepolymer disclosed herein; (b) preparing a reactive monomer mixture from the tri-block prepolymer and optionally with other components; (c) transferring the reactive monomer mixture onto a first mold; (d) placing a second mold on top of the first mold filled with the reactive monomer mixture; and (e)

curing the reactive monomer mixture by free radical copolymerization to form the silicone hydrogel in the shape of a contact lens.

DESCRIPTION OF DRAWINGS

FIG. 1 shows the chemical scheme and equations for an exemplary synthesis of the tri-block prepolymers disclosed herein by TERP and subsequent acylation with methacryloyl chloride.

DETAILED DESCRIPTION

Tri-block prepolymers for making biomedical devices are of the following structure: [A]-[B]-[C], wherein [A] and [C] are independently polymeric segments both based on a first hydrophilic monomer comprising functionality selected from the group consisting of hydroxyalkyl and aminoalkyl, and mixtures thereof and optionally one or more second hydrophilic monomers; and [B] is a polymeric segment based on a silicone-containing macromer; optionally a third hydrophilic monomer comprising functionality selected from the group consisting of hydroxyalkyl, aminoalkyl, and mixtures thereof; optionally a silicone-containing monomer; and wherein said tri-block prepolymer comprises at least one monovalent reactive group. The tri-block prepolymers generally comprise an end group that is polymerizable. The tri-block prepolymer may further comprise pendant monovalent reactive groups. Methods of making and using the tri-block prepolymers are also provided. The tri-block prepolymers are used to make silicone hydrogels, which in turn are used for contact lenses.

Before describing several exemplary aspects of the invention, it is to be understood that the invention is not limited to the details of construction or process steps set forth in the following description. The invention is capable of other embodiments and of being practiced or being carried out in various ways.

Definitions

With respect to the terms used in this disclosure, the following general definitions are provided. The polymer definitions are consistent with those disclosed in the Compendium of Polymer Terminology and Nomenclature, IUPAC Recommendations 2008, edited by: Richard G. Jones, Jaroslav Kahovec, Robert Stepto, Edward S. Wilks, Michael Hess, Tatsuki Kitayama, and W. Val Metanomski.

"Individual" includes humans and vertebrates.

A "biomedical device" is any article that is designed to be used while either in or on mammalian tissues or fluids, and preferably in or on human tissue or fluids. Examples of these devices include but are not limited to wound dressings, sealants, tissue fillers, drug delivery systems, coatings, adhesion prevention barriers, catheters, implants, stents, sutures and ophthalmic devices such as intraocular lenses and contact lenses. The biomedical devices may be ophthalmic devices, such as contact lenses, including contact lenses made from silicone hydrogels.

"Ocular surface" includes the surface and glandular epithelia of the cornea, conjunctiva, lacrimal gland, accessory lacrimal glands, nasolacrimal duct and meibomian gland, and their apical and basal matrices, puncta and adjacent or related structures, including eyelids linked as a functional system by both continuity of epithelia, by innervation, and the endocrine and immune systems.

"Ophthalmic device" refers to any device which resides in or on the eye or any part of the eye, including the ocular surface. These devices can provide optical correction, cosmetic enhancement, vision enhancement, therapeutic benefit (for example as bandages) or delivery of active components such as pharmaceutical and nutraceutical components, or a combination of any of the foregoing. Examples of ophthalmic devices include but are not limited to lenses, optical and ocular inserts, including but not limited to punctal plugs, and the like. "Lenses" include soft contact lenses, hard contact lenses, hybrid contact lenses, intraocular lenses, and overlay lenses. The ophthalmic device may comprise a contact lens.

"Contact lens" refers to an ophthalmic device that can be placed on the cornea of an individual's eye. The contact lens may provide corrective, cosmetic, or therapeutic benefit, including wound healing, the delivery of drugs or nutraceuticals, diagnostic evaluation or monitoring, or UV light blocking and visible light or glare reduction, or a combination thereof. A contact lens can be of any appropriate material known in the art and can be a soft lens, a hard lens, or a hybrid lens containing at least two distinct portions with different properties, such as modulus, water content, light absorbing characteristics or combinations thereof.

The biomedical devices, ophthalmic devices, and lenses of the present invention may be comprised of silicone hydrogels. These silicone hydrogels typically contain a silicone component and hydrophilic and/or hydrophobic monomers that are covalently bound to one another in the cured device.

"Silicone hydrogel contact lens" refers to a contact lens comprising at least one silicone hydrogel material. Silicone hydrogel contact lenses generally have increased oxygen permeability compared to conventional hydrogels. Silicone hydrogel contact lenses use both their water and polymer content to transmit oxygen to the eye.

As used herein, the term "about" refers to a range of +/−5% of the number that is being modified. For example, the phrase "about 10" would include both 9.5 and 10.5.

As used herein, the term "(meth)" designates optional methyl substitution. Thus, a term such as "(meth)acrylates" denotes both methacrylates and acrylates.

Wherever chemical structures are given, it should be appreciated that alternatives disclosed for the substituents on the structure may be combined in any combination. Thus, if a structure contained substituents R* and R**, each of which contained lists of three potential groups, nine combinations are disclosed. The same applies for combinations of properties.

When a subscript, such as "n" in the generic formula [***]$_n$, is used to depict the number of repeating units in a polymer's chemical formula, said subscript is a whole number best representing the number average molecular weight of the macromolecule. Said subscript is also known as the "degree of polymerization (DP)."

A "repeating unit" or "repeating chemical unit" is the smallest repeating group of atoms in a polymer that results from the polymerization of monomers and macromers.

A "macromolecule" is an organic compound having a molecular weight of greater than 1500 and may be reactive or non-reactive.

As used herein, the "target macromolecule" is the intended macromolecule being synthesized from the reactive monomer mixture comprising monomers, macromers, prepolymers, cross-linkers, initiators, additives, diluents, and the like.

A "polymer" is a sample of macromolecules of repeating chemical units linked together into a chain or network structure and is composed of repeating units derived from the monomers and macromers included in the reactive mixture. Polymers have a molecular weight distribution.

A "homopolymer" is a polymer made from one monomer or macromer; a "copolymer" is a polymer made from two or more monomers, macromers or a combination thereof; a "terpolymer" is a polymer made from three monomers, macromers or a combination thereof. A "block copolymer" is composed of compositionally different blocks or segments. Diblock copolymers have two blocks. Triblock copolymers have three blocks. "Comb or graft copolymers" are made from at least one macromer.

"Polymerizable" means that the compound comprises at least one monovalent reactive group which can undergo chain growth polymerization, such as free radical polymerization. "Non-polymerizable" means that the compound does not comprise such a monovalent reactive group. Polymerizable compounds are reactive components. Polymerizable compounds may be monomers, macromers, prepolymers, cross-linkers, and mixtures thereof.

"Monovalent reactive groups" are groups that can undergo chain growth polymerization, such as free radical, cationic, and anionic polymerization. Common examples of monovalent reactive groups are ethylenically unsaturated groups. Non-limiting examples of monovalent groups include (meth)acrylates, styrenes, vinyl ethers, (meth)acrylamides, N-vinyllactams, N-vinylamides, O-vinylcarbamates, O-vinylcarbonates, other vinyl groups, and mixtures thereof.

Any type of free radical polymerization may be used including but not limited to bulk, solution, suspension, and emulsion as well as any of the controlled radical polymerization methods such as stable free radical polymerization, nitroxide-mediated living polymerization, atom transfer radical polymerization, reversible addition fragmentation chain transfer polymerization, organotellurium mediated living radical polymerization, and the like.

An "initiator" is a molecule that can decompose into radicals which can subsequently react with a monomer to initiate a free radical polymerization reaction. A thermal initiator decomposes at a certain rate depending on the temperature; typical examples are azo compounds such as 1,1'-azobisisobutyronitrile and 4,4'-aobis(4-cyanovaleric acid), peroxides such as benzoyl peroxide, tert-butyl peroxide, tert-butyl hydroperoxide, tert-butyl peroxybenzoate, dicumyl peroxide, and lauroyl peroxide, peracids such as peracetic acid and potassium persulfate as well as various redox systems. A photo-initiator decomposes by a photochemical process; typical examples are derivatives of benzil, benzoin, acetophenone, benzophenone, camphorquinone, and mixtures thereof as well as various monoacyl and bisacyl phosphine oxides and combinations thereof.

A "monomer" is a molecule containing one monovalent reactive group which can undergo chain growth polymerization, and in particular, free radical polymerization, thereby creating a repeating unit in the chemical structure of the target macromolecule. Some monomers have di-functional impurities that can act as cross-linking agents. A "hydrophilic monomer" is a monomer which yields a clear single phase solution when mixed with deionized water at 25° C. at a concentration of 5 weight percent.

A "hydrophilic component" is an initiator, monomer, macromer, cross-linker, prepolymer, additive, or polymer which yields a clear single phase solution when mixed with deionized water at 25° C. at a concentration of 5 weight percent.

A "macromonomer" or "macromer" is a macromolecule that has one end-group that can undergo chain growth polymerization, and in particular, free radical polymerization, thereby creating a repeating unit in the chemical structure of the target macromolecule. Typically, the chemical structure of the macromer is different than the chemical structure of the target macromolecule, that is, the repeating unit of the macromer's pendent group is different than the repeating unit of the target macromolecule or its main chain. The difference between a monomer and a macromer is merely one of chemical structure, molecular weight, and molecular weight distribution of the pendent group. As a result and as used herein, the patent literature occasionally defines monomers as polymerizable compounds having relatively low molecular weights of about 1,500 Daltons or less, which inherently includes some macromers. In particular, monomethacryloxypropyl terminated mono-n-butyl terminated polydimethylsiloxane (molecular weight=500-1500 g/mol) (mPDMS) and mono-(2-hydroxy-3-methacryloxypropyl)-propyl ether terminated mono-n-butyl terminated polydimethylsiloxane (molecular weight=500-1500 g/mol) (OH-mPDMS) may be referred to as monomers or macromers. Furthermore, the patent literature occasionally defines macromers as having one or more reactive groups, essentially broadening the common definition of macromer to include prepolymers.

A "cross-linking agent" is a di-functional or multi-functional monomer which can undergo free radical polymerization at two or more locations on the molecule, thereby creating branch points and a polymeric network. Common examples are ethylene glycol dimethacrylate, tetraethylene glycol dimethacrylate, trimethylolpropane trimethacrylate, methylene bisacrylamide, triallyl cyanurate, and the like.

A "prepolymer" is a di-functional or multi-functional macromolecule or oligomer capable of further polymerization through monovalent reactive groups, thereby contributing more than one repeating unit to at least one type of chain of the target macromolecule. The difference between a cross-linking agent and a prepolymer is merely one of chemical structure, molecular weight, and molecular weight distribution. For instance, bis-3-acryloxy-2-hydroxypropyloxypropyl polydimethylsiloxane (ac-PDMS) is a frequently used di-functional siloxane cross-linking agent that is also a prepolymer in accordance with the aforementioned definition.

The tri-block prepolymers of the present invention are tri-block copolymers that either have one monovalent reactive group, typically as an end group, making such tri-block prepolymers also macromers, or more than one monovalent reactive group, typically as a plurality of pendant groups and end groups.

A "polymeric network" is cross-linked macromolecule that can swell but cannot dissolve in good solvents because the polymeric network is essentially one macromolecule. "Hydrogels" are polymeric networks that swell in water or aqueous solutions, typically absorbing at least 10 weight percent water. "Silicone hydrogels" are hydrogels that are made from at least one silicone-containing component with at least one hydrophilic component. Hydrophilic components may also include non-reactive polymers.

"Conventional hydrogels" refer to polymeric networks made from monomers and other reactive components without any siloxy, siloxane or carbosiloxane groups. Conventional hydrogels are prepared from reactive monomer mixtures predominantly containing hydrophilic monomers, such as 2-hydroxyethyl methacrylate ("HEMA"), N-vinyl pyrrolidone ("NVP"), N,N-dimethylacrylamide ("DMA") or vinyl acetate. U.S. Pat. Nos. 4,436,887, 4,495,313, 4,889,664, 5,006,622, 5,039,459, 5,236,969, 5,270,418, 5,298,533, 5,824,719, 6,420,453, 6,423,761, 6,767,979, 7,934,830, 8,138,290, and 8,389,597 disclose the formation of conventional hydrogels. Commercially available conventional hydrogels include, but are not limited to, etafilcon, genfilcon, hilafilcon, lenefilcon, nesofilcon, omafilcon, polymacon, and vifilcon, including all of their variants.

"Silicone hydrogels" refer to hydrogels obtained by copolymerization of at least one silicone-containing component with at least one hydrophilic component. Hydrophilic components may also include non-reactive polymers. Each of the silicone-containing components and the hydrophilic components may be a monomer, macromer, crosslinking agent, prepolymer, or combinations thereof. A silicone-containing component contains at least one siloxy, siloxane or carbosiloxane group. Examples of commercially available silicone hydrogels include balafilcon, acquafilcon, lotrafilcon, comfilcon, delefilcon, enfilcon, fanfilcon, formofilcon, galyfilcon, senofilcon, narafilcon, falcon II, asmofilcon A, samfilcon, riofilcon, stenfilcon, somofilcon, including all of their variants, as well as silicone hydrogels as prepared in U.S. Pat. Nos. 4,659,782, 4,659,783, 5,244,981, 5,314,960, 5,331,067, 5,371,147, 5,998,498, 6,087,415, 5,760,100, 5,776,999, 5,789,461, 5,849,811, 5,965,631, 6,367,929, 6,822,016, 6,867,245, 6,943,203, 7,247,692, 7,249,848, 7,553,880, 7,666,921, 7,786,185, 7,956,131, 8,022,158, 8,273,802, 8,399,538, 8,470,906, 8,450,387, 8,487,058, 8,507,577, 8,637,621, 8,703,891, 8,937,110, 8,937,111, 8,940,812, 9,056,878, 9,057,821, 9,125,808, 9,140,825, 9156,934, 9,170,349, 9,244,196, 9,244,197, 9,260,544, 9,297,928, 9,297,929 as well as WO 03/22321, WO 2008/061992, and US 2010/0048847. These patents are hereby incorporated by reference in their entireties.

"Interpenetrating polymeric networks" or "IPNs" are polymers comprising two or more polymeric networks which are at least partially interlaced on a molecular scale, but not covalently bonded to each other and cannot be separated unless chemical bonds are broken.

"Semi-interpenetrating polymeric networks" or "semi-IPNs" are polymers comprising one or more polymer network(s) and one or more linear or branched polymer(s) characterized by the penetration on a molecular scale of at least one of the networks by at least some of the linear or branched chains.

"Reactive mixture," "reaction mixture" and "reactive monomer mixture" (RMM) refer to the mixture of components (both reactive and non-reactive) which are mixed together and when subjected to polymerization conditions form the silicone hydrogels and lenses of the present invention. The reactive monomer mixture comprises reactive components such as monomers, macromers, prepolymers, cross-linkers, initiators, diluents, and additional components such as wetting agents, release agents, dyes, light absorbing compounds such as UV absorbers, pigments, dyes and photochromic compounds, any of which may be reactive or non-reactive but are capable of being retained within the resulting biomedical device, as well as pharmaceutical and nutraceutical compounds, and any diluents. It will be appreciated that a wide range of additives may be added based upon the biomedical device which is made and its intended use. Concentrations of components of the reactive mixture are expressed as weight percentages of all components in the reaction mixture, excluding diluent. When diluents are used, their concentrations are expressed as weight percentages based upon the amount of all components in the reaction mixture and the diluent.

"Reactive components" are the components in the reactive mixture which become part of the chemical structure of the polymeric network of the resulting silicone hydrogel, by covalent bonding, hydrogen bonding or the formation of interpenetrating polymeric networks. Diluents and processing aids which do not become part of the structure of the polymer are not reactive components.

As used herein, a "silicone-containing component" is an initiator, monomer, macromer, crosslinking agent, prepolymer, polymer, or additive, in the reactive mixture with at least one silicon-oxygen bond, typically in the form of siloxy groups, siloxane groups, carbosiloxane groups, and mixtures thereof.

Examples of silicone-containing components which are useful in this invention may be found in U.S. Pat. Nos. 3,808,178, 4,120,570, 4,136,250, 4,153,641, 4,740,533, 5,034,461, 5,070,215, 5,244,981, 5,314,960, 5,331,067, 5,371,147, 5,760,100, 5,849,811, 5,962,548, 5,965,631, 5,998,498, 6,367,929, 6,822,016, 6,943,203, 6,951,894, 7,052,131, 7,247,692, 7,249,848, 7,396,890, 7,461,937, 7,468,398, 7,473,735, 7,538,146, 7,553,880, 7,572,841, 7,666,921, 7,691,916, 7,786,185, 7,825,170, 7,915,323, 7,956,131, 7,994,356, 8,022,158, 8,163,206, 8,273,802, 8,399,538, 8,415,404, 8,420,711, 8,450,387, 8,487,058, 8,568,626, 8,686,099, 8,662,663, 8,772,367, 8,772,422, 8,835,583, 8,937,110, 8,937,111, 8,940,812, 8,974,775, 8,980,972, 9,056,878, 9,125,808, 9,140,825, 9,156,934, 9,170,349, 9,200,119, 9,217,813, 9,244,196, 9,244,197, 9,255,199, 9,260,544, 9,296764, 9,297,928, 9,297,929, and European Patent No. 080539 and WO2014/123959. These patents are hereby incorporated by reference in their entireties.

Tri-Block Prepolymer

Tri-block prepolymers used in the fabrication of biomedical devices have a formula:

[A]-[B]-[C], wherein

[A] and [C] are independently polymeric segments based on a first hydrophilic monomer comprising functionality selected from the group consisting of hydroxyalkyl and aminoalkyl, and mixtures thereof and optionally one or more second hydrophilic monomers; and

[B] is a polymeric segment based on a silicone-containing macromer; optionally a third hydrophilic monomer comprising functionality selected from the group consisting of hydroxyalkyl, aminoalkyl, and mixtures thereof; and optionally a silicone-containing monomer; and wherein said tri-block prepolymer comprises at least one monovalent reactive group.

The monovalent reactive group may be a (meth)acrylate, (meth)acrylamide, styryl, vinyl, N-vinyl lactam, N-vinylamides, O-vinylethers, O-vinylcarbonates, O-vinylcarbamates, and combinations thereof.

The polymeric segments [A] and [C] of the tri-block prepolymer may be formed independently from a first hydrophilic monomer comprising a $C_2$-$C_8$ linear or branched hydroxyalkyl (meth)acrylate, a $C_2$-$C_8$ linear or branched dihydroxyalkyl (meth)acrylate, a $C_2$-$C_8$ linear or branched trihydroxyalkyl (meth)acrylate, a N—$C_2$-$C_6$ linear or branched hydroxyalkyl (meth)acrylamide, a N,N-bis $C_2$-$C_6$ linear or branched hydroxyalkyl (meth)acrylamide, a N—$C_2$-$C_8$ linear or branched dihydroxyalkyl (meth)acrylamide, a N,N-bis $C_2$-$C_8$ linear or branched dihydroxyalkyl (meth)acrylamide, a N—$C_2$-$C_8$ linear or branched trihydroxyalkyl (meth)acrylamide, a N,N-bis $C_2$-$C_8$ linear or branched trihydroxyalkyl (meth)acrylamide, or mixtures thereof.

The polymeric segments [A] and [C] of the tri-block prepolymer may be independently formed from a first hydrophilic monomer comprising 2-hydroxyethyl (meth)acrylate, 2-hydroxypropyl (meth)acrylate, 3-hydroxypropyl (meth)acrylate, 2,3-dihydroxypropyl (meth)acrylate, 2-hydroxybutyl (meth)acrylate, 3-hydroxybutyl (meth)acrylate, 4-hydroxybutyl (meth)acrylate, N-(2-hydroxyethyl) (meth) acrylamide, N,N-bis(2-hydroxyethyl) (meth)acrylamide, N-(2-hydroxypropyl) (meth)acrylamide, N,N-bis(2-hydroxypropyl) (meth)acrylamide, N-(3-hydroxypropyl) (meth)acrylamide, N-(2-hydroxybutyl) (meth)acrylamide, N-(3-hydroxybutyl) (meth)acrylamide, N-(4-hydroxybutyl) (meth)acrylamide, or mixtures thereof.

The polymeric segments [A] and [C] may both be poly (2-hydroxyethyl methacrylate) (PHEMA) and [B] is poly (mono-n-butyl terminated monomethacryloxypropyl terminated polydimethylsiloxane) (Poly[mPDMS]) which is the graft homopolymer of mPDMS.

The polymeric segments [A] and [C] may both be poly (2-hydroxyethyl methacrylate) (PHEMA) and [B] is poly (mono-n-butyl terminated monomethacryloxypropyl terminated polydimethylsiloxane-co-2-hydroxyethyl methacrylate) (Poly[mPDMS-co-HEMA]) which is the graft copolymer of mPDMS and 2-hydroxyethyl methacrylate (HEMA).

The polymeric segments [A] and [C] of the tri-block prepolymer may be formed from a reactive monomer mixture independently comprising the first hydrophilic monomer and a second hydrophilic monomer independently selected from the group consisting of acrylamide, N,N-dimethylacrylamide (DMA), N-vinylpyrrolidone (NVP), N-vinyl acetamide (NVA), N-vinyl N-methyl acetamide (VMA), N-isopropyl acrylamide, polyethylene glycol monoacrylate, polyethylene glycol monomethacrylate, acrylic acid (AA), methacrylic acid (MAA), N-[(ethenyloxy)carbonyl]-β-alanine, 3-acrylamidopropanoic acid (ACA1), 5-acrylamidopropanoic acid (ACA2), 2-(methacryloyloxy)ethyl trimethylammonium chloride (METAC or Q salt), 2-acrylamido-2-methylpropane sulfonic acid (AMPS), 1-propanaminium, N-(2-carboxyethyl)-N,N-dimethyl-3-[(1-oxo-2-propen-1-yl)amino]-, inner salt (CBT); 1-propanaminium, N,N-dimethyl-N-[3-[(1-oxo-2-propen-1-yl)amino]propyl]-3-sulfo-, inner salt (SBT); 3,5-dioxa-8-aza-4-phosphaundec-10-en-1-aminium, 4-hydroxy-N,N,N-trimethyl-9-oxo-, inner salt, 4-oxide (9CI) (PBT), and mixtures thereof.

The polymeric segments [A] and [C] of the tri-block prepolymer independently comprise the second hydrophilic monomer in an amount in the range of about 0 to about 50 mole percent of [A] and [C]; in an amount in the range of about 0 to about 25 mole percent of [A] and [C]; in an amount in the range of about 0 to about 15 mole percent of [A] and [C]; in an amount in the range of about 0 to about 10 mole percent of [A] and [C]; and most preferably without any other hydrophilic monomer.

The polymeric segment [B] of the tri-block prepolymer may be formed from a silicone-containing macromer comprising one monovalent reactive group selected from the group consisting of (meth)acrylate, (meth)acrylamide, styryl, vinyl, N-vinyl lactam, N-vinylamides, O-vinylethers, O-vinylcarbonates, and O-vinylcarbamates, having between about 1 and about 200 divalent disubstituted siloxane repeating units and terminating with a $C_1$ to $C_8$ linear, branched or cyclic alkyl group.

The silicone-containing macromer may comprise a chemical structure shown in Formula I:

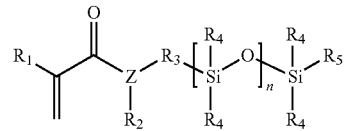

Formula I wherein Z is selected from O, N, S or $NCH_2CH_2O$; when Z=O or S, $R_2$ is not required; wherein $R_1$ is a hydrogen atom or methyl; wherein n is a whole number between 1 and 200, or between 1 and 100, or between 1 and 50, or between 1 and 20; wherein $R_3$ is an alkylene segment $(CH_2)_3$, in which y is a whole number from 1 to 6, 1 to 4, or 2 to 4, and each methylene group may be optionally further and independently substituted with a group selected from the group consisting of ethers, amines, esters, ketones, carbonyls, carboxylates, and carbamates, or when y is 2 or more a non-terminal methylene group is optionally replaced with a carbamate group; or wherein $R_3$ is an oxyalkylene segment $O(CH_2)_z$ in which z is a whole number from 1 to 3, or wherein $R_3$ is a mixture of alkylene and oxyalkylene segments and the sum of y and z is between 1 and 9; wherein $R_2$ and $R_4$ are independently a hydrogen atom, a linear, branched, or cyclic alkyl group containing between one and six carbon atoms, a linear, branched, or cyclic alkoxy group containing between one and six carbon atoms, a linear or branched polyethyelenoxyalkyl group, an alkyl-siloxanyl-alkyl group, a phenyl group, a benzyl group, a substituted or un-substituted aryl group, a fluoroalkyl group, a partially fluorinated alkyl group, a perfluoroalkyl group, a fluorine atom, a mono-, di, or tri-hydroxyalkyl group containing between one and six carbon atoms, or combinations thereof; and wherein $R_5$ is a substituted or un-substituted linear, branched, or cyclic alkyl group having 1 to 8 carbon atoms or an aryl group, any of which may be further substituted with one or more fluorine atoms or trimethylsiloxy groups.

Non-limiting examples of these silicone-containing macromers include mono-n-alkyl terminated mono-methacryloxypropyl terminated polydimethylsiloxanes as shown in Formula II wherein n is between 3 and 50; between 3 and 25; and between 3 and 15 and $R_5$ is a linear, branched, or cyclic alkyl group containing between 1 and 8 carbon atoms; mono-n-butyl terminated mono-methacryloxypropyl terminated polydimethylsiloxanes (mPDMS) as shown in Formula III wherein n is between 3 and 50; between 3 and 25; or between 3 and 15; and macromers having the chemical structures as shown in Formulae IV through XI, wherein $R_1$ is a hydrogen atom or methyl group; $R_2$ and $R_4$ are independently a hydrogen atom, a linear, branched, or cyclic alkyl group containing between one and six carbon atoms, a linear, branched, or cyclic alkoxy group containing between one and six carbon atoms, a linear or branched polyethyelenoxyalkyl group, a phenyl group, a benzyl group, a substituted or un-substituted aryl group, a fluoroalkyl group, a partially fluorinated alkyl group, a perfluoroalkyl group, a fluorine atom, or combinations thereof; and $R_5$ is a linear, branched, or cyclic alkyl group containing between 1 and 8 carbon atoms; and wherein n is between 3 and 50; between 3 and 25; or between 3 and 15.

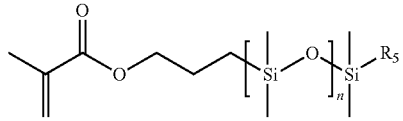

Formula II

Formula III

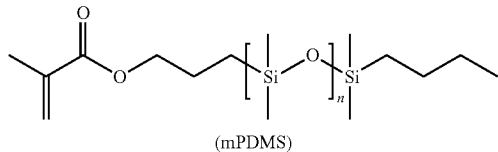

(mPDMS)

Formula IV

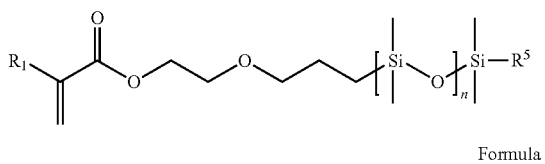

Formula V

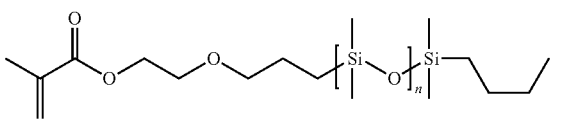

Formula VI

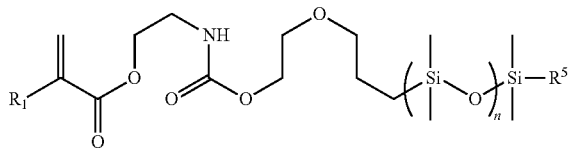

Formula VII

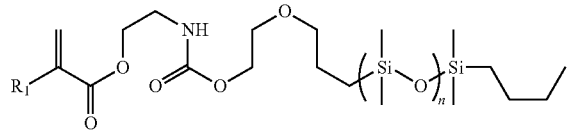

Formula VIII

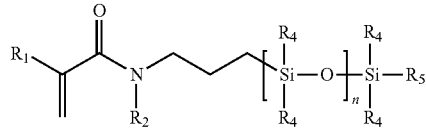

Formula IX

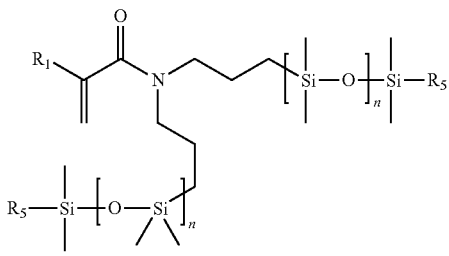

Formula IX

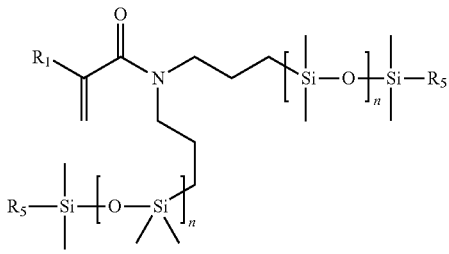

Formula X

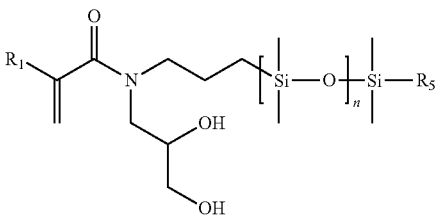

Formula XI

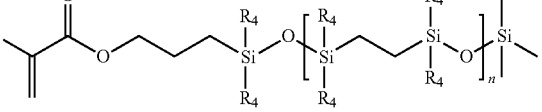

Examples of suitable mono-alkyl terminated mono(meth)acryloxyalkyl terminated polydialkylsiloxanes include mono-n-butyl terminated mono(meth)acryloxypropyl terminated polydimethylsiloxane, mono-n-methyl terminated mono(meth)acryloxypropyl terminated polydimethylsiloxane, mono-n-butyl terminated mono(meth)acryloxypropyl terminated polydiethylsiloxane, mono-n-methyl terminated mono(meth)acryloxypropyl terminated polydiethylsiloxane, mono-alkyl terminated mono(meth)acrylamidoalkyl terminated polydialkylsiloxanes, mono-alkyl terminated mono (meth)acryloxyalkyl terminated polydiarylsiloxanes, and mixtures thereof.

The silicone-containing macromer may comprise a monofunctional hydroxyl-substituted poly(dialkylsiloxane) with a chemical structure shown in Formula XII Formula XII

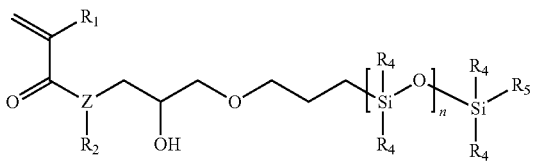

wherein Z is selected from O, N, S or NCH$_2$CH$_2$O; when Z=O or S, R$_2$ is not required; wherein R$_1$ is a hydrogen atom or methyl; wherein n is a whole number between 1 and 200; wherein R$_2$ and R$_4$ are independently a hydrogen atom, a linear, branched, or cyclic alkyl group containing between one and six carbon atoms, a linear, branched, or cyclic alkoxy group containing between one and six carbon atoms, a linear or branched polyethyelenoxyalkyl group, a phenyl group, a benzyl group, a substituted or un-substituted aryl group, a fluoroalkyl group, a partially fluorinated alkyl group, a perfluoroalkyl group, a fluorine atom, or combinations thereof; and wherein R$_5$ is a substituted or un-substituted linear, branched, or cyclic alkyl group having 1 to 8 carbon atoms or an aryl group, any of which may be further substituted with one or more fluorine atoms or trimethylsiloxy groups.

Examples of hydroxyl containing macromers include mono-(2-hydroxy-3-methacryloxypropyl)propyl ether terminated mono-n-butyl terminated polydimethylsiloxanes (OH-mPDMS) as shown in Formula XIII wherein n is between 4 and 30; between 4 and 8; or between 10 and 20; and macromers having the chemical structures as shown in Formulae XIV and XV wherein $R_1$ is a hydrogen atom or methyl group; wherein n between 4 and 30; between 4 and 8; or between 10 and 20; wherein $R_4$ is independently a hydrogen atom, a linear, branched, or cyclic alkyl group containing between one and six carbon atoms, a linear, branched, or cyclic alkoxy group containing between one and six carbon atoms, a linear or branched polyethyelenoxyalkyl group, a phenyl group, a benzyl group, a substituted or un-substituted aryl group, a fluoroalkyl group, a partially fluorinated alkyl group, a perfluoroalkyl group, a fluorine atom, or combinations thereof; and wherein $R_5$ is a substituted or un-substituted linear, branched, or cyclic alkyl group having 1 to 8 carbon atoms or an aryl group, any of which may be further substituted with one or more fluorine atoms or trimethylsiloxy groups.

from 0 to 6, 0 to 4, and 0 to 2, and each methylene group may be optionally further and independently substituted with a group selected from the group consisting of ethers, amines, alcohols, esters, carbonyls, carboxylates, and carbamates.

The silicone-containing macromer may be a mixture of macromers having the chemical structures shown in Formulae I to XVI.

Preferably, the silicone-containing macromer is selected from the group consisting of monoalkyl terminated, mono (meth)acrylate terminated poly(dialkylsiloxanes), monoalkyl terminated, monoalkyl terminated, mono(meth)acrylate terminated poly(diarylsiloxanes), monoalkyl terminated, mono(meth)acrylate terminated poly(alkylarylsiloxanes), and mixtures thereof.

Formula XIII

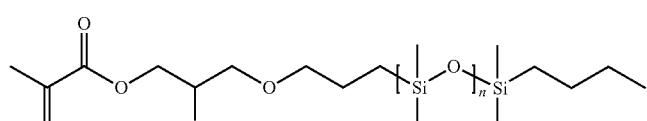

(OH—mPDMS)

Formula XIV

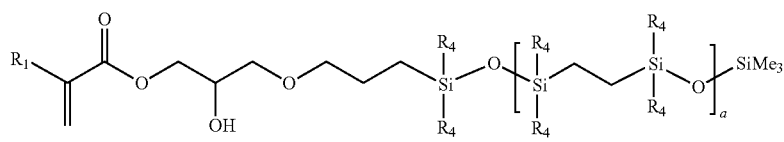

Formula XV

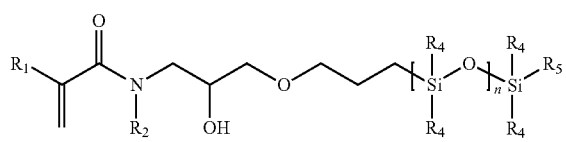

The silicone-containing macromer may comprise the chemical structure shown in Formula XVI.

Formula XVI

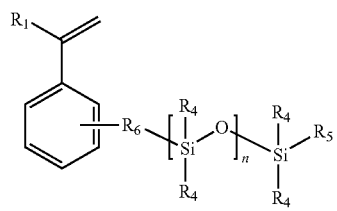

wherein $R_1$ is a hydrogen atom or methyl; wherein n is a whole number between 1 and 200; wherein $R_4$ is independently a hydrogen atom, a linear, branched, or cyclic alkyl group containing between one and six carbon atoms, a linear, branched, or cyclic alkoxy group containing between one and six carbon atoms, a linear or branched polyethyelenoxyalkyl group, a phenyl group, a benzyl group, a substituted or un-substituted aryl group, a fluoroalkyl group, a partially fluorinated alkyl group, a perfluoroalkyl group, a fluorine atom, or combinations thereof; wherein $R_5$ is a substituted or un-substituted linear, branched, or cyclic alkyl group having 1 to 8 carbon atoms or an aryl group, any of which may be further substituted with one or more fluorine atoms or trimethylsiloxy groups; and wherein $R_6$ is an alkylene segment $(CH_2)_3$, in which y is a whole number Most preferably, the silicone-containing macromer is selected from the group consisting of mono-n-butyl terminated monomethacryloxypropyl terminated polydimethylsiloxane (Formula III), mono-n-butyl terminated mono-(2-hydroxy-3-methacryloxypropyl)-propyl ether terminated polydimethylsiloxane (Formula XIII), and mixtures thereof.

The polymeric segment [B] of the tri-block prepolymer may be formed from a silicone-containing macromer and another component selected from the group consisting of a third hydrophilic monomer comprising functionality selected from the group consisting of hydroxyalkyl, aminoalkyl, and mixtures thereof and a silicone-containing monomer.

In particular, the third hydrophilic monomer may be selected from the group consisting of a $C_2$-$C_8$ linear or branched hydroxyalkyl (meth)acrylate, a $C_2$-$C_8$ linear or branched dihydroxyalkyl (meth)acrylate, a $C_2$-$C_8$ linear or branched trihydroxyalkyl (meth)acrylate, a N—$C_2$-$C_6$ linear or branched hydroxyalkyl (meth)acrylamide, a N,N-bis $C_2$-$C_6$ linear or branched hydroxyalkyl (meth)acrylamide, a N—$C_2$-$C_8$ linear or branched dihydroxyalkyl (meth)acrylamide, a N,N-bis $C_2$-$C_8$ linear or branched dihydroxyalkyl (meth)acrylamide, a N—$C_2$-$C_8$ linear or branched trihydroxyalkyl (meth)acrylamide, a N,N-bis $C_2$-$C_8$ linear or branched trihydroxyalkyl (meth)acrylamide, or mixtures thereof.

More specifically, the third hydrophilic monomer may be selected from the group consisting of 2-hydroxyethyl (meth)acrylate, 2-hydroxypropyl (meth)acrylate, 3-hydroxypropyl (meth)acrylate, 2,3-dihydroxypropyl (meth)acrylate, 2-hydroxybutyl (meth)acrylate, 3-hydroxybutyl (meth)acrylate, 4-hydroxybutyl (meth)acrylate, N-(2-hydroxyethyl) (meth)acrylamide, N,N-bis(2-hydroxyethyl) (meth)acrylamide, N-(2-hydroxyethyl) (meth)acrylamide, N,N-bis(2-hydroxypropyl) (meth)acrylamide, N-(3-hydroxypropyl) (meth)acrylamide, N-(2-hydroxybutyl) (meth)acrylamide, N-(3-hydroxybutyl) (meth)acrylamide, N-(4-hydroxybutyl) (meth)acrylamide, or mixtures thereof. Most preferably, the third hydrophilic monomer is 2-hydroxylethyl methacrylate.

The polymeric segment [B] of the tri-block prepolymer comprises the third hydrophilic monomer in an amount in the range of about 0 to about 50 mole percent of [B]; in an amount in the range of about 0 to about 25 mole percent of [B]; in an amount in the range of about 0 to about 15 mole percent of [B]; in an amount in the range of about 0 to about 10 mole percent of [B]; in an amount in the range of about 0 to about 5 mole percent of [B]; and most preferably in an amount in the range of about 1 to about 5 mole percent of [B].

The polymeric segment [B] of the tri-block prepolymer may further comprise a silicone-containing monomer which is selected from the group consisting of 3-methacryloxypropyl tris(trimethylsiloxy)silane, 3-acryloxypropyl tris(trimethylsiloxy)silane, 3-methacrylamidopropyl tris(trimethylsiloxy)silane, 3-acrylamidopropyl tris(trimethylsiloxy)silane, tris(trimethylsiloxy)silyl styrene, 2-methyl-2-hydroxy-3-[3-[1,3,3,3-tetramethyl-1-[(trimethylsilyl)oxy] disiloxanyl] propoxy]propyl ester, N-(2,3-dihydroxylpropyl) N-(3-tetra (dimethylsiloxy)dimethylbutyl silane)propyl) acrylamide and mixtures thereof.

Preferably, the tri-block prepolymer is comprised of repeating units of the siloxane-containing macromer between about 30 and about 80 weight percent; between about 30 and about 70 weight percent; and between about 40 and about 70 weight percent.

More preferably, the polymeric segment [B] of the tri-block prepolymer comprises a copolymer wherein the copolymer has repeating units of the siloxane-containing macromer comprises between about 75 and about 99 weight percent of [B]; between about 85 and about 99 weight percent of [B]; between about 90 and about 99 weight percent of [B]; between about 50 and about 99 mole percent of [B]; between about 50 and about 75 mole percent of [B]; and between about 60 and about 75 mole percent of [B].

The polymeric segment [B] may further comprise repeating units of a silicone-containing monomer in an amount in the range of about 1 to about 50 mole percent of [B]; in an amount in the range of about 1 to about 25 mole percent of [B]; in an amount in the range of about 1 to about 15 mole percent of [B]; and in an amount in the range of about 1 to about 10 mole percent of [B].

The polymeric segments [A], [B], and [C] of the tri-block prepolymer may be all homopolymers; or, the polymeric segments [A], [B], and [C] of the tri-block prepolymer may be all copolymers; the polymeric segments [A], [B], and [C] of the tri-block prepolymer may be independently selected from the group consisting of homopolymers, copolymers, and terpolymers. Most preferably, the polymeric segments [A] and [C] are homopolymers and the polymeric segment [B] is a copolymer.

In particular, polymeric segments [A] and [C] may both be homopolymers of a hydroxyalkyl (meth)acrylate and polymeric segment [B] is a copolymer comprising repeating units derived from mono-n-butyl terminated monomethacryloxypropyl terminated polydimethylsiloxane (mPDMS) or mono-n-butyl terminated mono-(2-hydroxy-3-methacryloxypropyl)-propyl ether terminated polydimethylsiloxane (OH-mPDMS) and the same hydroxyalkyl (meth)acrylate as used to prepare segments [A] and [C].

Most preferably, polymeric segments [A] and [C] are homopolymers of a 2-hydroxyethyl methacrylate and polymeric segment [B] segment is a copolymer comprising repeating units derived from mono-n-butyl terminated monomethacryloxypropyl terminated polydimethylsiloxane (mPDMS) and 2-hydroxyethyl methacrylate (HEMA).

Polymeric segments [A] and [C] may be homopolymers of a 2-hydroxyethyl methacrylate and polymeric segment [B] segment is a terpolymer comprising repeating units derived from mono-n-butyl terminated monomethacryloxypropyl terminated polydimethylsiloxane, mono-n-butyl terminated mono-(2-hydroxy-3-methacryloxypropyl)-propyl ether terminated polydimethylsiloxane, and 2-hydroxyethyl methacrylate.

The tri-block prepolymer may have a weight average molecular in the range of about 10 to about 100 kDa; in the range of about 20 to about 80 kDa in the range of about 20 to about 60 kDa in the range of about 20 to about 50 kDa; and may be used to compatibilize components of a reactive monomer mixture for making ophthalmic devices. Such a compatible reactive monomer mixture upon exposure to polymerization conditions forms a silicone hydrogel that is effective to form an ophthalmic device.

The tri-block prepolymer may be formed in the presence of an organotellurium mediated living radical polymerization (TERP) mediator and optionally and sequentially formed in the presence of an acylating agent comprising (meth)acryloyl chloride, (meth)acrylic anhydride, 2-isocyanatoethyl (meth)acrylate, 3-isopropenyl-α,α-dimethylbenzyl isocyanate, and mixtures thereof, having a monovalent reactive group content formed by the acylating agent in the range of about 1 mole percent to about 25 mole percent of the original preacylated hydroxyalkyl or aminoalkyl content or preferably having a monovalent reactive group content in the range of about 1 mole percent to about 10 mole percent of the original, pre-acylated, hydroxyalkyl or aminoalkyl content.

A representative synthesis of the tri-block prepolymer of the present invention is shown schematically in FIG. 1, in which a "Tellurium Mediator" is used to control the copolymerization in a TERP using azobisisobutyronitrile (AIBN). Three different reactive monomer mixtures denoted by A, B and C are added sequentially to form the corresponding segments $A_x$, $B_y$, and $C_z$, wherein x, y, and z represent the degree of polymerization or the number of repeating units in the segment. The tellurium end group of the "Tellurium-Containing Copolymer" is removed by 2,2,6,6-tetramethylpiperine 1-oxyl (TEMPO) or similar reagents to create a "Tri-block Prepolymer 1", having a polymerizable end group. Tri-block prepolymer 1 is the mono-functional or macromer version of the tri-block prepolymer of the invention. The polymerizable end group shown in FIG. 1 is the polymerizable end group associated with the repeating unit formed from 2-hydroxyethyl methacrylate and used for illustration purposes only; different monomers form different repeating units and end groups. The precursor copolymer may be further functionalized by a variety of acylation reactions involving, for example, polymerizable acylation agents, such as methacryloyl chloride as shown in FIG. 1, and the hydroxyl groups of the tri-block prepolymer 1 to form a multi-functional version of the tri-block prepolymer of the invention, namely "Tri-block Prepolymer 2."

Silicone Hydrogel

A silicone hydrogel formed from a reactive monomer mixture comprises: any tri-block prepolymer [A]-[B]-[C] disclosed herein, wherein [A] and [C] are independently polymeric segments based on a first hydrophilic monomer comprising functionality selected from the group consisting of hydroxyalkyl and aminoalkyl, and mixtures thereof and optionally one or more second hydrophilic monomer; [B] is a polymeric segment based on a silicone-containing macromer; optionally a third hydrophilic monomer comprising functionality selected from the group consisting of hydroxyalkyl, aminoalkyl, and mixtures thereof; and optionally a silicone-containing monomer; and wherein said tri-block prepolymer comprises at least one monovalent reactive group; at least one other fourth hydrophilic monomer independent of the hydrophilic monomers of the [A], [B] and [C] segments in the tri-block prepolymer; and at least one silicone-containing component independent of the tri-block prepolymer and the optional silicone-containing monomer of [B]. The silicone hydrogels may optionally comprise one or more of the following components: at least one charged monomer, at least one polyamide, and at least one cross-linking agent.

The tri-block prepolymer may be present in the reactive monomer mixture in an amount in range of about 1 weight percent to about 99 weight percent, preferably in the range of about 5 weight percent to about 40 weight percent; and most preferably in the range of about 10 weight percent to about 30 weight percent.

The fourth hydrophilic monomer may be any of the hydrophilic monomers known to be useful to make hydrogels. Examples of suitable families of hydrophilic monomers include (meth)acrylates, styrenes, vinyl ethers, (meth)acrylamides, N-vinyl lactams, N-vinyl amides, N-vinyl imides, N-vinyl ureas, O-vinyl carbamates, O-vinyl carbonates, other hydrophilic vinyl compounds, and mixtures thereof.

Non-limiting examples of hydrophilic (meth)acrylate and (meth)acrylamide monomers include: acrylamide, N-isopropyl acrylamide, N,N-dimethylaminopropyl (meth)acrylamide, N,N-dimethyl acrylamide (DMA), 2-hydroxyethyl methacrylate (HEMA), 2-hydroxypropyl (meth)acrylate, 3-hydroxypropyl (meth)acrylate, 2,3-dihydroxypropyl (meth)acrylate, 2-hydroxybutyl (meth)acrylate, 3-hydroxybutyl (meth)acrylate, 4-hydroxybutyl (meth)acrylate, N-(2-hydroxyethyl) (meth)acrylamide, N,N-bis(2-hydroxyethyl) (meth)acrylamide, N-(2-hydroxypropyl) (meth)acrylamide, N,N-bis(2-hydroxypropyl) (meth)acrylamide, N-(3-hydroxypropyl) (meth)acrylamide, N-(2-hydroxybutyl) (meth)acrylamide, N-(3-hydroxybutyl) (meth)acrylamide, N-(4-hydroxybutyl) (meth)acrylamide, 2-aminoethyl (meth)acrylate, 3-aminopropyl (meth)acrylate, 2-aminopropyl (meth)acrylate, N-2-aminoethyl (meth)acrylamides), N-3-aminopropyl (meth)acrylamide, N-2-aminopropyl (meth)acrylamide, N,N-bis-2-aminoethyl (meth)acrylamides, N,N-bis-3-aminopropyl (meth)acrylamide), N,N-bis-2-aminopropyl (meth)acrylamide, glycerol methacrylate, polyethyleneglycol monomethacrylate, (meth)acrylic acid, vinyl acetate, acrylonitrile, and mixtures thereof.

Hydrophilic monomers may also be ionic, including anionic, cationic, zwitterions, betaines, and mixtures thereof. Non-limiting examples of such charged monomers include (meth)acrylic acid, N-[(ethenyloxy)carbonyl]-β-alanine (VINAL), 3-acrylamidopropanoic acid (ACA1), 5-acrylamidopropanoic acid (ACA2), 3-acrylamido-3-methylbutanoic acid (AMBA), 2-(methacryloyloxy)ethyl trimethylammonium chloride (Q Salt or METAC), 2-acrylamido-2-m ethyl propane sulfonic acid (AMPS), 1-propanaminium, N-(2-carboxyethyl)-N,N-dimethyl-3-[(1-oxo-2-propen-1-yl)amino]-, inner salt (CBT), 1-propanaminium, N,N-dimethyl-N-[3-[(1-oxo-2-propen-1-yl)amino]propyl]-3-sulfo-, inner salt (SBT), 3,5-Dioxa-8-aza-4-phosphaundec-10-en-1-aminium, 4-hydroxy-N,N,N-trimethyl-9-oxo-, inner salt, 4-oxide (9CI) (PBT), 2-methacryloyloxyethyl phosphorylcholine, 3-(dimethyl(4-vinylbenzyl)ammonio)propane-1-sulfonate (DMVBAPS), 3-acrylamidopropyl)dimethylammonio)propane-1-sulfonate (AMPDAPS), 3-methacrylamidopropyl)dimethylammonio)propane-1-sulfonate (MAMPDAPS), 3-((3-(acryloyloxy)propyl)dimethylammonio)propane-1-sulfonate (APDAPS), and methacryloyloxy)propyl)dimethylammonio)propane-1-sulfonate (MAPDAPS).

Non-limiting examples of hydrophilic N-vinyl lactam and N-vinyl amide monomers include: N-vinyl pyrrolidone (NVP), N-vinyl-2-piperidone, N-vinyl-2-caprolactam, N-vinyl-3-methyl-2-caprolactam, N-vinyl-3-methyl-2-piperidone, N-vinyl-4-methyl-2-piperidone, N-vinyl-4-methyl-2-caprolactam, N-vinyl-3-ethyl-2-pyrrolidone, N-vinyl-4,5-dimethyl-2-pyrrolidone, N-vinyl acetamide (NVA), N-vinyl-N-methylacetamide (VMA), N-vinyl-N-ethyl acetamide, N-vinyl-N-methyl formamide, N-vinyl formamide, N-vinyl-N-methylpropionamide, N-vinyl-N-methyl-2-methylpropionamide, N-vinyl-2-methylpropionamide, N-vinyl-N,N'-dimethylurea, 1-methyl-3-methylene-2-pyrrolidone, 1-methyl-5-methylene-2-pyrrolidone, 5-methyl-3-methylene-2-pyrrolidone; 1-ethyl-5-methylene-2-pyrrolidone, N-methyl-3-methylene-2-pyrrolidone, 5-ethyl-3-methylene-2-pyrrolidone, 1-N-propyl-3-methylene-2-pyrrolidone, 1-N-propyl-5-methylene-2-pyrrolidone, 1-isopropyl-3-methylene-2-pyrrolidone, 1-isopropyl-5-methylene-2-pyrrolidone, N-vinyl-N-ethyl acetamide, N-vinyl-N-ethyl formamide, N-vinyl formamide, N-vinyl isopropylamide, N-vinyl caprolactam, N-vinylimidazole, and mixtures thereof.

Non-limiting examples of hydrophilic O-vinyl carbamates and O-vinyl carbonates monomers include N-2-hydroxyethyl vinyl carbamate and N-carboxy-β-alanine N-vinyl ester. Further examples of hydrophilic vinyl carbonate or vinyl carbamate monomers are disclosed in U.S. Pat. No. 5,070,215. Hydrophilic oxazolone monomers are disclosed in U.S. Pat. No. 4,910,277.

Other hydrophilic vinyl compounds include ethylene glycol vinyl ether (EGVE), di(ethylene glycol) vinyl ether (DEGVE), allyl alcohol, and 2-ethyl oxazoline.

The fourth hydrophilic monomers may also be macromers or prepolymers of linear or branched poly(ethylene glycol), poly(propylene glycol), or statistically random or block copolymers of ethylene oxide and propylene oxide, having polymerizable moieties such as (meth)acrylates, styrenes, vinyl ethers, (meth)acrylamides, N-vinylamides, and the like. The macromers of these polyethers have one monovalent reactive group; the prepolymers have two or more reactive groups.

The preferred fourth hydrophilic monomers of the present invention are DMA, NVP, HEMA, VMA, NVA, and mixtures thereof. Other suitable hydrophilic monomers will be apparent to one skilled in the art.

Generally there are no particular restrictions with respect to the amount of the fourth hydrophilic monomer present in the reactive monomer mixture. The amount of the hydrophilic monomers may be selected based upon the desired characteristics of the resulting hydrogel, including water content, clarity, wettability, protein uptake, and the like. Wettability may be measured by contact angle, and desirable contact angles are less than about 100°, less than about 80°, and less than about 60°. The hydrophilic monomer may be present in an amount in the range of about 0.1 to about 80 weight percent, including in the range of about 5 to about 65 weight percent, and in the range of about 10 to about 45 weight percent, based on the total weight of the reactive components in the reactive monomer mixture.

Silicone-Containing Component

The silicone-containing component may be a monomer or macromer and may comprise at least one monovalent reactive group and at least one siloxy, siloxane, or carbosiloxane group. The silicone-containing components may have at least four repeating siloxane units, which may be any of the groups defined below. The silicone-containing component may also contain at least one fluorine atom.

The silicone-containing component may be selected from the polydisubstituted siloxane macromer of Formula XVII

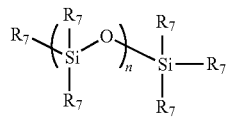

Formula XVII wherein at least one $R_7$ is a monovalent reactive group and the remaining $R_7$ groups are independently selected from monovalent reactive groups; monovalent alkyl groups; or monovalent aryl groups; of which any of the foregoing may further comprise functionality selected from hydroxy, amino, oxa, carboxy, alkyl carboxy, alkoxy, amido, carbamate, carbonate, halogen or combinations thereof; fluoroalkyl alkyl or aryl groups; partially fluorinated alkyl or aryl groups; halogens; linear, branched or cyclic alkoxy or aryloxy groups; linear or branched polyethyleneoxyalkyl groups, polypropyleneoxyalkyl groups, or poly(ethyleneoxy-co-propyleneoxyalkyl groups; and monovalent siloxane chains comprising between one and one hundred siloxane repeating units which may further comprise functionality selected from alkyl, alkoxy, hydroxy, amino, oxa, carboxy, alkyl carboxy, amido, carbamate, halogen or combinations thereof; wherein n is 0 to 500 or 0 to 200, or 0 to 100, or 0 to 20, where it is understood that when n is other than zero, n is the mode best representing the number average molecular weight of the macromer.

In Formula XVII, one to three $R_7$ moieties may comprise monovalent reactive groups. Suitable monovalent alkyl and aryl groups include un-substituted and substituted linear, branched or cyclic $C_1$ to $C_6$ alkyl groups, such as substituted and unsubstituted methyl, ethyl, propyl, butyl, substituted or unsubstituted $C_6$-$C_{14}$ aryl groups, or a substituted or un-substituted $C_6$ aryl group, wherein the substituents include amido, ether, amino, halo, hydroxyl, carboxyl, carbonyl groups; or a phenyl or benzyl group, combinations thereof and the like.

When one $R_7$ is a monovalent reactive group, the silicone containing compounds may be selected from the polydis-ubstituted siloxane macromer of Formula I, or the polydisubstituted carbosiloxane macromer of Formula XI, or styryl polydisubstituted siloxane macromer of Formula XVI.

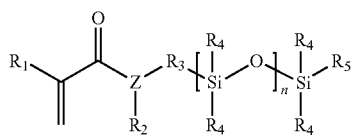

Formula I

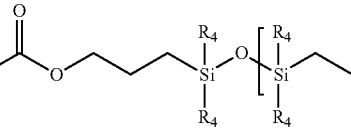

Formula XI

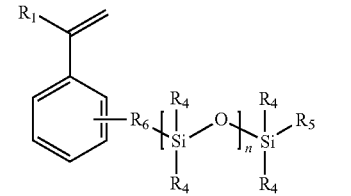

Formula XVI wherein Z is selected from O, N, S or $NCH_2CH_2O$; when Z=O or S, $R_2$ is not required; wherein $R_1$ is a hydrogen atom or methyl; wherein n is a whole number between 1 and 200; 1 and 100; 4 and 50; or 5 and 25; wherein $R_3$ is an alkylene segment $(CH_2)_3$, in which y is a whole number from 1 to 6, 1 to 4, and 2 to 4, and each methylene group may be optionally further and independently substituted with a group selected from the group consisting of ethers, amines, esters, ketones, carbonyls, carboxylates, and carbamates; or wherein $R_3$ is an oxyalkylene segment $O(CH_2)_z$ in which z is a whole number from 1 to 3, or wherein $R_3$ is a mixture of alkylene and oxyalkylene segments and the sum of y and z is between 1 and 9; wherein $R_2$ and $R_4$ are independently a hydrogen atom, a linear, branched, or cyclic alkyl group containing between one and six carbon atoms, a linear, branched, or cyclic alkoxy group containing between one and six carbon atoms, a linear or branched polyethyelenoxyalkyl group, a phenyl group, a benzyl group, a substituted or un-substituted aryl group, a fluoroalkyl group, a partially fluorinated alkyl group, a perfluoroalkyl group, a fluorine atom, or combinations thereof; and wherein $R_5$ is a substituted or un-substituted linear, branched, or cyclic alkyl group having 1 to 8 carbon atoms or an aryl group, any of which may be further substituted with one or more fluorine atoms or trimethylsiloxy groups; and wherein $R_6$ is an alkylene segment $(CH_2)_3$, in which y is a whole number from 0 to 6, 0 to 4, and 0 to 2, and each methylene group may be optionally further and independently substituted with a group selected from the group consisting of ethers, amines, alcohols, esters, carbonyls, carboxylates, and carbamates.

When one $R_7$ is a monovalent reactive group, additional silicone containing compounds may be selected from the polydisubstituted siloxane macromers of Formulae XVIII-XX.

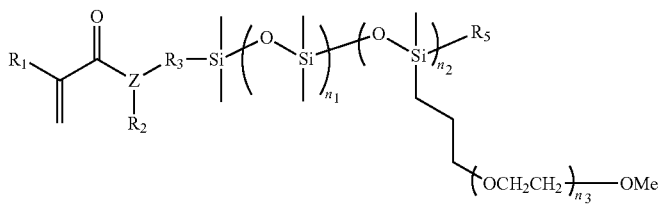

Formula XVIII

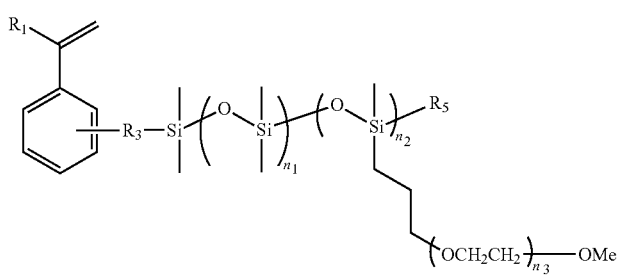

Formula XIX

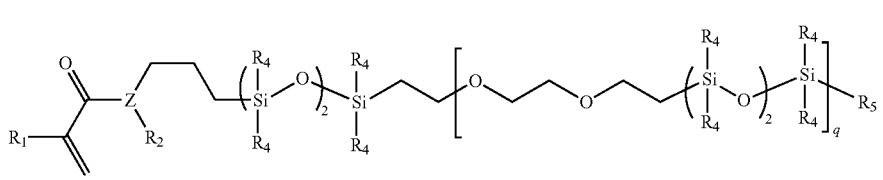

Formula XX wherein Z is selected from O, N, S or NCH$_2$CH$_2$O; when Z=O or S, R$_2$ is not required; wherein R$_1$ is a hydrogen atom or methyl; wherein n$_1$ and n$_2$ are independently whole numbers between 1 and 200; 1 and 100; 4 and 50; or 5 and 25; wherein n$_3$ is a whole number between 1 and 50; 1 and 20; or 1 and 10; wherein q is a whole number between 1 and 50; 5 and 30; or 10 and 25; wherein R$_3$ is an alkylene segment (CH$_2$)$_y$ in which y is a whole number from 1 to 6, 1 to 4, and 2 to 4, and each methylene group may be optionally further and independently substituted with a group selected from the group consisting of ethers, amines, esters, ketones, carbonyls, carboxylates, and carbamates; or wherein R$_3$ is an oxyalkylene segment O(CH$_2$)$_z$ in which z is a whole number from 1 to 3, or wherein R$_3$ is a mixture of alkylene and oxyalkylene segments and the sum of y and z is between 1 and 9; wherein R$_2$ and R$_4$ are independently a hydrogen atom, a linear, branched, or cyclic alkyl group containing between one and six carbon atoms, a linear, branched, or cyclic alkoxy group containing between one and six carbon atoms, a linear or branched polyethyelenoxyalkyl group, a phenyl group, a benzyl group, a substituted or un-substituted aryl group, a fluoroalkyl group, a partially fluorinated alkyl group, a perfluoroalkyl group, a fluorine atom, or combinations thereof; and wherein R$_5$ is a substituted or un-substituted linear, branched, or cyclic alkyl group having 1 to 8 carbon atoms or an aryl group, any of which may be further substituted with one or more fluorine atoms or trimethylsiloxy groups Non-limiting examples of these silicone-containing macromers include mono-n-alkyl terminated mono-methacryloxypropyl terminated polydimethylsiloxanes as shown below in Formula II wherein n is between 3 and 50; between 3 and 25; and between 3 and 15 and R$_5$ is a linear, branched, or cyclic alkyl group containing between 1 and 8 carbon atoms; mono-n-butyl terminated mono-methacryloxypropyl terminated polydimethylsiloxanes (mPDMS) as shown in Formula III wherein n is between 3 and 50; between 3 and 25; and between 3 and 15; and macromers having the chemical structures as shown in Formulae IV through XI as well as Formula XXI, wherein R$_1$ is a hydrogen atom or methyl group; R$_2$ and R$_4$ are independently a hydrogen atom, a linear, branched, or cyclic alkyl group containing between one and six carbon atoms, a linear, branched, or cyclic alkoxy group containing between one and six carbon atoms, a linear or branched polyethyelenoxyalkyl group, a phenyl group, a benzyl group, a substituted or un-substituted aryl group, a fluoroalkyl group, a partially fluorinated alkyl group, a perfluoroalkyl group, a fluorine atom, or combinations thereof; and R$_5$ is a linear, branched, or cyclic alkyl group containing between 1 and 8 carbon atoms; and wherein n is between 3 and 50; between 3 and 25; or between 3 and 15 and m is between 1 and 50; 1 and 20; or 1 and 10.

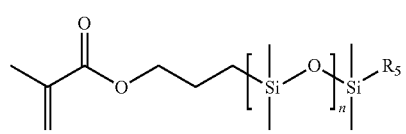

Formula II

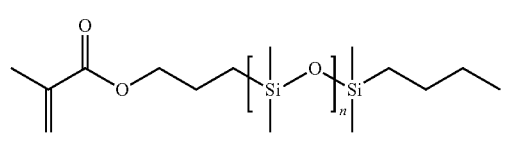

(mPDMS)

Formula III

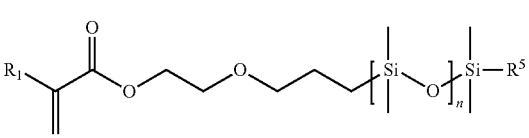

Formula IV

Formula V
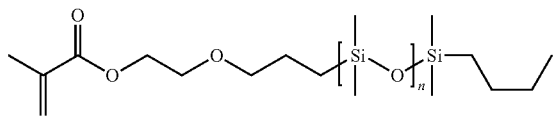

Formula VI
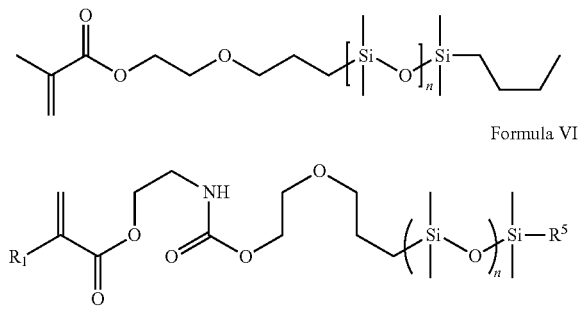

Formula VII
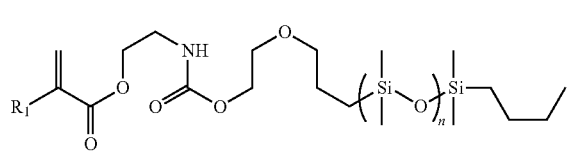

Formula VIII
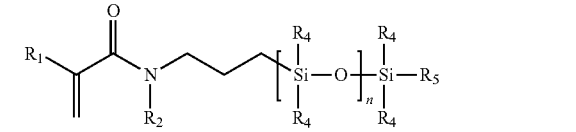

Formula IX
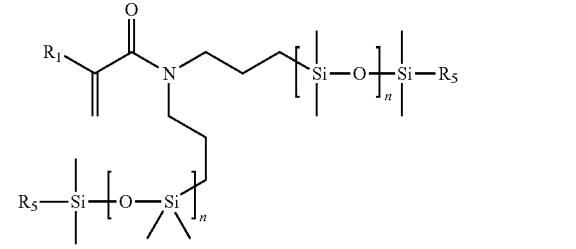

Formula IX
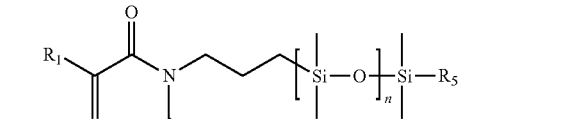

Formula X

Formula XI
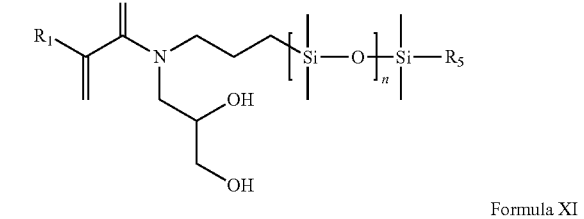

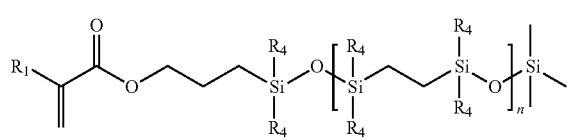

Examples of suitable mono(meth)acryloxyalkylpolydialkylsiloxanes include mono(meth)acryloxypropyl terminated mono-n-butyl terminated polydimethylsiloxane, mono(meth)acryloxypropyl terminated mono-n-methyl terminated polydimethylsiloxane, mono(meth)acryloxypropyl terminated mono-n-butyl terminated polydiethylsiloxane, mono(meth)acryloxypropyl terminated mono-n-methyl terminated polydiethylsiloxane, mono(meth)acrylamidoalkylpolydialkylsiloxanes, mono(meth)acryloxyalkyl terminated mono-alkyl polydiarylsiloxanes, and mixtures thereof.

Examples of styryl macromers are shown below in chemical formulae XXII-XXVII wherein n is a whole number between 1 and 200; 1 and 100; 4 and 50; or 5 and 25.

Formula XXII
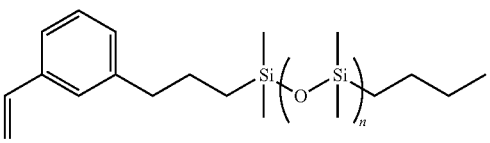

Formula XXIII
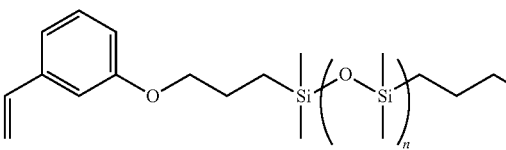

Formula XXIV
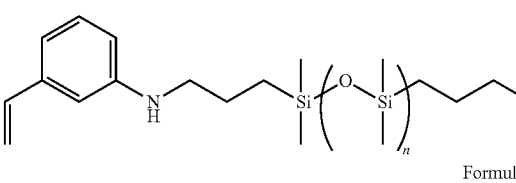

Formula XV
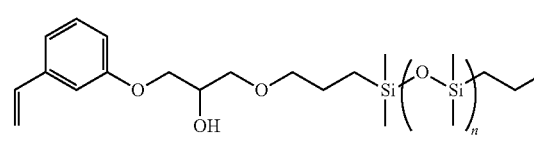

Formula XXVI
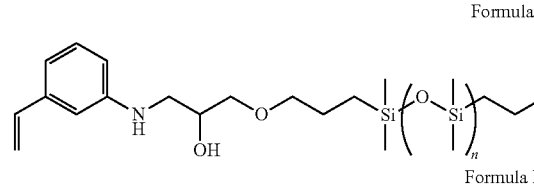

Formula XXVII
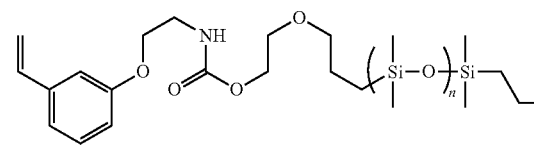

The non-hydroxyl silicone-containing components may be di-functional (crosslinking agents) or multi-functional (prepolymers). Examples of such di-functional silicone components are shown in chemical Formulae XXVIII-XXXII, wherein Z is selected from O, N, S or NCH$_2$CH$_2$O; when Z=O or S, R$_2$ is not required; wherein R$_1$ is a hydrogen atom or methyl; wherein R$_2$ and R$_4$ are independently a hydrogen atom, a linear, branched, or cyclic alkyl group containing between one and six carbon atoms, a linear, branched, or cyclic alkoxy group containing between one and six carbon atoms, a linear or branched polyethyelenoxyalkyl group, a phenyl group, a benzyl group, a substituted or un-substituted aryl group, a fluoroalkyl group, a partially fluorinated alkyl group, a perfluoroalkyl group, or a fluorine atom; wherein $n_1$ and $n_2$ are independently selected from 4 to 100; 4 to 50; or 4 to 25; wherein $n_3$ is selected from 1 to 50; or 1 to 20; wherein m is selected from 1 to 100; 1 to 50; 1 to 20; or 1-10; and wherein q is selected from 1 to 50; 5 to 30; or 10 to 25.

The silicone-containing vinyl carbonate or vinyl carbamate monomers specifically include 1,3-bis[4-(vinyloxycarbonyloxy)but-1-yl]tetramethyl-disiloxane; 3-(vinyloxycarbonylthio) propyl-[tris(trimethylsiloxy)silane]; 3-[tris (trimethylsiloxy)silyl] propyl allyl carbamate; 3-[tris (trimethylsiloxy)silyl] propyl vinyl carbamate; trimethylsilylethyl vinyl carbonate; trimethylsilylmethyl vinyl carbonate, and the cross-linking agent of Formula XXXIV.

Formula XXVIII
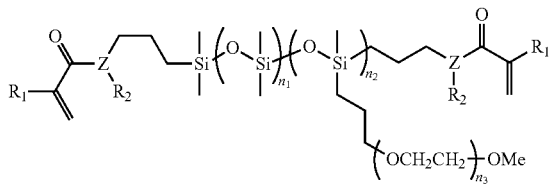

Formula XXIX
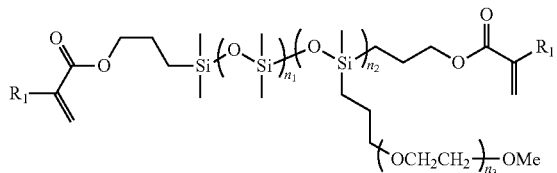

Formula XXX
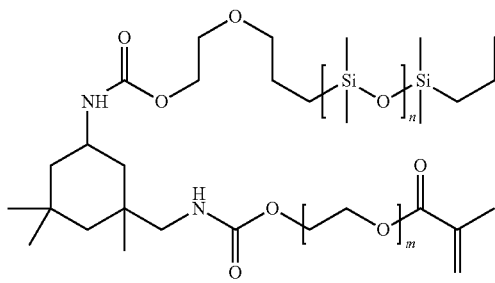

Formula XXXI
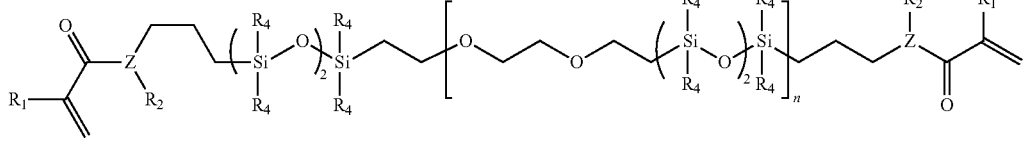

Formula XXXII
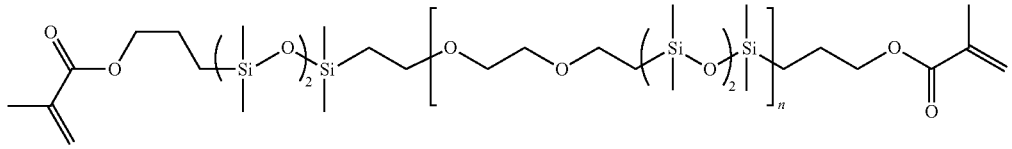

One to four $R_7$ in Formula XVII may comprise a vinyl carbonate or vinyl carbamate moiety having a chemical structure as illustrated in Formula XXXIII, wherein Y denotes O, S or NH and $R_1$ denotes a hydrogen atom or methyl group; and p is 0 or 1.

Formula XXXIII
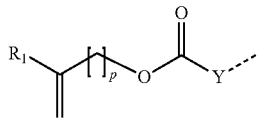

Formula XXXIV
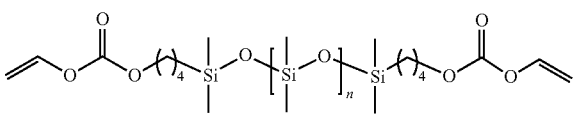

Another suitable silicone-containing macromer is the compound depicted in Formula XXXV in which the sum of x and y is a number in the range of 10 to 30 formed by the reaction of fluoroether, hydroxy-terminated polydimethylsiloxane, isophorone diisocyanate and isocyanatoethylmethacrylate.

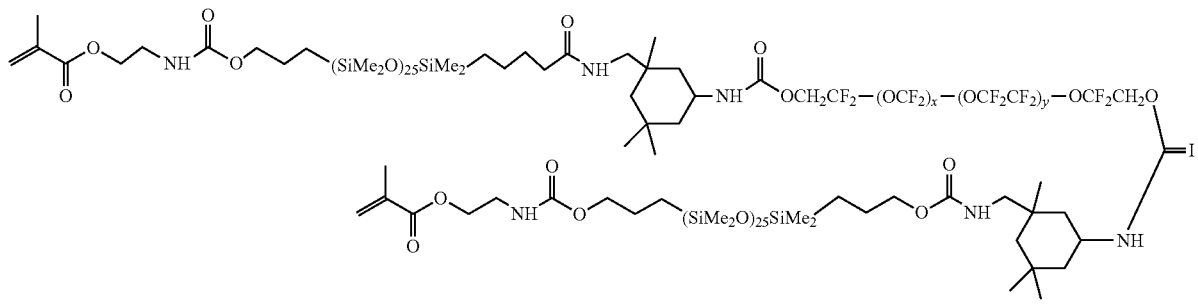

Formula XXXV

The non-hydroxyl containing silicone-containing component may be selected from non-hydroxyl containing acrylamide silicones of U.S. Pat. No. 8,415,405. Other silicone components suitable for use in this invention include those described is WO 96/31792 such as macromers containing polysiloxane, polyalkylene ether, diisocyanate, polyfluorinated hydrocarbon, polyfluorinated ether and polysaccharide groups. Another class of suitable silicone-containing components includes silicone-containing macromers made via GTP, such as those disclosed in U.S. Pat. Nos. 5,314,960, 5,331,067, 5,244,981, 5,371,147, and 6,367,929. U.S. Pat. Nos. 5,321,108, 5,387,662, and 5,539,016 describe polysiloxanes with a polar fluorinated graft or side group having a hydrogen atom attached to a terminal difluoro-substituted carbon atom. U.S. Patent Application Publication No. 2002/0016383 describes hydrophilic siloxanyl methacrylates containing ether and siloxanyl linkages and crosslinkable monomers containing polyether and polysiloxanyl groups. Any of the foregoing polysiloxanes can also be used as the silicone-containing component in this invention.

The non-hydroxyl containing silicone component may be selected from the group consisting of monomethacryloxypropyl terminated, mono-n-alkyl terminated linear polydialkylsiloxane, dimethacryloxypropyl-terminated linear polydialkylsiloxane, and mixtures thereof. The non-hydroxyl containing silicone component may also be selected from monomethacrylate terminated polydimethylsiloxanes; and mixtures thereof. The non-hydroxyl containing silicone component may have an average molecular weight of from about 400 to about 4000 Daltons.

The silicone-containing component may be present in an amount in the range of about 0.1 to about 60 weight percent and preferably in the range of about 10 to about 50 weight percent, based on the total weight of the reactive components in the reactive monomer mixture.

The elemental Si content of the hydroxyl-containing silicone component is greater than about 20 weight percent; between about 20 to about 38 weight percent of the total molecular weight of the hydroxyl-containing silicone component.

Hydroxyl-containing silicone components include monofunctional hydroxyl-substituted poly(dialkylsiloxane)s of Formula XII

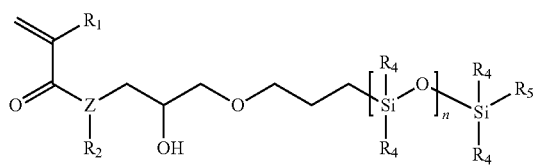

Formula XII wherein Z is selected from O, N, S or $NCH_2CH_2O$; when Z=O or S, $R_2$ is not required; wherein $R_1$ is a hydrogen atom or methyl; wherein n is a whole number between 1 and 200; wherein $R_2$ and $R_4$ are independently a hydrogen atom, a linear, branched, or cyclic alkyl group containing between one and six carbon atoms, a linear, branched, or cyclic alkoxy group containing between one and six carbon atoms, a linear or branched polyethyelenoxyalkyl group, a phenyl group, a benzyl group, a substituted or un-substituted aryl group, a fluoroalkyl group, a partially fluorinated alkyl group, a perfluoroalkyl group, a fluorine atom, or combinations thereof; and wherein $R_5$ is a substituted or un-substituted linear, branched, or cyclic alkyl group having 1 to 8 carbon atoms or an aryl group, any of which may be further substituted with one or more fluorine atoms or trimethylsiloxy groups.

Examples of hydroxyl containing silicone components include the macromers shown in Formulae X, XIII, XIV, and XV. One preferred macromer is mono-(2-hydroxy-3-methacryloxypropyl)propyl ether terminated mono-n-butyl terminated polydimethylsiloxanes (OH-mPDMS) as shown in Formula XIII. Other non-limiting examples of hydroxyl containing silicone macromers are shown in Formulae XXXVI-XXXX, wherein $R_1$ is a hydrogen atom or methyl; wherein $n_1$ $n_2$, and $n_3$ are independently between 4 to 100; 4 to 50; or 4 to 25; $R_2$ and $R_4$ are independently a hydrogen atom, a linear, branched, or cyclic alkyl group containing between one and six carbon atoms, a linear, branched, or cyclic alkoxy group containing between one and six carbon atoms, a linear or branched polyethyelenoxyalkyl group, a phenyl group, a benzyl group, a substituted or un-substituted aryl group, a fluoroalkyl group, a partially fluorinated alkyl group, a perfluoroalkyl group, a fluorine atom, polyhydroxyl groups selected from straight or branched $C_1$ to $C_8$ groups having a formula of $C_fH_g(OH)_h$ wherein f=1-8 and g+h=2f+1 and cyclic $C_1$ to $C_8$ groups having a formula of $C_fH_g(OH)_h$ wherein f=1-8 and g+h=2f-1, and combinations thereof; or $R_5$ may be selected from methyl, butyl or hydroxyl substituted $C_2$-$C_5$ alkyl, including hydroxyl ethyl, hydroxyl propyl, hydroxyl butyl, hydroxyl pentyl and 2,3-dihydroxypropyl, and wherein a and b are between 4-100; 4-50; 4-25; or 4-8.

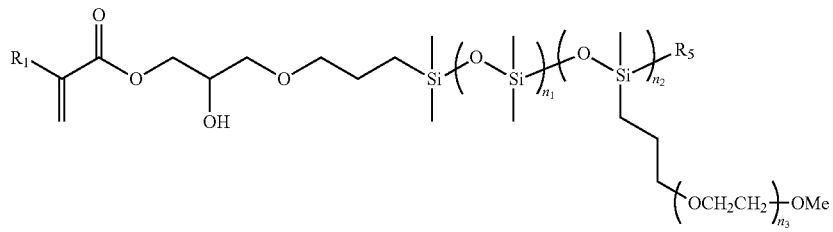

Formula XXXVI

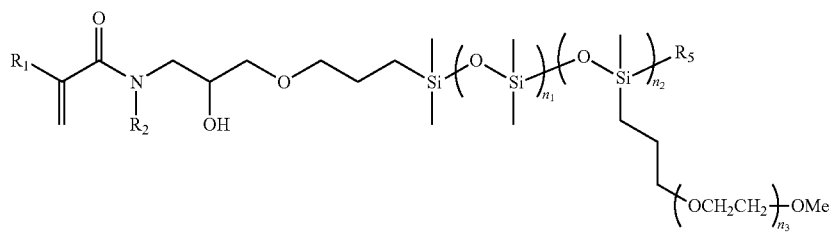

Formula XXXVII

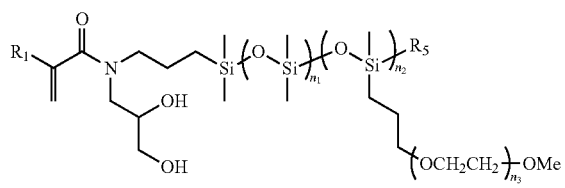

Formula XXXVIII

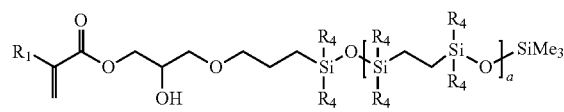

Formula XXXIX

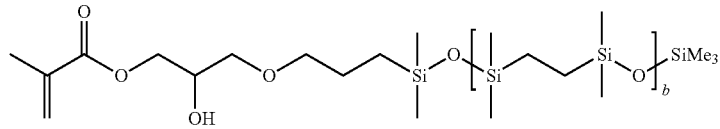

Formula XXXX

The silicone-containing component may also be a di-functional hydroxyl-substituted poly(dialkylsiloxane) as shown schematically in Formula XXXXI, and mixtures thereof.

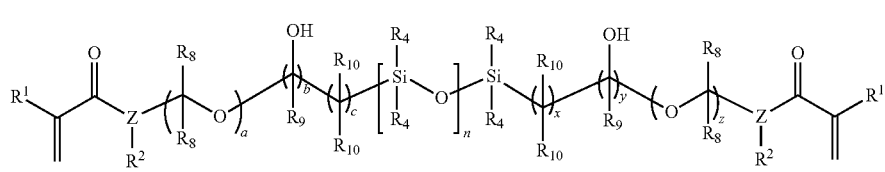

Formula XXXXI wherein Z is selected from O, N, S or $NCH_2CH_2O$; wherein $R_1$ is independently a hydrogen atom or methyl group; for Z=O and S, $R_2$ is not required; wherein $R_2$, $R_4$, $R_5$, $R_9$, and $R_{10}$ are independently a hydrogen atom; a linear, branched, or cyclic alkyl group containing one to eight carbon atoms, any of which may be further substituted with at least one hydroxy group, which may be optionally substituted with amido, ether, amino, carboxyl, carbonyl groups and combinations; a linear or branched alkyleneoxy group, specifically ethyleneoxy groups, $[CH_2CH_2O]_r$ wherein r is between 1 and 200, or 1 and 100, or 1 and 50, or 1 and 25, or 1 and 20, optionally substituted with one or more hydroxyl, amino, amido, ether, carbonyl, carboxyl, and combinations thereof;

a $C_1$-$C_6$ linear or branched fluoroalkyl groups optionally substituted with one or more hydroxyl, amino, amido, ether, carbonyl, carboxyl, and combinations thereof; a substituted or un-substituted aryl groups, specifically phenyl groups, wherein the substituents are selected from halogen, hydroxyl, alkoxy, alkylcarbonyl, carboxy, and linear or branched or cyclic alkyl groups which may be further substituted with halogen, hydroxyl, alkoxy, alkylcarbonyl, and carboxyl groups, and combinations thereof; and wherein a, b, c, x, y and z are independently between 0 and 100, between 0 and 50, between 0 and 20, between 0 and 10, or between 0 and 5 and may be ordered in any molecular sequence to make a wide range of substituted hydroxyl-oxa-alkylene chains; and wherein n is the number of siloxane repeating units and is from 10 to 500; 10 to 200; 10 to 100; 10 to 50; or 10 to 20.

More particularly, the silicone component may comprise a mixture of a first mono-functional hydroxyl-substituted poly(dialkylsiloxane) of Formula VIII wherein n is from 4 to 8 siloxane repeating units and a second hydroxyl-substituted, poly(dialkylsiloxane) selected from the group consisting of a monofunctional hydroxyl-substituted poly(dialkylsiloxane) of Formula VIII, wherein n is from 10 to 20 siloxane repeating units, a di-functional hydroxyl-substituted poly(dialkylsiloxane) of Formula XXXXII, and mixtures thereof.

methyl group; wherein $R_2$ is independently a hydrogen atom; a linear, branched, or cyclic alkyl group containing one to eight carbon atoms, any of which may be further substituted with at least one hydroxy group, which may be optionally substituted with amido, ether, amino, carboxyl, carbonyl groups and combinations; a linear or branched

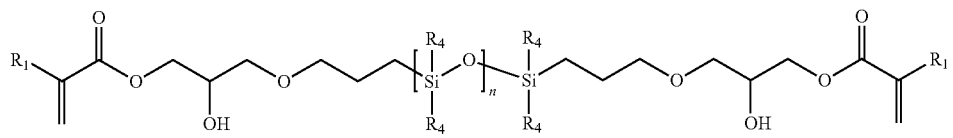

Formula XXXXII wherein $R_1$ is independently a hydrogen atom or methyl group; wherein $R_4$ is independently a linear, branched, or cyclic alkyl group containing one to eight carbon atoms, any of which may be further substituted with at least one hydroxy group, and which may be optionally substituted with amido, ether, amino, carboxyl, carbonyl groups and combinations thereof; wherein n is selected from 10 to 500; 10 to 200; 10 to 100; 10 to 50; 10 to 20.

Examples of multifunctional hydroxyl containing silicones include α-(2-hydroxy-1-methacryloxypropyloxypropyl)-ω-butyl-decamethylpentasiloxane and the difunctional polysiloxanes of Formulae XXXXIII and XXXXV, wherein n, $n_1$, $n_2$, $n_3$, a, b, and c are independently between 0 and 200; 0 and 100; 0 and 50; or 0 and 20; wherein Z is selected from O, N, S or $NCH_2CH_2O$; for Z=O and S, $R_2$ is not required; wherein $R_1$ is independently a hydrogen atom or alkyleneoxy group, specifically ethyleneoxy groups, $[CH_2CH_2O]_r$, wherein r is between 1 and 200, or 1 and 100, or 1 and 50, or 1 and 25, or 1 and 20, optionally substituted with one or more hydroxyl, amino, amido, ether, carbonyl, carboxyl, and combinations thereof; a $C_1$-$C_6$ linear or branched fluoroalkyl groups optionally substituted with one or more hydroxyl, amino, amido, ether, carbonyl, carboxyl, and combinations thereof; a substituted or un-substituted aryl groups, specifically phenyl groups, wherein the substituents are selected from halogen, hydroxyl, alkoxy, alkylcarbonyl, carboxy, and linear or branched or cyclic alkyl groups which may be further substituted with halogen, hydroxyl, alkoxy, alkylcarbonyl, and carboxyl groups, and combinations thereof.

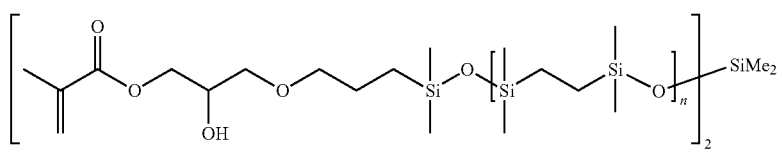

Formula XXXXIII

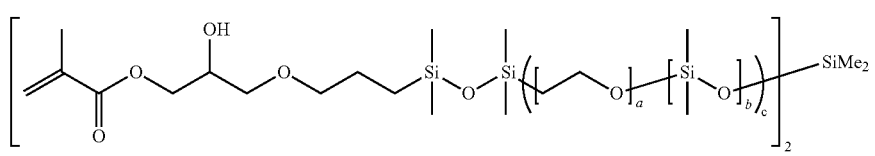

Formula XXXXIV

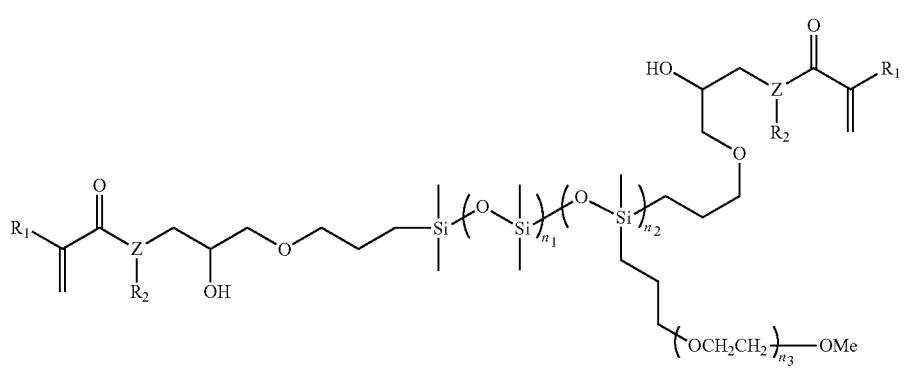

Formula XXXXV

The silicone-containing component may be present in an amount in the range of about 0.1 to about 60 weight percent and preferably in the range of about 10 to about 50 weight percent, based on the total weight of the reactive components in the reactive monomer mixture.

The silicone-containing component may further include silicone-containing monomers with branched siloxane groups. Examples include tris(trimethylsiloxy)silylstyrene (Styryl-TRIS), 3-tris(trimethylsiloxy)silylpropyl methacrylate (TRIS), N-[3-tris(trimethylsiloxy)silyl]-propyl acrylamide (TRIS-Am), 2-hydroxy-3-[3-methyl-3,3-di(trimethylsiloxy)silylpropoxy]-propyl methacrylate (SiMAA or SiGMA), and other bulky silicone monomers, such as those in Formulae XXXXVI-LIV, wherein $R_{11}$ is independently linear, branched, or cyclic alkyl groups containing between one and eight carbon atoms, or a trimethylsiloxy group.

Formula XXXXVI

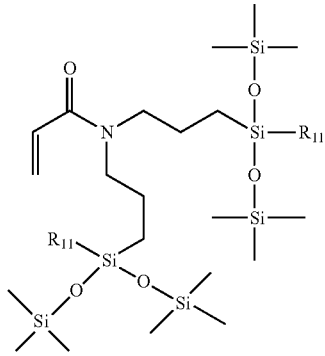

Formula XXXXVII

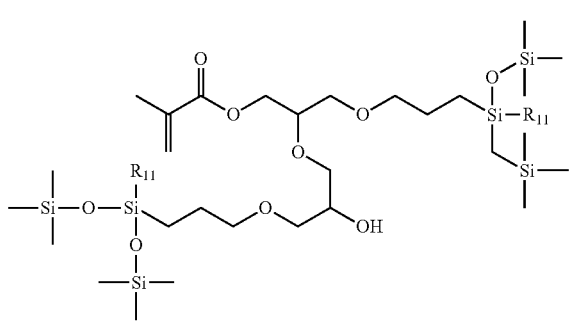

Formula XXXXVIII

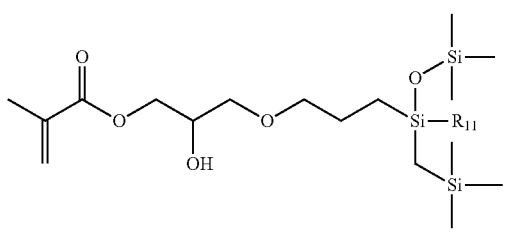

Formula XXXXIX

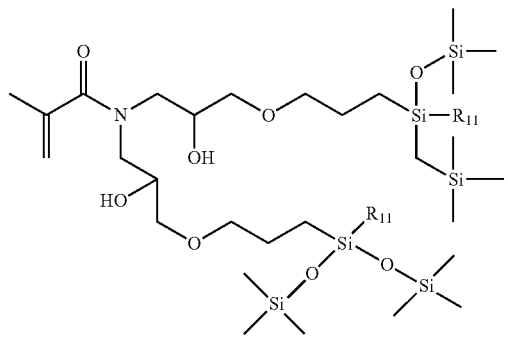

Formula L

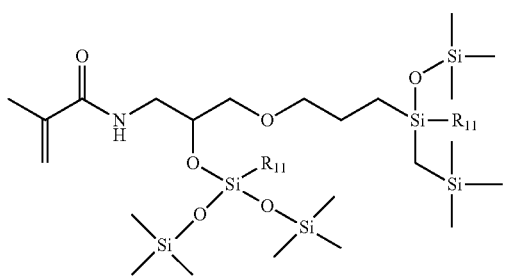

Formula LI

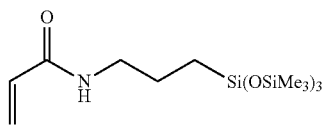

Formula LII

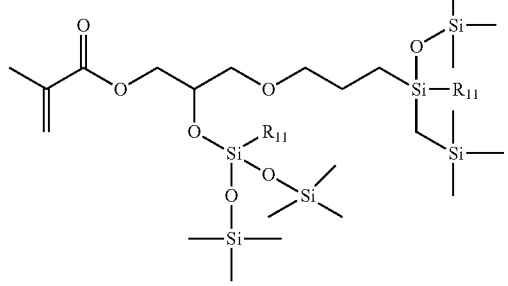

Formula LIII

Formula LIV

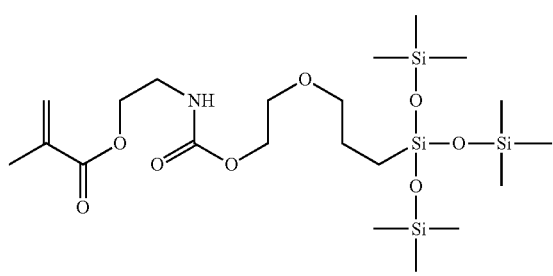

Polyamides

The reactive monomer mixture may include at least one polyamide. As used herein, the term "polyamide" refers to polymers and copolymers comprising repeating units containing amide groups. The polyamide may comprise cyclic amide groups, acyclic amide groups and combinations thereof and may be any polyamide known to those of skill in the art.

Acyclic polyamides comprise pendant acyclic amide groups and are capable of association with hydroxyl groups. Cyclic polyamides comprise cyclic amide groups and are capable of association with hydroxyl groups.

Examples of suitable acyclic polyamides include polymers and copolymers comprising repeating units of Formulae LV and LVI Formula LV

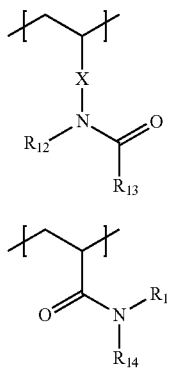

Formula LVI

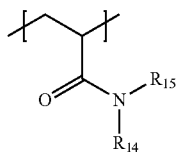

wherein X is a direct bond, —(CO)—, or —(CONHR$_{16}$)—, wherein R$_{16}$ is a C$_1$ to C$_3$ alkyl group; R$_{12}$ is selected from H, straight or branched, substituted or unsubstituted C$_1$ to C$_4$ alkyl groups; R$_{13}$ is selected from H, straight or branched, substituted or unsubstituted C$_1$ to C$_4$ alkyl groups, amino groups having up to two carbon atoms, amide groups having up to four carbon atoms, and alkoxy groups having up to two carbon groups; R$_{14}$ is selected from H, straight or branched, substituted or unsubstituted C$_1$ to C$_4$ alkyl groups; or methyl, ethoxy, hydroxyethyl, and hydroxymethyl; R$_{15}$ is selected from H, straight or branched, substituted or unsubstituted C$_1$ to C$_4$ alkyl groups; or methyl, ethoxy, hydroxyethyl, and hydroxymethyl; wherein the number of carbon atoms in R$_{12}$ and R$_{13}$ taken together is 8 or less, including 7, 6, 5, 4, 3, or less; and wherein the number of carbon atoms in R$_{14}$ and R$_{15}$ taken together is 8 or less, including 7, 6, 5, 4, 3, or less. The number of carbon atoms in R$_{12}$ and R$_{13}$ taken together may be 6 or less or 4 or less. The number of carbon atoms in R$_{14}$ and R$_{15}$ taken together may be 6 or less. As used herein substituted alkyl groups include alkyl groups substituted with an amine, amide, ether, hydroxyl, carbonyl or carboxy groups or combinations thereof.

R$_{12}$ and R$_{13}$ can be independently selected from H, substituted or unsubstituted C$_1$ to C$_2$ alkyl groups. X may be a direct bond, and R$_{16}$ and R$_{17}$ may be independently selected from H, substituted or unsubstituted C$_1$ to C$_2$ alkyl groups.

R$_{14}$ and R$_{15}$ can be independently selected from H, substituted or unsubstituted C$_1$ to C$_2$ alkyl groups, methyl, ethoxy, hydroxyethyl, and hydroxymethyl.

The acyclic polyamides of the present invention may comprise a majority of the repeating units of Formula LV or Formula LVI, or the acyclic polyamides can comprise at least 50 mole percent of the repeating unit of Formula LV or Formula LVI, including at least 70 mole percent, and at least 80 mole percent.

Specific examples of repeating units of Formula LV and Formula LVI include repeating units derived from N-vinyl-N-methylacetamide, N-vinylacetamide, N-vinyl-N-methyl-propionamide, N-vinyl-N-methyl-2-methylpropionamide, N-vinyl-2-methyl-propionamide, N-vinyl-N,N'-dimethylurea, N,N-dimethylacrylamide, methacrylamide, and acyclic amides of Formulae LVII and LVIII:

Formula LVII

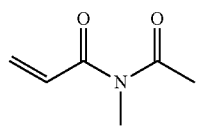

Formula LVIII

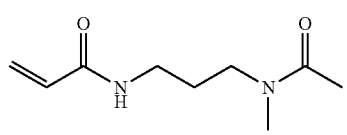

Examples of suitable cyclic amides that can be used to form the cyclic polyamides of include α-lactam, β-lactam, γ-lactam, δ-lactam, and ε-lactam. Examples of suitable cyclic polyamides include polymers and copolymers comprising repeating units of Formula LIX:

Formula LIX

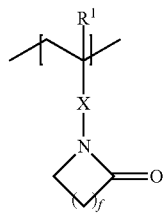

wherein R$_1$ is a hydrogen atom or methyl group; wherein f is a number from 1 to 10; wherein X is a direct bond, —(CO)—, or —(CONHR$_{16}$)—, wherein R$_{16}$ is a C$_1$ to C$_3$ alkyl group. In Formula LIXI, f may be 8 or less, including 7, 6, 5, 4, 3, 2, or 1. In Formula LIX, f may be 6 or less, including 5, 4, 3, 2, or 1. In Formula LIX, f may be from 2 to 8, including 2, 3, 4, 5, 6, 7, or 8. In Formula LIX, f may be 2 or 3.

When X is a direct bond, f may be 2. In such instances, the cyclic polyamide may be PVP.

The cyclic polyamides of the present invention may comprise 50 mole percent or more of the repeating unit of Formula LIX, or the cyclic polyamides can comprise at least 50 mole percent of the repeating unit of Formula LIX, including at least 70 mole percent, and at least 80 mole percent.

Specific examples of repeating units of Formula LIX include repeating units derived from polyvinylpyrrolidone (PVP).

The polyamides may also be copolymers comprising repeating units of both cyclic and acyclic amides. Additional repeating units may be formed from monomers selected from hydroxyalkyl(meth)acrylates, alkyl(meth)acrylates, other hydrophilic monomers and siloxane substituted (meth) acrylates. Any of the monomers listed as suitable hydrophilic monomers may be used as comonomers to form the additional repeating units. Specific examples of additional monomers which may be used to form polyamides include 2-hydroxyethyl (meth)acrylate, vinyl acetate, acrylonitrile, hydroxypropyl (meth)acrylate, methyl (meth)acrylate and hydroxybutyl (meth)acrylate, dihydroxypropyl (meth)acrylate, polyethylene glycol mono(meth)acrylate, and the like and mixtures thereof. Ionic monomers may also be included. Examples of ionic monomers include (meth)acrylic acid, N-[(ethenyloxy)carbonyl]-β-alanine (VINAL, CAS #148969-96-4), 3-acrylamidopropanoic acid (ACA1), 5-acrylamidopropanoic acid (ACA2), 3-acrylamido-3-methylbutanoic acid (AMBA), 2-(methacryloyloxy)ethyl trimethylammonium chloride (Q Salt or METAC), 2-acrylamido-2-methylpropane sulfonic acid (AMPS), 1-propanaminium, N-(2-carboxyethyl)-N,N-dimethyl-3-[(1-oxo-2-propen-1-yl)amino]-, inner salt (CBT, carboxybetaine; CAS 79704-35-1), 1-propanaminium, N,N-dimethyl-N-[3-[(1-oxo-2-propen-1-yl)amino]propyl]-3-sulfo-, inner salt (SBT, sulfobetaine, CAS 80293-60-3), 3,5-Dioxa-8-aza-4-phosphaundec-10-en-1-aminium, 4-hydroxy-N,N,N-trimethyl-9-oxo-, inner salt, 4-oxide (9CI) (PBT, phosphobetaine, CAS 163674-35-9, 2-methacryloyloxyethyl phosphorylcholine, 3-(dimethyl(4-vinylbenzyl)ammonio) propane-1-sulfonate (DMVBAPS), 3-((3-acrylamidopropyl) dimethylammonio)propane-1-sulfonate (AMPDAPS), 3-((3-methacrylamidopropyl)dimethylammonio)propane-1-sulfonate (MAMPDAPS), 3-((3-(acryloyloxy)propyl)dimethylammonio)propane-1-sulfonate (APDAPS), methacryloyloxy)propyl)dimethylammonio)propane-1-sulfonate (MAPDAPS).

The reactive monomer mixture may comprise both an acyclic polyamide and a cyclic polyamide or copolymers thereof. The acyclic polyamide can be any of those acyclic polyamides described herein or copolymers thereof, and the cyclic polyamide can be any of those cyclic polyamides described herein or copolymers thereof. The polyamide may be selected from the group polyvinylpyrrolidone (PVP), polyvinylmethyacetamide (PVMA), polydimethylacrylamide (PDMA), polyvinylacetamide (PNVA), poly(hydroxyethyl(meth)acrylamide), polyacrylamide, and copolymers and mixtures thereof.

The total amount of all polyamides in the reactive mixture is greater than 15 weight percent based upon the total weight of the reactive monomer mixture. The reactive monomer mixture may include the polyamide in an amount in the range of between 15.1 weight percent and about 35 weight percent, including in the range of about 16 weight percent to about 30 weight percent, and in the range of about 20 weight percent to about 30 weight percent, in all cases, based on the total weight of the reactive components of the reactive monomer mixture.

Without intending to be bound by theory, the polyamide functions as an internal wetting agent in the resulting silicone hydrogel. The polyamides of the present invention may be non-polymerizable, and in this case, are incorporated into the silicone hydrogels as a semi-interpenetrating networks. The polyamides are entrapped or physically retained within the silicone hydrogels. Alternatively, the polyamides of the present invention may be polymerizable, for example as polyamide macromers or prepolymers, and in this case, are covalently incorporated into the silicone hydrogels.

The polyamide improves the wettability of the silicone hydrogel lens without a surface treatment. In silicone hydrogel formulations of the prior art, including wetting agents in amounts in excess of 15 percent was difficult due to the inherent incompatibility of the silicone components which are hydrophobic and the wetting agent which is hydrophilic and which has weight molecular weights in excess of 100,000 and often 1,000,000 Daltons. This incompatibility is particularly challenging for formulations where oxygen permeabilities (Dk) of greater than about 80, 90, or 100 barrers are desired. The inventors have surprisingly found that including a mixture of at least two hydroxyl functional polydialkylsiloxanes provides silicone hydrogels having very high concentrations of internal wetting agents. In some cases, the lower molecular weight hydroxyl functional polydiakylsiloxane may be substituted by a silicone containing monomer instead of a polydiakylsiloxane macromer.

As used herein, the phrase "without a surface treatment" means that the exterior surfaces of the devices (e.g. silicone hydrogels, contact lenses) of the present invention are not separately treated to improve the wettability of the device. Treatments which may be foregone include plasma treatments, grafting, coating, and the like. Coatings, however, which provide properties other than improved wettability, such as but not limited to nonfouling, color, tint, pattern, or other cosmetic enhancement may be applied to devices of the present invention.

When the polyamides are incorporated into the reactive monomer mixture they have a weight average molecular weight of at least 100,000 daltons; greater than about 150,000; between about 150,000 to about 2,000,000 daltons; between about 300,000 to about 1,800,000 daltons.

The polyamides may also comprise at least one monovalent reactive group. For polyamides having molecular weights of 10,000 daltons, a single monovalent reactive group may be included. For polyamides having molecular weights greater than about 10,000 daltons, greater than about 30,000 daltons, or greater than about 100,000 daltons, more than one monovalent reactive group may be included. Mixtures of polymerizable, reactive, and non-reactive polyamides may also be used.

Cross-Linking Agents

It is generally desirable to add one or more cross-linking agents, also referred to as cross-linking monomers, multifunctional macromers, and prepolymers, to the reaction mixture. The cross-linking agents may be selected from bifunctional crosslinkers, trifunctional crosslinkers, tetrafunctional crosslinkers, and mixtures thereof, including silicone-containing and non-silicone containing cross-linking agents. Non-silicone-containing cross-linking agents include ethylene glycol dimethacrylate (EGDMA), tetraethylene glycol dimethacrylate (TEGDMA), trimethylolpropane trimethacrylate (TMPTMA), triallyl cyanurate (TAC), glycerol trimethacrylate, methacryloxyethyl vinylcarbonate (HEMAVc), allylmethacrylate, methylene bisacrylamide (MBA), and polyethylene glycol dimethacrylate wherein the polyethylene glycol has a molecular weight up to about 5000 Daltons. The cross-linking agents are used in the usual amounts, e.g., from about 0.000415 to about 0.0156 mole per 100 grams of reactive components in the reaction mixture. Alternatively, if the hydrophilic monomers and/or the silicone-containing components are multifunctional by molecular design or because of impurities, the addition of a cross-linking agent to the reaction mixture is optional. Examples of hydrophilic monomers and macromers which can act as the cross-linking agents and when present do not require the addition of an additional cross-linking agent to the reaction mixture include (meth)acrylate and (meth)acrylamide endcapped polyethers.

Other cross-linking agents will be known to one skilled in the art and may be used to make the silicone hydrogel of the present invention.

It may be desirable to select the crosslinking agents which have reactive groups with similar reactivity rates with those of the other components to form the silicone hydrogel networks. Thus, it may be desirable to select crosslinking agents with at least one reactive group which is the same as the reactive groups included in the other reactive components. The structure and morphology of the resulting silicone hydrogel may also be influenced by the diluent(s) and cure conditions used.

Multifunctional silicone-containing components, including macromers, cross-linking agents, and prepolymers, may also be included to further increase the modulus and retain tensile strength. The silicone containing cross-linking agents may be used alone or in combination with other cross-linking agents. An example of a silicone containing monomer which can act as a cross-linking agent and, when present, does not require the addition of a crosslinking monomer to the reaction mixture includes α,ω-bismethacryloypropyl polydimethylsiloxane.

Non-limiting examples of silicone cross-linking agents are shown in Formulae XXVIII-XXXII, XXXIV, XXXV, and XXXXI-XXXXV, and the following chemical Formulae LX-LXX, wherein n is between 1 and 200, preferably n is between 50 and 150, more preferably between 50 and 100, and most preferably n is between 10 and 50.

Formula LX

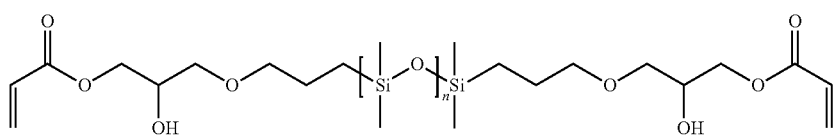

Formula LXI

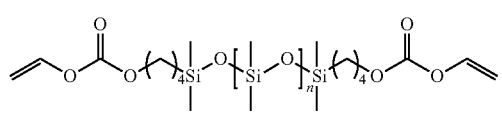

Formula LXII

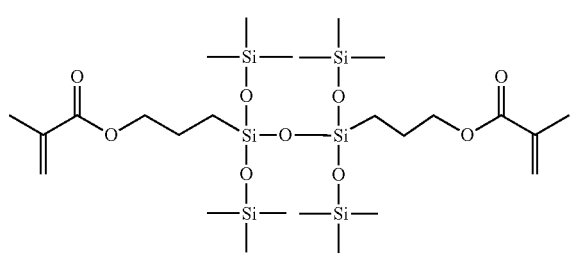

Formula LXIII

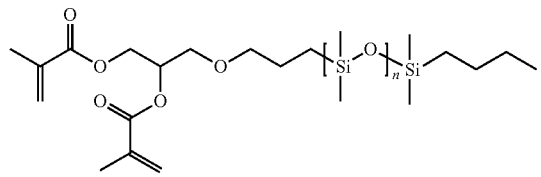

Formula LXIV

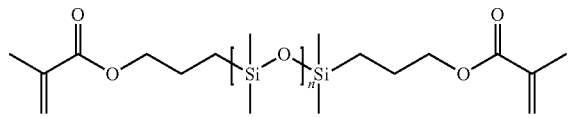

Formula LXV

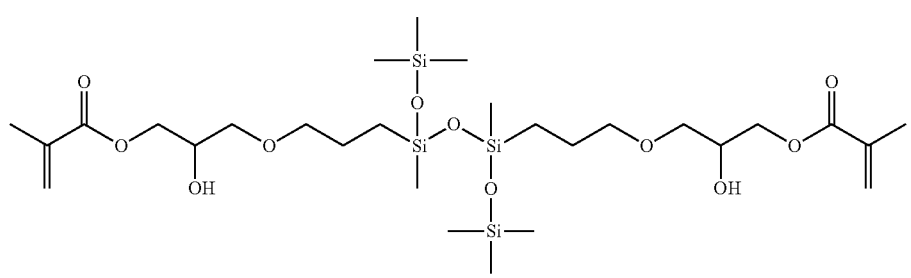

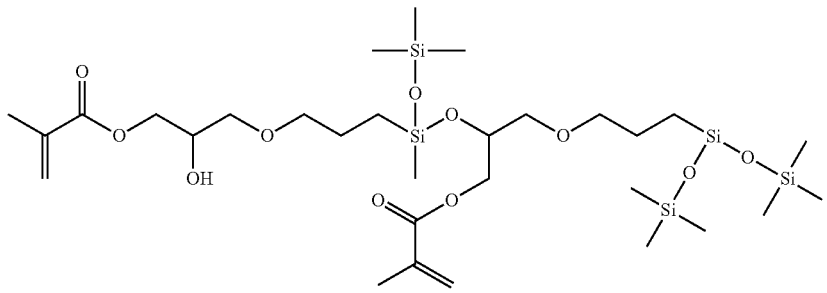

Formula LXVI

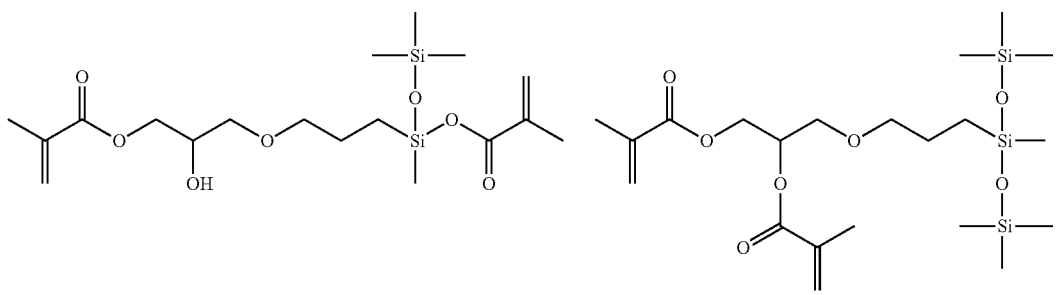

Formula LXVII

Formula LXVIII

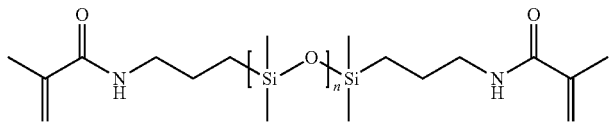

Formula LXIX

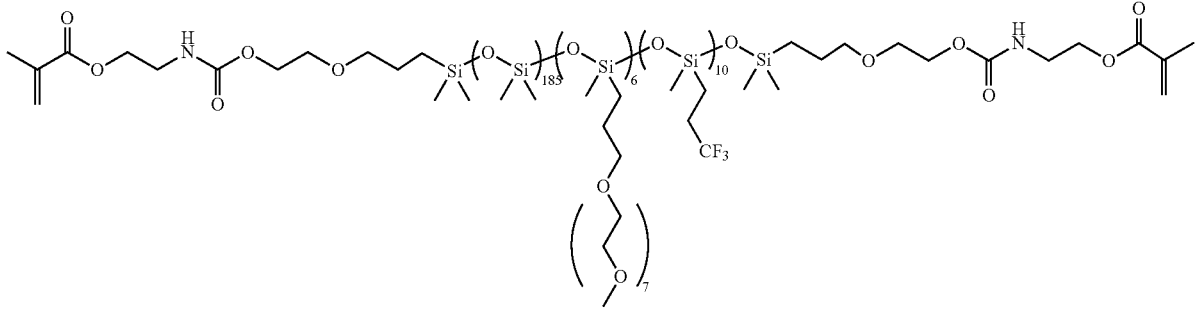

Formula LXX

The aforementioned silicone cross-linking agents may also have acrylate, methacrylate, O-vinylcarbonate, or methacylamide monovalent reactive groups. These monovalent reactive groups may be replaced with any other monovalent reactive group capable of undergoing free radical polymerization, such as, styrenes, vinyl ethers, N-vinyllactams, N-vinylamides, N-vinylimides, N-vinylureas, O-vinylcarbamates, and other vinyl compounds. In some embodiments, silicone cross-linking agents with styryl reactive groups are preferred.

Cross-linking agents that have rigid chemical structures and monovalent reactive groups that undergo free radical polymerization may also be used. Non-limiting examples of suitable rigid structures include cross-linking agents comprising phenyl and benzyl ring, such are 1,4-phenylene diacrylate, 1,4-phenylene dimethacrylate, 2,2-bis(4-methacryloxyphenyl)-propane, 2,2-bis[4-(2-acryloxyethoxy)phenyl]propane, 2,2-bis[4-(2-hydroxy-3-methacryloxypropoxy)phenyl]propane, and 4-vinylbenzyl methacrylate, and combinations thereof. Rigid crosslinking agents may be included in amounts between about 0.5 and about 15, or 2-10, 3-7 based upon the total weight of all of the reactive components.

The physical and mechanical properties of the silicone hydrogels of the present invention may be optimized for a particular use by adjusting the components in the reactive mixture.

Further Constituents

The reactive monomer mixture may contain additional components such as, but not limited to, diluents, UV absorbers, visible light absorbers, photochromic compounds, pharmaceuticals, nutraceuticals, antimicrobial substances, tints, pigments, copolymerizable dyes, nonpolymerizable dyes, release agents, and combinations thereof.

Classes of suitable diluents for silicone hydrogel reaction mixtures include alcohols having 2 to 20 carbon atoms, amides having 10 to 20 carbon atoms derived from primary amines and carboxylic acids having 8 to 20 carbon atoms. The diluents may be primary, secondary, and tertiary alcohols.

Generally the reactive components are mixed in a diluent to form a reaction mixture. Suitable diluents are known in the art. For silicone hydrogels, suitable diluents are disclosed in WO 03/022321 and U.S. Pat. No. 6,020,445 the disclosure of which is incorporated herein by reference.

Classes of suitable diluents for silicone hydrogel reaction mixtures include alcohols having 2 to 20 carbons, amides having 10 to 20 carbon atoms derived from primary amines, and carboxylic acids having 8 to 20 carbon atoms. Primary and tertiary alcohols may be used. Preferred classes include alcohols having 5 to 20 carbons and carboxylic acids having 10 to 20 carbon atoms.

Specific diluents which may be used include 1-ethoxy-2-propanol, diisopropylaminoethanol, isopropanol, 3,7-dimethyl-3-octanol, 1-decanol, 1-dodecanol, 1-octanol, 1-pentanol, 2-pentanol, 1-hexanol, 2-hexanol, 2-octanol, 3-methyl-3-pentanol, tert-amyl alcohol, tert-butanol, 2-butanol, 1-butanol, 2-methyl-2-pentanol, 2-propanol, 1-propanol, ethanol, 2-ethyl-1-butanol, (3-acetoxy-2-hydroxypropyloxy)-propylbis(trimethyl siloxy) methylsilane, 1-tert-butoxy-2-propanol, 3,3-dimethyl-2-butanol, tert-butoxyethanol, 2-octyl-1-dodecanol, decanoic acid, octanoic acid, dodecanoic acid, 2-(diisopropylamino)ethanol mixtures thereof and the like.

Preferred diluents include 3,7-dimethyl-3-octanol, 1-dodecanol, 1-decanol, 1-octanol, 1-pentanol, 1-hexanol, 2-hexanol, 2-octanol, 3-methyl-3-pentanol, 2-pentanol, t-amyl alcohol, tert-butanol, 2-butanol, 1-butanol, 2-methyl-2-pentanol, 2-ethyl-1-butanol, ethanol, 3,3-dimethyl-2-butanol, 2-octyl-1-dodecanol, decanoic acid, octanoic acid, dodecanoic acid, mixtures thereof and the like.

More preferred diluents include 3,7-dimethyl-3-octanol, 1-dodecanol, 1-decanol, 1-octanol, 1-pentanol, 1-hexanol, 2-hexanol, 2-octanol, 1-dodecanol, 3-methyl-3-pentanol, 1-pentanol, 2-pentanol, t-amyl alcohol, tert-butanol, 2-butanol, 1-butanol, 2-methyl-2-pentanol, 2-ethyl-1-butanol, 3,3-dimethyl-2-butanol, 2-octyl-1-dodecanol, mixtures thereof and the like.

If a diluent is present, generally there are no particular restrictions with respect to the amount of diluent present. When diluent is used, the diluent may be present in an amount in the range of about 2 to about 70 weight percent, including in the range of about 5 to about 50 weight percent, and in the range of about 15 to about 40 weight percent, based on the total weight of the reactive mixtures (including reactive and nonreactive components). Mixtures of diluents may be used.

A polymerization initiator may be used in the reaction mixture. The polymerization initiator can include at least one of lauryl peroxide, benzoyl peroxide, iso-propyl percarbonate, azobisisobutyronitrile, and the like, that generate free radicals at moderately elevated temperatures, and photoinitiator systems such as aromatic alpha-hydroxy ketones, alkoxyoxybenzoins, acetophenones, acylphosphine oxides, bisacylphosphine oxides, and a tertiary amine plus a diketone, mixtures thereof and the like. Illustrative examples of photoinitiators are 1-hydroxycyclohexyl phenyl ketone, 2-hydroxy-2-methyl-1-phenyl-propan-1-one, bis(2,6-dimethoxybenzoyl)-2,4-4-trimethylpentyl phosphine oxide (DMBAPO), bis(2,4,6-trimethylbenzoyl)-phenyl phosphine oxide (Irgacure 819), 2,4,6-trimethylbenzyldiphenyl phosphine oxide and 2,4,6-trimethylbenzoyl diphenylphosphine oxide, benzoin methyl ester and a combination of camphorquinone and ethyl 4-(N,N-dimethylamino)benzoate, and combinations thereof.

Commercially available visible light initiator systems include Irgacure® 819, Irgacure® 1700, Irgacure® 1800, Irgacure® 819, Irgacure® 1850 (all from Ciba Specialty Chemicals) and Lucrin® TPO initiator (available from BASF). Commercially available UV photoinitiators include Darocur® 1173 and Darocur® 2959 (Ciba Specialty Chemicals). These and other photoinitiators which may be used are disclosed in Volume III, Photoinitiators for Free Radical Cationic & Anionic Photopolymerization, 2nd Edition by J. V. Crivello & K. Dietliker; edited by G. Bradley; John Wiley and Sons; New York; 1998. The initiator is used in the reaction mixture in effective amounts to initiate photopolymerization of the reaction mixture, e.g., from about 0.1 to about 2 parts by weight per 100 parts of reactive monomer mixture. Polymerization of the reaction mixture can be initiated using the appropriate choice of heat or visible or ultraviolet light or other means depending on the polymerization initiator used. Alternatively, initiation can be conducted e-beam without a photoinitiator. However, when a photoinitiator is used, the preferred initiators are bisacylphosphine oxides, such as bis(2,4,6-tri-methylbenzoyl)-phenyl phosphine oxide (Irgacure® 819) or a combination of 1-hydroxycyclohexyl phenyl ketone and bis(2,6-dimethoxybenzoyl)-2,4-4-trimethylpentyl phosphine oxide (DMBAPO).

Curing of Silicone Hydrogels and Manufacture of Lens

A contact lens comprises the silicone hydrogel prepared from a reactive monomer mixture comprising any of the tri-block prepolymers disclosed herein. The silicone hydrogel may have an oxygen permeability (Dk) of at least 80 barrers; of at least 85 barrers.

The reactive mixtures may be formed by any of the methods known in the art, such as shaking or stirring, and used to form polymeric articles or devices by known methods. The reactive components (hydrophilic monomer, hydroxyl-containing silicone component, cross-linking agent, polyamide, etc.) are mixed together either with or without a diluent to form the reactive mixture.

For example, the silicone hydrogels may be prepared by mixing reactive components, and, optionally, diluent(s), with a polymerization initiator and curing by appropriate conditions to form a product that can be subsequently formed into the appropriate shape by lathing, cutting, and the like. Alternatively, the reaction mixture may be placed in a mold and subsequently cured into the appropriate article.

Method of making a silicone hydrogel contact lens comprise: obtaining a tri-block prepolymer; preparing a reactive monomer mixture from the tri-block prepolymer and optionally with other components; transferring the reactive monomer mixture onto a first mold; placing a second mold on top the first mold filled with the reactive monomer mixture; and curing the reactive monomer mixture by free radical copolymerization to form the silicone hydrogel in the shape of a contact lens.

The reactive mixture may be cured via any known process for molding the reaction mixture in the production of contact lenses, including spincasting and static casting. Spincasting methods are disclosed in U.S. Pat. Nos. 3,408,429 and 3,660,545, and static casting methods are disclosed in U.S. Pat. Nos. 4,113,224 and 4,197,266. The contact lenses of this invention may be formed by the direct molding of the silicone hydrogels, which is economical, and enables precise control over the final shape of the hydrated lens. For this method, the reaction mixture is placed in a mold having the shape of the final desired silicone hydrogel and the reaction mixture is subjected to conditions whereby the monomers polymerize, thereby producing a polymer in the approximate shape of the final desired product.

After curing, the lens may be subjected to extraction to remove unreacted components and release the lens from the lens mold. The extraction may be done using conventional extraction fluids, such organic solvents, such as alcohols or may be extracted using aqueous solutions.

Aqueous solutions are solutions which comprise water. The aqueous solutions of the present invention may comprise at least about 20 weight percent water, or at least about 50 weight percent water, or at least about 70 weight percent water, or at least about 95 weight percent water. Aqueous solutions may also include additional water soluble components such as inorganic salts or release agents, wetting agents, slip agents, pharmaceutical and nutraceutical components, combinations thereof and the like. Release agents are compounds or mixtures of compounds which, when combined with water, decrease the time required to release a contact lens from a mold, as compared to the time required to release such a lens using an aqueous solution that does not comprise the release agent. The aqueous solutions may not require special handling, such as purification, recycling or special disposal procedures.

Extraction may be accomplished, for example, via immersion of the lens in an aqueous solution or exposing the lens to a flow of an aqueous solution. Extraction may also include, for example, one or more of: heating the aqueous solution; stirring the aqueous solution; increasing the level of release aid in the aqueous solution to a level sufficient to cause release of the lens; mechanical or ultrasonic agitation of the lens; and incorporating at least one leach aid in the aqueous solution to a level sufficient to facilitate adequate removal of unreacted components from the lens. The foregoing may be conducted in batch or continuous processes, with or without the addition of heat, agitation or both.

Application of physical agitation may be desired to facilitate leach and release. For example, the lens mold part to which a lens is adhered can be vibrated or caused to move back and forth within an aqueous solution. Other methods may include ultrasonic waves through the aqueous solution.

The lenses may be sterilized by known means such as, but not limited to autoclaving.

In addition to displaying desirable stability, the lenses of the present invention also display compatibility with the components of human tears.

It will be appreciated that all of the tests specified herein have a certain amount of inherent test error. Accordingly, results reported herein are not to be taken as absolute numbers, but numerical ranges based upon the precision of the particular test.

Test Methods

It will be appreciated that all of the tests specified herein have a certain amount of inherent error. Accordingly, the results reported herein are not to be taken as absolute numbers, but numerical ranges based upon the precision of the particular test.

Polymer molecular weights were determined by Size Exclusion Chromatography with Multi-Angle Light Scattering (SEC-MALS). A typical SEC-MALS setup employed a suitable solvent such as 1-propanol (or THF) with (or without) 10 mM LiBr (or another commonly used salt) as the mobile phase at a flow rate of 0.6 mL/min at 65° C. Three Tosoh Biosciences TSK-gel columns in series were used [SuperAW3000 4 um, 6.0 mm ID×15 cm (PEO/DMF Exclusion Limit=60,000 g/mole), SuperAW4000 6 um, 6.0 mm ID×15 cm (PEO/DMF Exclusion Limit=400,000 g/mole) and a SuperAW5000 7 um, 6.0 mm ID×15 cm (PEO/DMF Exclusion Limit=4,000,000 g/mole)] with an online Agilent 1200 UV/VIS diode array detector, a Wyatt Optilab rEX interferometric refractometer, and a Wyatt mini-DAWN Treos multiangle laser scattering (MALS) detector ($\lambda$=658 nm). A $d\eta/dc$ value of 0.0.074 mL/g at 30° C. ($\lambda$=658 nm) was used for absolute molecular weight determination. Absolute molecular weights and polydispersity data were calculated using the Wyatt ASTRA 6.1.1.17 SEC/LS software package.

Haze was measured by placing a hydrated test lens in borate buffered saline in a clear glass cell at ambient temperature above a flat black background, illuminating from below with a fiber optic lamp (Dolan-Jenner PL-900 fiber optic light with 0.5 inch diameter light guide) at an angle of 66° normal to the lens cell, and capturing an image of the test lens from above, normal to the glass cell with a video camera (DVC 1310C RGB camera or equivalent equipped with a suitable zoom camera lens) placed 14 cm above the lens holder. The background scatter is subtracted from the scatter of the test lens by subtracting an image of a blank cell with borate buffered saline (baseline) using EPIX XCAP V 3.8 software. The value for high end scatter (frosted glass) is obtained by adjusting the light intensity to be between 900 to 910 mean grayscale. The value of the background scatter (BS) is measured using a saline filled glass cell. The subtracted scattered light image is quantitatively analyzed by integrating over the central 10 mm of the test lens, and then compared to a frosted glass standard. The light intensity/power setting was adjusted to achieve a mean grayscale value in the range of 900-910 for the frosted glass standard; at this setting, the baseline mean grayscale value was in the range of 50-70. The mean grayscale values of the baseline and frosted glass standard are recorded and used to create a scale from zero to 100, respectively. In the grayscale analysis, the mean and standard deviations of the baseline, frosted glass, and every test lens was recorded. For each lens, a scaled value was calculated according to the equation: scaled value equals the mean grayscale value (lens minus baseline) divided by the mean grayscale value (frosted glass minus baseline) times by 100. Three to five test lenses are analyzed, and the results are averaged.

Water content was measured gravimetrically. Lenses were equilibrated in packing solution for 24 hours. Each of three test lens are removed from packing solution using a sponge tipped swab and placed on blotting wipes which have been dampened with packing solution. Both sides of the lens are contacted with the wipe. Using tweezers, the test lens are placed in a tared weighing pan and weighed. The two more sets of samples are prepared and weighed. All weight measurements were done in triplicate, and the average of those values used in the calculations. The wet weight is defined as the combined weight of the pan and wet lenses minus the weight of the weighing pan alone.

The dry weight was measured by placing the sample pans in a vacuum oven which has been preheated to 60° C. for 30 minutes. Vacuum was applied until the pressure reaches at least 1 inch of Hg is attained; lower pressures are allowed. The vacuum valve and pump are turned off and the lenses are dried for at least 12 hours; typically overnight. The purge valve is opened allowing dry air or dry nitrogen gas to enter. The oven is allowed reach atmospheric pressure. The pans are removed and weighed. The dry weight is defined as the combined weight of the pan and dry lenses minus the weight of the weighing pan alone. The water content of the test lens was calculated as follows: % water content=(wet weight− dry weight)/wet weight×100. The average and standard deviation of the water content were calculated and the average value reported as the percent water content of the test lens.

The refractive index (RI) of a contact lens was measured by a Leica ARIAS 500 Abbe refractometer in manual mode or by a Reichert ARIAS 500 Abbe refractometer in automatic mode with a prism gap distance of 100 microns. The instrument was calibrated using deionized water at 20° C. (+/−0.2° C.). The prism assembly was opened and the test lens placed on the lower prism between the magnetic dots closest to the light source. If the prism is dry, a few drops of saline were applied to the bottom prism. The front curve of the lens was against the bottom prism. The prism assembly was then closed. After adjusting the controls so that the shadow line appeared in the reticle field, the refractive index was measured. The RI measurement was made on five test lenses. The average RI calculated from the five measurements was recorded as the refractive index as well as its standard deviation.

Oxygen permeability (Dk) was determined by the polarographic method generally described in ISO 9913-1:1996 and ISO 18369-4:2006, but with the following modifications. The measurement was conducted at an environment containing 2.1% oxygen created by equipping the test chamber with nitrogen and air inputs set at the appropriate ratio, for example, 1800 mL/min of nitrogen and 200 mL/min of air. The t/Dk is calculated using the adjusted oxygen concentration. Borate buffered saline was used. The dark current was measured by using a pure humidified nitrogen environment instead of applying MMA lenses. The lenses were not blotted before measuring. Four lenses were stacked instead of using lenses of various thickness (t) measured in centimeters. A curved sensor was used in place of a flat sensor; radius was 7.8 mm. The calculations for a 7.8 mm radius sensor and 10% (v/v) air flow are as follows:

$$Dk/t = (\text{measured current} - \text{dark current}) \times (2.97 \times 10^{-8} \text{ mL } O_2/(\mu A\text{-sec-cm}^2\text{-mm Hg}))$$

The edge correction was related to the Dk of the material.
For all Dk values less than 90 barrers:
t/Dk (edge corrected)=[1+(5.88×t)]×(t/Dk)
For Dk values between 90 and 300 barrers:
t/Dk (edge corrected)=[1+(3.56×t)]×(t/Dk)
For Dk values greater than 300 barrers:
t/Dk (edge corrected)=[1+(3.16×t)]×(t/Dk)

Non-edge corrected Dk was calculated from the reciprocal of the slope obtained from the linear regression analysis of the data wherein the x variable was the center thickness in centimeters and the y variable was the t/Dk value. On the other hand, edge corrected Dk was calculated from the reciprocal of the slope obtained from the linear regression analysis of the data wherein the x variable was the center thickness in centimeters and the y variable was the edge corrected t/Dk value. The resulting Dk value was reported in barrers.

Wettability of lenses was determined by a modified Wilhelmy plate method using a calibrated Kruss K100 tensiometer at room temperature (23±4° C.) and using surfactant free borate buffered saline as the probe solution. All equipment must be clean and dry; vibrations must be minimal around the instrument during testing. Wettability is usually reported as the advancing contact angle (DCA). The tensiometer was equipped with a humidity generator, and a temperature and humidity gage was placed in the tensiometer chamber. The relative humidity was maintained at 70±5%. The experiment was performed by dipping the lens specimen of known perimeter into the packing solution of known surface tension while measuring the force exerted on the sample due to wetting by a sensitive balance. The advancing contact angle of the packing solution on the lens is determined from the force data collected during sample dipping. The receding contact angle is determined from force data while withdrawing the sample from the liquid. The Wilhelmy plate method is based on the following formula: $Fg = \gamma \rho \cos \theta - B$, wherein F=the wetting force between the liquid and the lens (mg), g=gravitational acceleration (980.665 cm/sec$^2$), γ=surface tension of probe liquid (dyne/cm), ρ=the perimeter of the contact lens at the liquid/lens meniscus (cm), θ=the dynamic contact angle (degree), and B=buoyancy (mg). B is zero at the zero depth of immersion. Typically, a test strip was cut from the central area of the contact lens. Each strip was approximately 5 mm in width and 14 mm in length, attached to a metallic clip using plastic tweezers, pierced with a metallic wire hook, and equilibrated in packing solution for at least 3 hours. Then, each sample was cycled four times, and the results were averaged to obtain the advancing and receding contact angles of the lens. Typical measuring speeds were 12 mm/min. Samples were kept completely immersed in packing solution during the data acquisition and analysis without touching the metal clip. Values from five individual lenses were averaged to obtain the reported advancing and receding contact angles of the experimental lens.

The mechanical properties of the contact lenses were measured by using a tensile testing machine such as an Instron model 1122 or 5542 equipped with a load cell and pneumatic grip controls. Minus one diopter lens is the preferred lens geometry because of its central uniform thickness profile. A dog-bone shaped sample cut from a −1.00 power lens having a 0.522 inch length, 0.276 inch "ear" width and 0.213 inch "neck" width was loaded into the grips and elongated at a constant rate of strain of 2 inches per minute until it breaks. The center thickness of the dog-bone sample was measured using an electronic thickness gauge prior to testing. The initial gauge length of the sample (Lo) and sample length at break (Lf) were measured. At least five specimens of each composition were measured, and the average values were used to calculate the percent elongation to break: percent elongation=[(Lf−Lo)/Lo]×100. The tensile modulus was calculated as the slope of the initial linear portion of the stress-strain curve; the units of modulus are pounds per square inch or psi. The tensile strength was calculated from the peak load and the original cross-sectional area: tensile strength=peak load divided by the original cross-sectional area; the units of tensile strength are psi. Toughness was calculated from the energy to break and the original volume of the sample: toughness=energy to break divided by the original sample volume; the units of toughness are in-lbs/in$^3$.

PQ1 uptake was measured chromatographically. The HPLC was calibrated using a series of standard PQ1 solutions having concentrations 2, 4, 6, 8, 12 and 15 μg/mL. Lenses were placed into polypropylene contact lens cases with 3 mL of Optifree Replenish or similar lens solution (PQ1 concentration=10 micrograms/mL) which is commercially available from Alcon. A control lens case, containing 3 mL of solution, but no contact lens was also prepared. The lenses and control solutions were stored at room temperature for 72 hours. 1 mL of solution was removed from each of the samples and controls and mixed with trifluoroacetic acid (10 μL). The analysis was conducted using HPLC/ELSD and a Phenomenex Luna C5 (4.6 mm×5 mm; 5 μm particle size) column with the following equipment and conditions: Agilent 1200 HPLC or equivalent with an ELSD operating at T=100° C., Gain=12, Pressure=4.4 bar, Filter=3 s; ELSD parameters may vary from instrument to instrument; using mobile phase A of water (0.1% TFA) and mobile phase B of acetonitrile (0.1% TFA), a column temperature of 40° C. and an injection volume of 100 µL. An elution profile was used and listed in Table A. A calibration curve was created by plotting the peak area value as a function of the concentration of the PQ1 standard solutions. The concentration of PQ1 in a sample was then calculated by solving the quadratic equation representing the calibration curve. Three lenses were run for each analysis, and the results were averaged. PQ1 uptake was reported as the percentage loss of PQ1 after soak with lens compared to the PQ1 present in the control without lens.

TABLE A

HPLC Elution Profile

| Time (minutes) | % A | % B | Flow Rate (mL/min) |
|---|---|---|---|
| 0.00 | 100 | 0 | 1.2 |
| 1.00 | 100 | 0 | 1.2 |
| 5.00 | 0 | 100 | 1.2 |
| 8.50 | 0 | 100 | 1.2 |
| 8.60 | 100 | 0 | 1.2 |
| 11.00 | 100 | 0 | 1.2 |

The amount of cholesterol absorbed by a contact lens was determined by a LC-MS method (lipid uptake in the data tables). Lenses were soaked in a cholesterol solution and then extracted with dichloromethane. The dichloromethane extract was evaporated and reconstituted with a heptane/isopropanol mixture with subsequent analysis by LC-MS. The results were reported as micrograms of cholesterol per lens. A deuterated cholesterol internal standard was used to improve accuracy and precision of the method.

A cholesterol stock solution was prepared by placing 15.0±0.5 milligrams of cholesterol into a wide-mouth 10 mL glass volumetric flask followed by dilution with isopropanol.

A cholesterol soak solution was prepared by placing 0.430±0.010 grams of lysozyme (purity=93%), 0.200±0.010 grams of albumin, and 0.100±0.010 grams of β-lactoglobulin into a 200 mL glass volumetric flask, adding approximately 190 milliliters of PBS to the flask, and swirling to dissolve the contents. 2 Milliliters of the cholesterol stock solution was then added and diluted to volume with PBS. The volumetric flask was capped and shaken well. The concentration of the cholesterol soak solution was approximately 15 µg/mL. Note: The mass of these components may be adjusted to account for lot-to-lot purity variability so that the target concentrations can be achieved.

Six contact lenses were removed from their packages and blotted with lint-free paper towels to remove excess packing solution. The lenses were placed into six separate 8 mL glass vials (one lens per vial), and 3.0 mL of the cholesterol soak solution was added to each vial. The vials were capped and placed into a New Brunswick Scientific incubator-shaker for 72 hours at 37° C. and 100 rpm. After incubation, each lens was rinsed three times with PBS in 100 mL beakers and placed into a 20-mL scintillation vial.

To each lens-containing scintillation vial, 5 mL of dichloromethane and 100 µL of the internal standard solution were added. After a minimum of 16 hours of extraction time, the supernatant liquid was transferred into a 5 mL disposable glass culture tube. The tube was placed into the Turbovap and the solvent completely evaporated. Place 1 mL of the diluent into the culture tube and re-dissolve the contents. The aforementioned diluent was a 70:30 (v/v) mixture of heptane and isopropanol. The diluent was also the mobile phase. The resulting solution was carefully transferred into an autosampler vial and ready for LC-MS analysis.

An internal standard stock solution was prepared by weighing approximately 12.5+2 mg of deuterated cholesterol (2,2,3,4,4,6-d6-cholesterol) in a 25 mL volumetric flask followed by dilution with the diluent. The concentration of the internal standard stock solution was approximately 500 µg/mL.

An internal standard solution was prepared by placing 1.0 mL of the internal standard stock solution in a 50 mL volumetric flask followed by dilution to volume with diluent. The concentration of this intermediate internal standard solution is approximately 10 µg/mL.

A reference standard stock solution was prepared by weighing approximately 50+5 mg of cholesterol in a 100 mL volumetric flask followed by dilution with diluent. The concentration of the cholesterol in this reference stock solution is approximately 500 µg/mL.

Working standard solutions were then made according to Table B by placing the appropriate amount of standard solutions into the listed 25 mL, 50 mL or 100 mL volumetric flasks. After the standard solutions were added to the volumetric flasks, the mixture was diluted to volume with diluent and swirled well.

TABLE B

Working Standard Solution Formulations

| Working Standard Name | Volume of Internal Standard Solution (mL) | Volume of Reference Standard Stock Solution (µL) | Final Volume (mL) | Approximate Cholesterol Concentration (µg/mL) |
|---|---|---|---|---|
| Std 1 | 10 | 20 | 100 | 0.10 |
| Std 2 | 5 | 25 | 50 | 0.25 |
| Std 3 | 5 | 50 | 50 | 0.50 |
| Std 4 | 5 | 100 | 50 | 1.00 |
| Std 5 | 2.5 | 125 | 25 | 2.50 |
| Std 6 | 2.5 | 250 | 25 | 5.00 |

The following LC-MS analysis was performed:

Make 6 injections of the "Std4" to evaluate system suitability. The RSD % of the peak areas for the working standards and the internal standards must be <5% and RSD (%) of their peak area ratios must be <7% to pass system suitability.

Inject working standards 1-6 to create a calibration curve. The square of the correlation coefficient ($r^2$) must be >0.99.

Inject test samples followed by a bracketing standard (Std4). The peak area ratio of the bracketing standard must be within ±10% of the averaged peak area ratio from the system suitability injections.

A calibration curve was constructed by plotting the peak area ratio (reference std/internal std) value that corresponds to the concentration of each working standard solution. The concentration of cholesterol in sample is calculated by solving a quadratic equation. Typical equipment and their settings for the LC-MS analysis are listed below and shown in Tables C and D. The values for the instrument tune parameters may change each time the mass spectrometer is tuned.

Turbovap Conditions:
Temperature: 45° C.
Time: 30 minutes or more to dryness
Gas: nitrogen @ 5 psi
HPLC Conditions:
HPLC: Thermo Accela HPLC Instrument or equivalent
HPLC Column: Agilent Zorbax $NH_2$ (4.6 mm×150 mm; 5 μm particle size)
Mobile Phase: 70% heptane and 30% isopropanol
Column Temperature: 30° C.
Injection Volume: 25 μL
Flow Rate: 1000 μL/min

TABLE C

Mass Spectrometry Conditions
Thermo Finnigan TSQ Quantum Ultra

| MS Settings | Value |
| --- | --- |
| Ionization | APCI |
| Polarity | Positive |
| Scan type | SIM |
| APCI probe position | D |
| Mass (m/z) of Reference Standards | 369.2 |
| Mass (m/z) of Internal Standards | 375.3 |
| Mass width (m/z) | 1.0 |
| Scan time (s) | 0.10 |
| Data type | centroid |
| Peak Width Q3 (FWHM) | 0.40 |
| Skimmer Offset (V) | 10 |

TABLE D

Tune Parameters

| Instrument Tune Parameters | Value |
| --- | --- |
| Discharge Current (arbitrary units): | 20 |
| Capillary temperature (° C.): | 240 |
| Vaporizer Temperature (° C.): | 500 |
| Tube lens offset (V): | 68 |
| Sheath gas pressure (arbitrary units): | 20 |
| Auxiliary gas flow (arbitrary units): | 15 |

The amount of lysozyme uptake by a contact lens was measured by a HPLC-UV method. Lysozyme uptake was determined as the difference of lysozyme content in phosphate-buffered saline solution (PBS) before contact lenses are immersed and the concentration in the test solution after 72 hours of lens immersion at 37° C.

A lysozyme soak solution was prepared by placing 0.215±0.005 grams of lysozyme (purity=93%) into a 100 mL volumetric flask followed by adding 50 mL of PBS to dissolve the lysozyme by swirling followed by dilution to volume with PBS. The resulting lysozyme soak solution was filtered/sterilized using a Millipore Stericup filtration device. The concentration of the lysozyme soak solution is approximately 2000 μg/mL. The mass of lysozyme may be adjusted to account for lot-to-lot purity variability so that a 2000 μg/mL concentration can be achieved.

Three contact lenses were removed from their packages and blotted with lint-free paper towel to remove excess packing solution. The lenses were placed into three separate 8 mL glass vials (one lens per vial). 1.5 mL of the lysozyme soak solution was added to each vial. The vials were capped and inspected to ensure each lens was completely immersed in the soak solution. As control samples, 1.5 mL of lysozyme soak solution were added into three separate 8 mL glass vials. The samples were then incubated on a New Brunswick Scientific incubator-shaker for 72 hours at 37° C. and 100 rpm.

A diluent was prepared by mixing 900 mL water, 100 mL acetonitrile and 1 mL trifluoroacetic acid into a 1 L glass bottle.

A lysozyme stock solution was prepared by placing 0.240±0.010 grams of lysozyme (purity=93%) into a 100 mL volumetric flask followed by dilution to volume with diluent. The concentration of the lysozyme stock solution is approximately 2200 μg/mL.

As shown in Table E, a series of working standard solutions was prepared by mixing the appropriate amounts of lysozyme stock solution with diluent using 5 mL volumetric flasks.

TABLE E

Working Standards

| Working Standard Name | Volume of Stock Solution (mL) | Final Volume (mL) | Approximate Lysozyme Concentration (μg/mL) |
| --- | --- | --- | --- |
| Std 1 | 1.135 | 5 | 500 |
| Std 2 | 1.815 | 5 | 800 |
| Std 3 | 2.725 | 5 | 1200 |
| Std 4 | 3.635 | 5 | 1600 |
| Std 5 | 4.540 | 5 | 2000 |
| Std 6 (stock) | — | — | 2200 |

A 10% (v/v) solution was prepared by adding 1 mL of trifluoroacetic acid into a 10 mL glass volumetric flask followed by dilution with HPLC water. Samples for HPLC-UV analysis were prepared as follows: (1) by placing 1000 μL of test sample and 10 μL of the 10% TFA solution into an autosampler vial or (2) by placing 1000 μL of reference standard and 10 μL of reference standard diluent into an autosampler vial.

The analysis involved the following steps:
Perform 6 injections of the "Std4" to evaluate system suitability. The RSD % of the peak areas and retention times must be <0.5% to pass system suitability.

Inject working standards 1-6 to create a calibration curve. The square of the correlation coefficient ($r^2$) must be >0.99.

Inject test samples followed by a bracketing standard (Std4). The peak area of the bracketing standard must be ±1% of the averaged peak areas from the system suitability injections.

A calibration curve was constructed by plotting the peak area value that corresponds to the concentration of each lysozyme working standard solution. The concentration of lysozyme in the test samples was calculated by solving a linear equation. Typical equipment and their settings are listed below or shown in Table F.

Instrument: Agilent 1200 HPLC with UV detection (or equivalent HPLC-UV)
Detection: UV @ 280 nm (5 nm bandwidth)
HPLC Column: Phenomenex Luna C5 (50×4.6 mm) or Agilent PLRP-S (50×4.6 mm)
Mobile Phase A: H2O (0.1% TFA)
Mobile Phase B: Acetonitrile (0.1% TFA)
Column Temperature: 40° C.
Injection Volume: 10 μL

TABLE F

HPLC Run Conditions

| Time (minutes) | % A | % B | Flow Rate (mL/min) |
| --- | --- | --- | --- |
| 0.0 | 95 | 5 | 1.2 |
| 4.0 | 5 | 95 | 1.2 |

TABLE F-continued

HPLC Run Conditions

| Time (minutes) | % A | % B | Flow Rate (mL/min) |
|---|---|---|---|
| 4.1 | 95 | 5 | 1.2 |
| 6.5 | 95 | 5 | 1.2 |

Alternatively, lysozyme uptake was measured as follows. A lysozyme solution was prepared from chicken egg white (Sigma, L7651) at a concentration of 2 mg/mL in phosphate saline buffer supplemented by sodium bicarbonate at 1.37 g/L and D-glucose at 0.1 g/L.

Three lenses for each test sample were tested using each protein solution, and three were tested using PBS as a control solution. The test lenses were blotted on sterile gauze to remove packing solution and aseptically transferred, using sterile forceps, into sterile 24 well cell culture plates (one lens per well) each well containing 2 mL of the lysozyme solution. Each lens was fully immersed in the solution. As controls, 2 mL of the lysozyme solution was placed in wells without a contact lens.

The plates were sealed using parafilm to prevent evaporation and dehydration and placed onto an orbital shaker and incubated at 35° C. with agitation at 100 rpm for 72 hours. After the 72 hour incubation period, the lenses were rinsed 3 to 5 times by dipping lenses into 200 mL of PBS. The lenses were blotted on a paper towel to remove excess PBS and transferred into sterile conical tubes (1 lens per tube), each tube containing a volume of PBS determined based upon an estimate of lysozyme uptake expected based upon on each lens composition. The lysozyme concentration in each tube to be tested must be within the albumin standards range as described by the manufacturer (0.05 micrograms to 30 micrograms). Samples known to uptake a level of lysozyme lower than 100 μg per lens were diluted 5 times. Samples known to uptake levels of lysozyme higher than 500 μg per lens were diluted 20 times.

Lysozyme uptake was determined using on-lens bicinchoninic acid method using QP-BCA kit (Sigma, QP-BCA) following the procedure described by the manufacturer and was calculated by subtracting the optical density measured on PBS soaked lenses from the optical density determined on lenses soaked in lysozyme solution. The optical density was measured using a Synergy II Micro-plate reader capable of reading optical density at 562 nm.

The invention is now described with reference to the following examples. Before describing several exemplary embodiments of the invention, it is to be understood that the invention is not limited to the details of construction or process steps set forth in the following description. The invention is capable of other embodiments and of being practiced or being carried out in various ways.

The following abbreviations will be used throughout the Preparations and Examples and have the following meanings:

BC: back curve plastic mold
FC: front curve plastic mold
Da: dalton or g/mole
kDa: kilodalton or an atomic mass unit equal to 1,000 daltons
NVP: N-vinylpyrrolidone (Acros or Aldrich)
DMA: N,N-dimethylacrylamide (Jarchem)
MMA: methyl methacrylate
HEMA: 2-hydroxyethyl methacrylate (Bimax)
HPMA: 2-hydroxypropyl methacrylate
HEA: 2-hydroxyethyl acrylate
HEAA: 2-hydroxyethyl acrylamide
Bis-HEAA: N,N-bis(2-hydroxyethyl) acrylamide
GMMA: 2,3-dihydroxypropyl methacrylate
HEMA: 2-hydroxybutyl methacrylate
VMA: N-vinyl N-methyl acetamide (Aldrich)
AA: acrylic acid
MAA: methacrylic acid (Acros)
VINAL: N-[(ethenyloxy)carbonyl]-β-alanine; CAS #148969-96-4
ACA1: 3-acrylamidopropanoic acid
ACA2: 5-acrylamidopropanoic acid
Q Salt or METAC: 2-(methacryloyloxy)ethyl trimethylammonium chloride
AMPS: 2-acrylamido-2-methylpropane sulfonic acid
CBT: 1-Propanaminium, N-(2-carboxyethyl)-N,N-dimethyl-3-[(1-oxo-2-propen-1-yl)amino]-, inner salt; carboxybetaine; CAS 79704-35-1
SBT: 1-Propanaminium, N,N-dimethyl-N-[3-[(1-oxo-2-propen-1-yl)amino] propyl]-3-sulfo-, inner salt; sulfobetaine; CAS 80293-60-3
PBT: 3,5-Dioxa-8-aza-4-phosphaundec-10-en-1-aminium, 4-hydroxy-N,N,N-trimethyl-9-oxo-, inner salt, 4-oxide (9CI); phosphobetaine; CAS 163674-35-9
Blue HEMA: 1-amino-4-[3-(4-(2-methacryloyloxyethoxy)-6-chlorotriazin-2-ylamino)-4-sulfophenylamino] anthraquinone-2-sulfonic acid, as described in U.S. Pat. No. 5,944,853
Styryl-TRIS: tris(trimethylsiloxy)silyl styrene (Melrob)
PVMA: poly(N-vinyl N-methyl acetamide)
PVP: poly(N-vinylpyrrolidone) (ISP Ashland)
EGDMA: ethylene glycol dimethacrylate (Esstech)
TEGDMA: tetraethylene glycol dimethacrylate (Esstech)
TMPTMA: trimethylolpropane trimethacrylate (Esstech)
MBA: methylene bisacrylamide (Aldrich)
TAC: Triallyl Cyanurate (Polysciences)
Tegomer V-Si 2250: diacryloxypolydimethylsiloxane (Evonik)
Irgacure 819: bis(2,4,6-trimethylbenzoyl)-phenylphosphineoxide (BASF or Ciba Specialty Chemicals)
Irgacure 1870: blend of bis(2,6-dimethoxybenzoyl)-2,4,4-trimethyl-pentylphosphineoxide and 1-hydroxy-cyclohexyl-phenyl-ketone (BASF or Ciba Specialty Chemicals)
AIBN: azobisisobutyronitrile
Te-Me=ethyl 2-methyl-2-(methyltellanyl)propanoate
Te-Bu: ethyl 2-methyl-2-(butyltellanyl)propanoate
TEMPO: (2,2,6,6-Tetramethyl-piperidin-1-yl)oxyl, free radical; CAS 2564-83-2
TERP: organotellurium mediated living radical polymerization
MCL: methacryloyl chloride
TMI: isopropenyl α,α-dimethylbenzyl isocyanate
IEM: 2-isocyanatoethyl methacrylate
mPDMS: mono-n-butyl terminated monomethacryloxypropyl terminated polydimethylsiloxane (800-1000 MW) (Gelest)
ac-PDMS: bis-3-acryloxy-2-hydroxypropyloxypropyl polydimethylsiloxane
HO-mPDMS: mono-n-butyl terminated mono-(2-hydroxy-3-methacryloxypropyl)-propyl ether terminated polydimethylsiloxane (400-1000 MW) (Ortec or DSM-Polymer Technology Group)
TRIS: 3-methacryloxypropyl tris(trimethylsiloxy)silane
ac-TRIS: 3-acryloxypropyl tris(trimethylsiloxy)silane
am-TRIS: 3-acrylamidopropyl tri(trimethylsiloxy)silane
SiMAA: 2-propenoic acid, 2-methyl-2-hydroxy-3-[3-[1,3,3,3-tetramethyl-1-[(trimethylsilyl)oxy]disiloxanyl]

propoxy]propyl ester (Toray) or 3-(3-(1,1,1,3,5,5,5-heptamethyltrisiloxan-3-yl)propoxy)-2-hydroxypropyl methacrylate or 2-hydroxy-3-[3-methyl-3,3-di(trimethylsiloxy)silylpropoxy]-propyl methacrylate SA2: N-(2,3-dihydroxylpropyl) N-(3-tetra(dimethylsiloxy)dimethylbutylsilane)-propyl) acrylamide or N-3-(butyl-pentadimethylsiloxanyl)propyl-N-(2,3dihydroxypropyl)acrylamide mPEG 950: polyethylene glycol mono-methacrylate (Aldrich)

D30: 3,7-dimethyl-3-octanol (Vigon)
TAM: t-amyl alcohol (BASF)
3E3P: 3-ethyl 3-pentanol
THF: tetrahydrofuran
TPME: tripropylene glycol mono-methyl ether
DA: decanoic acid
DI water: deionized water
MeOH: methanol
IPA: isopropyl alcohol
Norbloc: 2-(2'-hydroxy-5-methacrylyloxyethylphenyl)-2H-benzotriazole (Janssen)
K-KAT 348: bismuth carboxylate catalyst
PP: polypropylene which is the homopolymer of propylene
TT: Tuftec which is a hydrogenated styrene butadiene block copolymer (Asahi Kasei Chemicals)
Z: Zeonor which is a polycycloolefin thermoplastic polymer (Nippon Zeon Co Ltd)
TL03 lights: Phillips TLK 40W/03 bulbs
Borate Buffered Packing Solution: 18.52 grams (300 mmol) of boric acid, 3.7 grams (9.7 mmol) of sodium borate decahydrate, and 28 grams (197 mmol) of sodium sulfate were dissolved in enough deionized water to fill a 2 liter volumetric flask.
TS: tensile strength (psi)
M: Modulus (psi)
ETB: Elongation to Break (%)
T: Toughness (in-lbs/in$^3$)

EXAMPLES

Preparation 1—Synthesis of Ethyl 2-methyl-2-(methyltellanyl)propanoate (Te-Me)

50.0 grams (39.2 mmol) of tellurium powder was reacted with 14.4 mL of a 3.0 M methyl lithium solution (43.1 mmol) in anhydrous THF to form a tellurolate intermediate, which was reacted with 8.82 grams (45.1 mmol) of ethyl α-bromoisobutyrate to form the TERP mediator 2-methyl-2-methyltellanyl-propanoate. The reaction was performed with an ice bath for the metal exchange step. Following the addition of ethyl α-bromoisobutyrate, the reaction mixture was warmed and maintained at room temperature until the reaction was complete (about 2 hours). Thereafter, the THF was removed at reduced pressure in a rotary evaporator. The crude product was vacuum distilled at 50-55° C. (1-2 mbar) to yield the TERP mediator Te-Me and characterized by proton nuclear magnetic resonance spectroscopy. A similar process was used to make ethyl 2-methyl-2-(butyltellanyl)propanoate (Te-Bu) by replacing the methyl lithium with butyl lithium. Te-Bu was purified by vacuum distilled at 80-85° C. (1-2 mbar) and characterized by proton nuclear magnetic resonance spectroscopy.

Examples 1-13

Example 1: 13.5 grams (103.7 mmol) HEMA, 907 milligrams (3.5 mmol) Te-Me, and 578 milligrams (3.5 mmol) AIBN were added into a 1 L reactor and dissolved in 80 grams of 1-propanol. The solution was degassed by bubbling nitrogen gas through the system for 15 minutes at room temperature. The reaction mixture was then heated at 60-62° C. under a nitrogen gas atmosphere for about 3 hours until all of the reactants were consumed. 3.0 grams (23 mmol) HEMA and 30.0 grams (33.3 mmol) mPDMS were dissolved in 30 grams of 1-propanol, degassed by bubbling nitrogen gas through the system for 15 minutes at room temperature, charged into the reaction vessel, and heated at 70-72° C. with constant stirring for about 6 hours until all of the reactants were consumed. Finally, 13.5 grams (103.7 mmol) HEMA were dissolved in 30 grams of 1-propanol, degassed by bubbling nitrogen gas through the system for 15 minutes at room temperature, charged into the reaction vessel, and heated at 60-62° C. with constant stirring for about 4 hours until all of the reactants were consumed. The volatile components of the reaction mixture were removed under reduced pressure in a rotary evaporator. The crude product was re-dissolved in 400 mL of toluene at 60° C. and allowed to cool down. The mixed solvent system was removed by rotary evaporation to yield a crude product free of 1-propanol. The crude product contained a methyl tellurium end group ("Tellurium-Containing Copolymer"). To remove this organometallic end group, the crude product was dissolved in 250 mL toluene containing an amount of TEMPO-free radical representing 3.5 times the theoretical molar amount of methyl tellurium. This solution was heated at 88° C. for 4 hours. The reaction mixture was allowed to cool down and then the volatile components were evaporated at 60-65° C. on a rotary evaporator, yielding a dark orange residue. The residue was dissolved in 1000 mL of acetonitrile at 72° C. for 30 minutes, forming a cloudy solution. The cloudy solution was cooled to room temperature and allowed to settle for at least 1 hour. The solvent was decanted off. This purification process was repeated three times. Then, the "Tri-block Prepolymer 1" was vacuum dried at 60-70° C. The "Tri-block Prepolymer 1" was characterized by proton nuclear magnetic resonance spectroscopy and size exclusion chromatography using a multi-angle laser light scattering detector. Aliquots were taken during the synthesis to determine the composition and average molecular weight of the blocks. Elemental analysis (inductively coupled plasma mass spectroscopy) was also used to determine the effectiveness of the removal of the organo-tellurium end group which averaged over 90% tellurium reduction. In some cases, the tellurium removal efficiency was greater than 95%. Optionally, the "Tri-block Prepolymer 1" may be further purified by dissolving the "Tri-block Prepolymer 1" in THF at a concentration of 1 gram of precursor copolymer per 5 mL of THF in the presence of suspended carbon powder and celite for at least 2 hours. The weight ratio of "Tri-block Prepolymer 1" to carbon powder is 5:1, and weight ratio of "Tri-block Prepolymer 1" to celite is 10:1. The mixture was then vacuum filtered and the filter cake washed with a small amount of THF. The filtrate was added drop-wise to one liter of deionized water with vigorous stirring to precipitate out the purified "Tri-block Prepolymer 1". The purified "Tri-block Prepolymer 1" was isolated by vacuum filtration, washed with deionized water, and vacuum dried at 60-65° C. to constant weight.

The removal of the organo-tellurium end group generates a polymerizable double bond as shown in FIG. 1; the exact chemical structure of the polymerizable double bond depends on the terminal repeating unit; FIG. 1 shows the polymerizable double bond assuming HEMA was the terminal repeating unit. As listed in Table 1, similar procedures were used to make other "Tri-block Prepolymer 1" with poly(HEMA) endblocks and poly(mPDMS-co-HEMA) middle blocks of different theoretical molecular weights or degrees of polymerization (DP, i.e., the number of repeating units in the segment). In all cases, the endblocks were designed to be of equal number average molecular weights, generating a symmetrical triblock copolymer; however, the present invention includes "Tri-block Prepolymer 1" with the endblocks of different number average molecular weights. Actual number average molecular weights ($M_n$) and polydispersities (PS=$M_w/M_n$) of the "Tri-block Prepolymer 1" as measured by SEC-MALS are listed in Table 2.

TABLE 1

| Tri-block Prepolymer 1 | Theoretical DP | | Theoretical % HEMA in the Middle Block | | Theoretical |
|---|---|---|---|---|---|
| | End Blocks | Middle Blocks | Mole Percent to mPDMS | Total Weight Percent | Overall Weight % mPDMS |
| Ex 1 | 15.3 | 19.4 | 67 | 15 | 50 |
| Ex 2 | 17.5 | 15 | 58 | 10 | 50 |
| Ex 3 | 20 | 11 | 41 | 5 | 50 |
| Ex 5 | 21 | 7 | 12 | 1 | 50 |
| Ex 6 | 20 | 11 | 41 | 5 | 50 |
| Ex 7* | 30 | 16 | 41 | 5 | 50 |
| Ex 8* | 39 | 21 | 41 | 10 | 50 |
| Ex 9 | 30 | 16 | 41 | 5 | 50 |
| Ex 10 | 30 | 16 | 41 | 5 | 50 |
| Ex 11 | 30 | 16 | 41 | 5 | 50 |
| Ex 12 | 30 | 16 | 41 | 5 | 50 |
| Ex 13 | 30 | 16 | 41 | 5 | 50 |

*Note:
The tellurium end groups in examples 7 and 8 were not removed by TEMPO. As a result, examples 7 and 8 are "Tellurium-Containing Copolymers."

TABLE 2

| Tri-block Prepolymer 1 | Measured Molecular Weight of the Tri-block Prepolymer 1 | |
|---|---|---|
| | Molecular Weight $M_n$ (g/mol) | Polydispersity (PD) $M_w/M_n$ |
| Ex 1 | 23,400 | 1.20 |
| Ex 2 | 28,500 | 1.49 |
| Ex 3 | 20,500 | 1.35 |
| Ex 5 | 15,600 | 1.05 |
| Ex 6 | 22,100 | 1.08 |
| Ex 7* | 40,900 | 1.09 |
| Ex 8* | 35,000 | 1.06 |
| Ex 9 | 21,400 | 1.21 |
| Ex 10 | 38,900 | 1.20 |
| Ex 11 | 23,400 | 1.04 |
| Ex 12 | 43,600 | 1.15 |
| Ex 13 | 44,200 | 1.17 |

*Note:
The tellurium end groups in examples 7 and 8 were not removed by TEMPO. As a result, examples 7 and 8 are "Tellurium-Containing Copolymers."

Examples 14-26

Example 14—Acylation with Methacryloyl Chloride: 68.0 grams (containing 261.4 mmol hydroxyl groups) of tri-block prepolymer 1 PHEMA-b-poly[HEMA-co-mPDMS]-b-PHEMA and 2.90 grams of triethylamine (28.7 mmol) were dissolved in 400 mL of anhydrous THF and chilled in an ice bath. 2.73 grams (26.1 mmol) of methacryloyl chloride (MCL) was added slowly, targeting 10 mole percent acylation with pendant methacrylate groups. The solution was stirred at the ice bath temperature for additional 15 minutes and then warmed to room temperature. The reaction mixture was stirred for minimum 3 hours to complete the reaction.

The reaction mixture was diluted with 300 mL of IPA. 32 grams of carbon powder and 50 grams of celite were added, and the resulting suspension was stirred at room temperature for at least 2 hours. The reaction mixture was filtered and the filter cake was washed with 50 mL of IPA. The filtrate was concentrated by rotary evaporation. The concentrated reaction mixture was added slowly into two liters of deionized water while stirring vigorously. The tri-block prepolymer 2 precipitated out of solution and was isolated by filtration. The tri-block prepolymer 2 was washed with 500 mL of deionized water in the filtration funnel and vacuum dried at 60-65° C. The tri-block prepolymer 2 was characterized by proton nuclear magnetic resonance spectroscopy and size exclusion chromatography using a multi-angle laser light scattering detector ($M_w$=43.1 kDa; $M_w/M_n$=1.08).

Various tri-block prepolymers 2 were prepared using a similar synthetic scheme and listed in Table 3.

TABLE 3

| Tri-block Prepolymer 2 | Tri-block Prepolymer 1 | Target % Acylation | Measured $M_w$ (kDa) | PD |
|---|---|---|---|---|
| Ex 14 | Ex 9 | 10 | 43.1 | 1.08 |
| Ex 15 | Ex 5 | 10 | 22.5 | 1.20 |
| Ex 16 | Ex 3 | 10 | 19.7 | 1.26 |
| Ex 17 | Ex 2 | 10 | Not measured | Not measured |
| Ex 18 | Ex 6 | 10 | 34.0 | 1.11 |
| Ex 19 | Ex 7* | 10 | 45.4 | 1.11 |
| Ex 20 | Ex 8* | 10 | 62.0 | 1.22 |
| Ex 21 | Ex 10 | 10 | 55.5 | 1.30 |
| Ex 22 | Ex 11 | 10 | 34.0 | 1.05 |
| Ex 23 | Ex 12 | 5.5 | 47.7 | 1.14 |
| Ex 24 | Ex 13 | 5 | 51.8 | 1.17 |

*Note:
The tellurium end groups in examples 7 and 8 were not removed by TEMPO. As a result, examples 7 and 8 are "Tellurium-Containing Copolymers."

Other acylating agents may be used to functionalize the precursor copolymers including but not limited to methacrylic anhydride, isopropenyl α,α-dimethylbenzyl isocyanate (TMI) and 2-isocyanatoethyl methacrylate (IEM) along with any standard co-reagents and catalysts.

Example 25—1.51 grams (15.1 mmol) methyl methacrylate, 10.3 grams (79.1 mmol) HEMA, 922 milligrams (3.56 mmol) Te-Me, and 587 milligrams (3.57 mmol) AIBN were added into a 1 L reactor and dissolved in 236 grams of 1-propanol. The solution was degassed by bubbling nitrogen gas through the system for 15 minutes at room temperature. The reaction mixture was then heated at 60-62° C. under a nitrogen gas atmosphere for about 3 hours until all of the reactants were consumed. 2.01 grams (20.1 mmol) methyl methacrylate, 13.7 grams (105 mmol) HEMA and 39.5 grams (43.9 mmol) mPDMS were dissolved in 30 grams of 1-propanol, degassed by bubbling nitrogen gas through the system for 15 minutes at room temperature, charged into the reaction vessel, and heated at 75° C. with constant stirring for about 6 hours until all of the reactants were consumed. Finally, 10.3 grams (79.1 mmol) HEMA were dissolved in 30 grams of 1-propanol, degassed by bubbling nitrogen gas through the system for 15 minutes at room temperature, charged into the reaction vessel, and heated at 60-62° C. with constant stirring for about 4 hours until all of the reactants were consumed. The volatile components of the reaction mixture were removed under reduced pressure in a rotary evaporator. The crude product was re-dissolved in 400 mL of toluene at 60° C. and allowed to cool down. The mixed solvent system was removed by rotary evaporation to yield a crude product free of 1-propanol. The crude product contained a methyl tellurium end group ("Tellurium-Containing Copolymer"). To remove this organometallic end group, the crude product was dissolved in 250 mL toluene containing an amount of TEMPO-free radical representing 5.5 times the theoretical molar amount of methyl tellurium (2.99 grams or 19.1 mmol). This solution was heated at 88° C. for 4 hours. The reaction mixture was allowed to cool down and then the volatile components were evaporated at 60-65° C. on a rotary evaporator, yielding a dark orange residue. The residue was dissolved in 1000 mL of acetonitrile at 72° C. for 30 minutes, forming a cloudy solution. The cloudy solution was cooled to room temperature and allowed to settle for at least 1 hour. The solvent was decanted off. This purification process was repeated three times. The tri-block prepolymer 1 was vacuum dried at 60-70° C. yielding 49 grams of product. The tri-block prepolymer 1 was characterized by proton nuclear magnetic resonance spectroscopy and size exclusion chromatography using a multi-angle laser light scattering detector [$M_n$=46 kDa; $M_w$=57 kDa].

23.6 grams of tri-block prepolymer 1, 2.46 grams (11.9 mmol) of TMI, and 15 milligrams of K-KAT 348 were dissolved in 200 mL of toluene and heated to 85-88° C. for 3 hours. The reaction mixture was allowed to cool down and the solvent removed on a rotary evaporator at 60° C. The crude product was then dissolved into 500 mL of acetonitrile at 68-70° C. and allowed to cool down at 4° C. in the refrigerator to precipitate out the tri-block prepolymer. The supernatant liquid was decanted off and discarded. The residue was vacuum dried at 60-65° C., yielding the TMI endcapped tri-block prepolymer 2.

Example 26—5.0 grams of tri-block prepolymer 1 made in example 25, 389 milligrams (2.51 mmol) of IEM, and 2.1 milligrams of K-KAT 348 were dissolved in 25 mL of anhydrous THF and heated to 60-65° C. for 3 hours. The reaction mixture was allowed to cool down to room temperature and then poured slowing into 400 mL of deionized water with vigorous stirring. The resulting suspension was stirred at room temperature for 30 minutes, and the crude product isolated by vacuum filtration. The filter cake was washed with deionized water and vacuum dried at 60° C. to constant weight, yielding the IEM endcapped tri-block prepolymer 2.

Examples 27-34

A master reactive monomer mixture was formed by mixing the reactive components listed in Table 4. Various amounts of methacrylic acid were added to about 10 mL aliquots of this master batch to obtain the formulations listed in Table 5 with varying weight percentages of MAA ranging from 0.5 weight percent to 3.0 weight percent. These formulations were then filtered through a 3 μm filter using a heated or unheated stainless steel or glass syringe and degassed by applying vacuum (about 40 mm Hg) at ambient temperature for about 10 minutes. In a glove box with a nitrogen gas atmosphere and less than 0.1-0.2 percent oxygen gas, about 75-100 μL of these formulations were dosed using an Eppendorf pipet at room temperature into the FC typically made of Zeonor, Tuftec, polypropylene or blends thereof. The BC typically made of Zeonor, Tuftec, polypropylene or blends thereof was then placed onto the FC. Typically, the FC was made from a 55:45 (w/w) blend of Z:PP, while the BC was made only of Z. The molds were equilibrated for a minimum of twelve hours in the glove box prior to dosing. The plate was transferred into an adjacent glove box maintained at 60-65° C., and the lenses were cured from the top for 15-20 minutes using TL03 lights having intensity of 5.0-5.5 mW/cm$^2$. The light source was about six inches above the trays.

The lenses were manually de-molded with most lenses adhering to the FC and released by suspending the lenses in about one liter of 70 percent IPA for about one or two hours, followed by washing two times with 70 percent IPA, optionally two times with 25 percent IPA, two times with DI, and finally two times with borate buffered packaging solution. Each washing step lasted about 30 minutes. A person of ordinary skill recognizes that the exact lens release process can be varied depending on the lens formulation and mold materials, regarding the concentrations of the aqueous isopropanol solutions, the number of washings with each solvent, and the duration of each step. The purpose of the lens release process is to release all of the lenses without defects and transition from diluent swollen networks to the packaging solution swollen hydrogels. The lenses were transferred into vials and subsequently sterilized by autoclaving at 122° C. for 30 minutes. The physical and mechanical properties of the sterile lenses were measured and listed in Table 5.

TABLE 4

| Component | Weight Percent |
| --- | --- |
| Tri-Block Prepolymer 2 (Ex 17) | 18 |
| mPDMS | 38.5 |
| DMA | 28 |
| HEMA | 5.25 |
| MAA | Varied |
| PVP K90 | 7.5 |
| TEGDMA | 1 |
| Norbloc | 1.5 |
| Blue HEMA | 0.02 |
| CGI 1870 | 0.23 |
| Diluent D3O | 23 |

TABLE 5

| Example | Weight Percent MMA | Ionicity (mole %) | Weight % Water | % Haze | DCA (adv) | Mechanicals M (psi) | % ETD | Dk | Lysozyme Uptake (μg/lens) | Lipid Uptake (μg/lens) |
| --- | --- | --- | --- | --- | --- | --- | --- | --- | --- | --- |
| Ex 27 | 0.5 | 1.5 | 49 | <10 | 64 | 72 | 114 | 83 | 18 | 6.76 |
| Ex 28 | 0.75 | 2.25 | 50 | <10 | 52 | 78 | 107 | 83 | 57 | 7.54 |
| Ex 29 | 1 | 3 | 53 | <10 | 59 | 67 | 133 | 88 | 102 | 7.56 |
| Ex 30 | 1.25 | 3.75 | 53 | <10 | 51 | 70 | 118 | 86 | 149 | 6.25 |
| Ex 31 | 1.5 | 5.5 | 54 | <10 | 46 | 68 | 123 | 81 | 229 | 9.51 |
| Ex 32 | 2 | 6 | 56 | <10 | 50 | 58 | 129 | 60 | 413 | 11.41 |

TABLE 5-continued

| Example | Weight Percent MMA | Ionicity (mole %) | Weight % Water | % Haze | DCA (adv) | Mechanicals M (psi) | % ETD | Dk | Lysozyme Uptake (μg/lens) | Lipid Uptake (μg/lens) |
|---|---|---|---|---|---|---|---|---|---|---|
| Ex 33 | 2.5 | 7.5 | 58 | <10 | 77 | 67 | 86 | 80 | 505 | 13.2 |
| Ex 34 | 3 | 11 | 60 | <10 | 80 | 58 | 130 | 78 | 583 | 14.9 |

Both water content and lysozyme uptake increased linearly with the weight fraction of MAA in the formulation. Lipid uptake also increased. Examples 29-31 have a good balance of physical, mechanical and biological properties.

Examples 35-38

Reactive mixtures were formed by mixing the reactive components listed in Table 6, using different tri-block prepolymers 2 as denoted in Table 7. These formulations were filtered through a 3 μm filter using a heated or unheated stainless steel or glass syringe and degassed by applying vacuum (about 40 mm Hg) at ambient temperature for about 10 minutes. In a glove box with a nitrogen gas atmosphere and less than 0.1-0.2 percent oxygen gas, about 75-100 μL of the reactive mixture were dosed using an Eppendorf pipet at room temperature into the FC typically made of Zeonor, Tuftec, polypropylene or blends thereof. The BC typically made of Zeonor, Tuftec, polypropylene or blends thereof was then placed onto the FC. Typically, the FC was made from a 55:45 (w/w) blend of Z:PP, while the BC was made only of Z. The molds were equilibrated for a minimum of twelve hours in the glove box prior to dosing. The plate was transferred into an adjacent glove box maintained at 60-65° C., and the lenses were cured from the top for 15-20 minutes using TL03 lights having intensity of 5.0-5.5 mW/cm². The light source was about six inches above the trays.

The lenses were manually de-molded with most lenses adhering to the FC and released by suspending the 64 lenses in about one liter of 70 percent IPA for about one or two hours, followed by washing two times with 70 percent IPA, optionally two times with 25 percent IPA, two times with DI, and finally two times with borate buffered packaging solution. Each washing step lasted about 30 minutes. A person of ordinary skill recognizes that the exact lens release process can be varied depending on the lens formulation and mold materials, regarding the concentrations of the aqueous isopropanol solutions, the number of washings with each solvent, and the duration of each step. The purpose of the lens release process is to release all of the lenses without defects and transition from diluent swollen networks to the packaging solution swollen hydrogels. The lenses were transferred into vials and subsequently sterilized by autoclaving at 122° C. for 30 minutes. The physical and mechanical properties of the sterile lenses were measured and listed in Table 7.

TABLE 6

| Component | Weight Percent Example 35 | Weight Percent Examples 36-38 |
|---|---|---|
| Tri-Block Prepolymer 2 (varied) | 18 | 17.8 |
| mPDMS | 38.8 | 38 |
| DMA | 28 | 27.4 |
| HEMA | 4.75 | 4.65 |
| MAA | 1 | 1 |
| METAC | 1 | 1 |
| PVP K90 | 7.8 | 7.5 |
| TEGDMA | 0.9 | 0.9 |
| Norbloc | 1.5 | 1.5 |
| CGI 1870 | 0.23 | 0.23 |
| Diluent D3O | 30 | 23 |

TABLE 7

| Example | Tri_Block Pre-Polymer 2 Example # and $M_w$ (kDa) | Weight % Water | % Haze | DCA (adv) | Mechanicals M (psi) | % ETB | Dk | Lysozyme Uptake (μg/lens) | PQ1 Uptake (%) |
|---|---|---|---|---|---|---|---|---|---|
| Ex 35 | Ex 16 40.2 | 51 | 14 | 61 | 79 | 138 | 108 | 105 | 6 |
| Ex 36 | Ex 18 40.7 | 54 | 8 | 74 | 50 | 206 | 82 | 202 | 3 |
| Ex 37 | Ex 19 50.9 | 52 | 9 | 54 | 53 | 162 | 91 | 174 | 4 |
| Ex 38 | Ex 20 77.5 | 51 | 8 | 35 | 73 | 153 | 88 | 148 | 1 |

Examples 35-38 exhibited good balances of physical, mechanical, and biological properties in which Dk and PQ1 uptake decreased as the molecular weight of the tri-block prepolymer increased. Example 38 in particular has an exceptional balance of properties.

Examples 39-45

A master reactive monomer mixture was formed by mixing the reactive components listed in Table 8. Various amounts of MAA and METAC were added to about 10 gram aliquots of this master batch to obtain the formulations listed in Table 9 with varying molar ratios of these two monomers keeping the concentration of MAA constant at 1 weight percent and varying the amount of METAC to achieve the desired molar ratio. These formulations were then filtered through a 3 μm filter using a heated or unheated stainless steel or glass syringe and degassed by applying vacuum (about 40 mm Hg) at ambient temperature for about 10 minutes. In a glove box with a nitrogen gas atmosphere and less than 0.1 percent oxygen gas, about 75-100 μL of the reactive mixture were dosed using an Eppendorf pipet at room temperature into the FC typically made of Zeonor, Tuftec, polypropylene or blends thereof. The BC typically made of Zeonor, Tuftec, polypropylene or blends thereof was then placed onto the FC. Typically, the FC was made from a 55:45 (w/w) blend of Z:PP, while the BC was made only of Z. The molds were equilibrated for a minimum of twelve hours in the glove box prior to dosing. The plate was transferred into an adjacent glove box maintained at 60-65° C., and the lenses were cured from the top for 15-20 minutes using TLO3 lights having intensity of 5.0-5.5 mW/cm². The light source was about six inches above the trays.

The lenses were manually de-molded with most lenses adhering to the FC and released by suspending the 64 lenses in about one liter of 70 percent IPA for about one or two hours, followed by washing two times with 70 percent IPA, optionally two times with 25 percent IPA, two times with DI, and finally two times with borate buffered packaging solution. Each washing step lasted about 30 minutes. A person of ordinary skill recognizes that the exact lens release process can be varied depending on the lens formulation and mold materials, regarding the concentrations of the aqueous isopropanol solutions, the number of washings with each solvent, and the duration of each step. The purpose of the lens release process is to release all of the lenses without defects and transition from diluent swollen networks to the packaging solution swollen hydrogels. The lenses were transferred into vials and subsequently sterilized by autoclaving at 122° C. for 30 minutes. The physical and mechanical properties of the sterile lenses were measured and listed in Table.

TABLE 8

| Component | Weight Percent Example 39 | Weight Percent Example 40 | Weight Percent Example 41 | Weight Percent Examples 42-45 |
|---|---|---|---|---|
| Tri-Block Prepolymer 2 (Ex 14) | 18 | 18 | 18 | 18 |
| mPDMS | 38 | 0 | 0 | 0 |
| OH-mPDMS ($M_n$ = 1000 g/mol) | | 38 | 38 | 38 |
| DMA | 28.4 | 28.4 | 28.4 | 28.4 |
| HEMA | 4.95 | 4.95 | 4.95 | 4.95 |
| MAA (1 weight percent) | Molar Ratio 1:1 | Molar Ratio 1:1 | Molar Ratio 1:1 | Molar Ratio Varied |
| METAC (weight percent varied to achieve molar ratio) | | | | |
| PVP K90 | 8 | 8 | 8 | 8 |
| TEGDMA | 0.9 | 0.9 | 0.9 | 0.9 |
| Norbloc | 1.5 | 1.5 | 1.5 | 1.5 |
| Blue HEMA | 0.02 | 0.02 | 0.02 | 0.02 |
| CGI 1870 | 0.23 | 0 | 0 | 0 |
| CGI 819 | 0 | 0.23 | 0.23 | 0.23 |
| Diluent D3O | 23 | 23 | 23 | 23 |

TABLE 9

| Property | Ex 39 | Ex 40 | Ex 41 | Ex 42 | Ex 43 | Ex 44 | Ex 45 |
|---|---|---|---|---|---|---|---|
| MAA:METAC (mol:mol) | 1:1 | 1:1 | 1:1 | 1.5:1 | 2:1 | 3:1 | 4:1 |
| Modulus (psi) | 81 | 82 | 94 | 76 | 79 | 69 | 69 |
| % ETB | 264 | 263 | 180 | 217 | 218 | 221 | 221 |
| Tensile Strength (psi) | 72 | 67 | 71 | 58 | 61 | 56 | 56 |
| Toughness | 110 | 103 | 74 | 74 | 79 | 71 | 70 |
| Wt. % Water | 47 | 47.6 | 67 | 50.8 | 52.1 | 52.1 | 51.5 |
| Dk | 83 | 74 | 67 | — | 71 | 60 | 70 |
| DCA (°) (adv) | 97 | 87 | 82 | — | 85 | 90 | 82 |
| Lysozyme Update (μg/lens) | Not Measured | | | 82 | 118 | 212 | 215 |
| PQ1 Uptake (%) | | | | 1.37 | 5.01 | 10.98 | 12.73 |

Physical and mechanical properties were not affected significantly by changing the initiator or using a hydroxyl-siloxane macromer. Example 40 used a different initiator 1819; example 41 used a different initiator 1819 and a different silicone macromer, namely OH-mPDMS ($M_n$=1000 g/mol) as shown in Formula II. Lysozyme uptake increased with the amount of methacrylic acid in the reactive monomer mixture.

Example 46

0.254 grams (2.56 mmol) DMA, 2.12 grams (13.3 mmol) bis-HEAA, 164 milligrams (0.64 mmol) Te-Me, and 104 milligrams (0.64 mmol) AIBN were added into a 250 mL reactor and dissolved in 28.7 grams of 1-propanol. The solution was degassed by bubbling nitrogen gas through the system for 15 minutes at room temperature. The reaction mixture was then heated at 60-62° C. under a nitrogen gas atmosphere for about 3.5 hours until all of the reactants were consumed. 1.42 grams (8.92 mmol) bis-HEAA and 6.18 grams (10.3 mmol) SA2 were degassed by bubbling nitrogen gas through the system for 15 minutes at room temperature, charged into the reaction vessel, and heated at 70-72° C. with constant stirring for about 14 hours until all of the reactants were consumed. Finally, 0.255 grams (2.56 mmol) DMA and 2.11 grams (13.3 mmol) bis-HEAA were degassed by bubbling nitrogen gas through the system for 15 minutes at room temperature, charged into the reaction vessel, and heated at 65° C. with constant stirring for about 4 hours until all of the reactants were consumed. The volatile components of the reaction mixture were removed under reduced pressure in a rotary evaporator. The crude product was re-dissolved in 100 mL of toluene at 60° C. and allowed to cool down. The mixed solvent system was removed by rotary evaporation to yield a crude product free of 1-propanol. The crude product was dissolved in 25 mL toluene containing 150 milligrams (0.96 mmol) of TEMPO-free radical. This solution was heated at 88° C. for 3.5 hours. The reaction mixture was allowed to cool down and then the volatile components were evaporated at 60-65° C. on a rotary evaporator. The residue was dissolved in a small volume of IPA, diluted with 150 mL of acetonitrile, stirred vigorously for 15 minutes, and allowed to settle for at least 30 minutes. The solvent was decanted off. This purification process was repeated three times. Then, the tri-block prepolymer 1 in which all three blocks were copolymers was vacuum dried at 60-70° C. to constant weight.

Example 47

0.25 grams (2.56 mmol) DMA, 2.13 grams (13.4 mmol) bis-HEAA, 160 milligrams (0.62 mmol) Te-Me, and 100 milligrams (0.60 mmol) AIBN were added into a 250 mL reactor and dissolved in 28.4 grams of 1-propanol. The solution was degassed by bubbling nitrogen gas through the system for 15 minutes at room temperature. The reaction mixture was then heated at 60-62° C. under a nitrogen gas atmosphere for about 3.5 hours until all of the reactants were consumed. 1.26 grams (7.90 mmol) bis-HEAA and 6.20 grams (6.2 mmol) mPDMS were degassed by bubbling nitrogen gas through the system for 15 minutes at room temperature, charged into the reaction vessel, and heated at 70-72° C. with constant stirring for about 14 hours until all of the reactants were consumed. Finally, 0.254 grams (2.56 mmol) DMA and 2.13 grams (13.4 mmol) bis-HEAA were degassed by bubbling nitrogen gas through the system for 15 minutes at room temperature, charged into the reaction vessel, and heated at 65° C. with constant stirring for about 4 hours until all of the reactants were consumed. The volatile components of the reaction mixture were removed under reduced pressure in a rotary evaporator. The crude product was re-dissolved in 100 mL of toluene at 60° C. and allowed to cool down. The mixed solvent system was removed by rotary evaporation to yield a crude product free of 1-propanol. The crude product was dissolved in 50 mL toluene containing 375 milligrams (2.40 mmol) of TEMPO-free radical. This solution was heated at 88° C. for 3 hours. The reaction mixture was allowed to cool down and then the volatile components were evaporated at 60-65° C. on a rotary evaporator. The residue was dissolved in 5 mL of IPA, diluted with 150 mL of acetonitrile, stirred vigorously for 15 minutes, and allowed to settle for at least 30 minutes. The solvent was decanted off. This purification process was repeated three times. Then, the tri-block prepolymer 1 in which all three blocks were copolymers was vacuum dried at 60-70° C. to constant weight. Examples 46-47 are summarized in Table 10.

TABLE 10

| Tri-block | Composition | | | Theoretical DP | | |
|---|---|---|---|---|---|---|
| Prepolymer 1 | A Block | B Block | C Block | A Block | B Block | C Block |
| Ex 46 | DMA/Bis-HEAA | SA2/Bis-HEAA | DMA/Bis-HEAA | 25 | 30 | 25 |
| Ex 47 | DMA/Bis-HEAA | mPDMS/Bis-HEAA | DMA/Bis-HEAA | 25 | 24 | 25 |

Example 48

2.87 grams of tri-block prepolymer 1 from Example 46, 257 milligrams (1.3 mmol) of TMI, and 1 milligram of K-KAT 348 were dissolved in 25 mL of toluene and heated to 85-88° C. for 4 hours. The reaction mixture was allowed to cool down and the solvent removed on a rotary evaporator at 60° C. The crude product was then dissolved into about 50 mL of acetonitrile at 68-70° C. and allowed to cool down at 4° C. in the refrigerator to precipitate out the tri-block prepolymer. The supernatant liquid was decanted off and discarded. The residue was vacuum dried at 60-65° C., yielding a TMI end-capped tri-block prepolymer 2.

Example 49

6.28 grams of tri-block prepolymer 1 from Example 47, 553 milligrams (2.75 mmol) of TMI, and 2 milligram of K-KAT 348 were dissolved in 50 mL of toluene and heated to 85-88° C. for 4 hours. The reaction mixture was allowed to cool down and the solvent removed on a rotary evaporator at 60° C. The crude product was then dissolved into about 50 mL of acetonitrile at 68-70° C. and allowed to cool down at 4° C. in the refrigerator to precipitate out the tri-block prepolymer. The supernatant liquid was decanted off and discarded. To remove some insoluble particles, the crude product was then dissolved in 50 mL of 1-propanol, and 5 grams of carbon powder and 5 grams of celite were added. The suspension was stirred and vacuum filtered. The filtrate was transferred into a round bottom flask, and the solvent removed by rotary evaporation. The solid residue was vacuum dried at 60-65° C., yielding a TMI end-capped tri-block prepolymer 2. Examples 48 and 49 are summarized in Table 11 showing the measured weight average molecular weight as measured by SEC-MALS.

TABLE 11

| Tri-block Prepolymer 2 | Composition | | | % Si | $M_w$ (kDa) | PD |
|---|---|---|---|---|---|---|
| | A Block | B Block | C Block | | | |
| Ex 48 | DMA/Bis-HEAA | SA2/Bis-HEAA | DMA/Bis-HEAA | 11.7 | 25 | 1.11 |
| Ex 49 | DMA/Bis-HEAA | mPDMS/Bis-HEAA | DMA/Bis-HEAA | 16 | 66.4 | 1.15 |

Examples 50-51

Reactive mixtures were formed by mixing the reactive components listed in Table 12. These formulations were filtered through a 3 μm filter using a heated or unheated stainless steel or glass syringe and degassed by applying vacuum (about 40 mm Hg) at ambient temperature for about 10 minutes. In a glove box with a nitrogen gas atmosphere and less than 0.1-0.2 percent oxygen gas, about 75-100 μL of the reactive mixture were dosed using an Eppendorf pipet at room temperature into the FC typically made of Zeonor, Tuftec, polypropylene or blends thereof. The BC typically made of Zeonor, Tuftec, polypropylene or blends thereof was then placed onto the FC. Typically, the FC was made from a 55:45 (w/w) blend of Z:PP, while the BC was made only of Z. The molds were equilibrated for a minimum of twelve hours in the glove box prior to dosing. The plate was transferred into an adjacent glove box maintained at 60° C., and the lenses were cured from the top for 15 minutes using TL03 lights having intensity of 5.0 mW/cm². The light source was about six inches above the trays.

The lenses were manually de-molded with most lenses adhering to the FC and released by suspending the 64 lenses in about one liter of 70 percent IPA for about one or two hours, followed by washing two times with 70 percent IPA, two times with DI, and finally two times with borate buffered packaging solution. Each washing step lasted about 30 minutes. A person of ordinary skill recognizes that the exact lens release process can be varied depending on the lens formulation and mold materials, regarding the concentrations of the aqueous isopropanol solutions, the number of washings with each solvent, and the duration of each step. The purpose of the lens release process is to release all of the lenses without defects and transition from diluent swollen networks to the packaging solution swollen hydrogels. The lenses were transferred into vials and subsequently sterilized by autoclaving at 122° C. for 30 minutes. The physical and mechanical properties of the sterile lenses were measured and listed in Table 13.

TABLE 12

| Component | Weight Percent Example 50 | Weight Percent Example 51 |
|---|---|---|
| Tri-Block Prepolymer 2 - Ex. 48 | 18 | 0 |
| Tri-Block Prepolymer 2 - Ex. 49 | 0 | 18 |
| mPDMS | 38 | 38 |
| DMA | 27.4 | 27.4 |
| HEMA | 4.95 | 4.95 |
| MAA | 1 | 1 |
| METAC | 1 | 1 |
| PVP K90 | 7 | 7 |
| TEGDMA | 0.9 | 0.9 |
| Norbloc | 1.5 | 1.5 |
| Blue HEMA | 0.02 | 0.02 |
| CGI 1870 | 0.23 | 0.23 |
| Diluent D3O | 30 | 30 |

TABLE 13

| Example | Weight % Water | % Haze | DCA (adv, °) | Mechanicals | | | | Dk | Lysozyme Uptake (µg/lens) | Lipid Uptake (µg/lens) |
|---|---|---|---|---|---|---|---|---|---|---|
| | | | | TS (psi) | M (psi) | % ETB | Toughness | | | |
| Ex 50 | 53 | 47 | 62 | 57 | 98 | 116 | 39 | 80 | 420 | 3.73 |
| Ex 51 | 53 | 15 | 62 | 55 | 91 | 145 | 48 | 69 | 223 | 4.46 |

What is claimed is:

1. A tri-block prepolymer for making biomedical devices comprising formula

[A]-[B]-[C], wherein

[A] and [C] are independently polymeric segments formed from a first hydrophilic monomer comprising functionality selected from the group consisting of hydroxyalkyl, aminoalkyl, and mixtures thereof and optionally one or more second hydrophilic monomers; and

[B] is a polymeric segment formed from a silicone-containing macromer; optionally a third hydrophilic monomer comprising functionality selected from the group consisting of hydroxyalkyl, aminoalkyl, and mixtures thereof; and optionally a silicone-containing monomer; and wherein said tri-block prepolymer comprises at least one monovalent reactive group, and wherein the tri-block prepolymer is formed using an organotellurium mediated living radical polymerization (TERP) mediator.

2. The tri-block prepolymer of claim 1, wherein the at least one monovalent reactive group is an end group.

3. The tri-block prepolymer of claim 1 comprising a plurality of monovalent reactive groups comprising a monovalent reactive end group and one or more monovalent reactive pendant groups.

4. The tri-block prepolymer of claim 3, wherein the monovalent reactive group content is in the range of about 1 to about 25 mole percent of pre-acylated hydroxyalkyl or aminoalkyl content.

5. The tri-block prepolymer of claim 4, wherein the monovalent reactive pendant group content is in the range of about 1 to about 10 mole percent.

6. The tri-block prepolymer of claim 1 having a weight average molecular in the range of about 10 to about 100 kDa.

7. The tri-block prepolymer of claim 6 having a weight average molecular in the range of about 20 to about 80 kDa.

8. The tri-block prepolymer of claim 7 having a weight average molecular in the range of about 20 to about 60 kDa.

9. The tri-block prepolymer of claim 8 having a weight average molecular in the range of about 20 to about 50 kDa.

10. The tri-block prepolymer of claim 1, wherein the first hydrophilic monomer is the same as the third hydrophilic monomer.

11. The tri-block prepolymer of claim 1, wherein the monovalent reactive group is selected from the group consisting of (meth)acrylate, (meth)acrylamide, styryl, vinyl, N-vinyl lactam, N-vinylamide, O-vinylether, O-vinylcarbonate, O-vinylcarbamate, and mixtures thereof.

12. The tri-block prepolymer of claim 1, wherein the first hydrophilic monomer comprises a $C_2$-$C_8$ linear or branched hydroxyalkyl (meth)acrylate, a $C_2$-$C_8$ linear or branched dihydroxyalkyl (meth)acrylate, a $C_2$-$C_8$ linear or branched trihydroxyalkyl (meth)acrylate, a N— $C_2$-$C_6$ linear or branched hydroxyalkyl (meth)acrylamide, a N,N-bis $C_2$-$C_6$ linear or branched hydroxyalkyl (meth)acrylamide, a N—$C_2$-$C_8$ linear or branched dihydroxyalkyl (meth)acrylamide, a N,N-bis $C_2$-$C_8$ linear or branched dihydroxyalkyl (meth)acrylamide, a N— $C_2$-$C_8$ linear or branched trihydroxyalkyl (meth)acrylamide, a N,N-bis $C_2$-$C_8$ linear or branched trihydroxyalkyl (meth)acrylamide, or mixtures thereof.

13. The tri-block prepolymer of claim 12, wherein the first hydrophilic monomer comprises 2-hydroxyethyl (meth)acrylate, 2-hydroxypropyl (meth)acrylate, 3-hydroxypropyl (meth)acrylate, 2,3-dihydroxypropyl (meth)acrylate, 2-hydroxybutyl (meth)acrylate, 3-hydroxybutyl (meth)acrylate, 4-hydroxybutyl (meth)acrylate, N-(2-hydroxyethyl) (meth)acrylamide, N,N-bis(2-hydroxyethyl) (meth)acrylamide, N-(2-hydroxypropyl) (meth)acrylamide, N,N-bis(2-hydroxypropyl) (meth)acrylamide, N-(3-hydroxypropyl) (meth)acrylamide, N-(2-hydroxybutyl) (meth)acrylamide, N-(3-hydroxybutyl) (meth)acrylamide, N-(4-hydroxybutyl) (meth)acrylamide, or mixtures thereof.

14. The tri-block prepolymer of claim 1, wherein the first hydrophilic monomer of both segments [A] and [C] is 2-hydroxyethyl (meth)acrylate.

15. The tri-block prepolymer of claim 1, wherein [A] and [C] independently further comprise the second hydrophilic monomer that comprises acrylamide, N,N-dimethylacrylamide, N-vinylpyrrolidone, N-vinyl acetamide, N-vinyl N-methyl acetamide, N-isopropyl acrylamide, polyethylene glycol monoacrylate, polyethylene glycol monomethacrylate, acrylic acid, methacrylic acid, N-[(ethenyloxy)carbonyl]-β-alanine, 3-acrylamidopropanoic acid, 5-acrylamidopropanoic acid, 2-(methacryloyloxy)ethyl trimethylammonium chloride, 2-acrylamido-2-methylpropane sulfonic acid, 1-propanaminium, N-(2-carboxyethyl)-N,N-dimethyl-3-[(1-oxo-2-propen-1-yl)amino]-, inner salt; carboxybetaine, 1-propanaminium, N,N-dimethyl-N-[3-[(1-oxo-2-propen-1-yl)amino]propyl]-3-sulfo-, inner salt; 3,5-dioxa-8-aza-4-phosphaundec-10-en-1-aminium, 4-hydroxy-N,N,N-trimethyl-9-oxo-, inner salt, 4-oxide (9CI), or mixtures thereof.

16. The tri-block prepolymer of claim 15, wherein the repeating units of the second hydrophilic monomer are present independently in segments [A] and [C] in the range of about 1 to about 50 mole percent.

17. The tri-block prepolymer of claim 16, wherein the repeating units of the second hydrophilic monomer are present independently in segments [A] and [C] in the range of about 1 to about 25 mole percent.

18. The tri-block prepolymer of claim 17, wherein the repeating units of the second hydrophilic monomer are present independently in segments [A] and [C] in the range of about 1 to about 15 mole percent.

19. The tri-block prepolymer of claim 18, wherein the repeating units of the second hydrophilic monomer are present independently in segments [A] and [C] in the range of about 1 to about 10 mole percent.

20. The tri-block prepolymer of claim 1, wherein [B] further comprises the third hydrophilic monomer that comprises a $C_2$-$C_8$ linear or branched hydroxyalkyl (meth)acrylate, a $C_2$-$C_8$ linear or branched dihydroxyalkyl (meth)acrylate, a $C_2$-$C_8$ linear or branched trihydroxyalkyl (meth)acrylate, a N— $C_2$-$C_6$ linear or branched hydroxyalkyl (meth)acrylamide, a N,N-bis $C_2$-$C_6$ linear or branched hydroxyalkyl (meth)acrylamide, a N— $C_2$-$C_8$ linear or branched dihydroxyalkyl (meth)acrylamide, a N,N-bis $C_2$-$C_8$ linear or branched dihydroxyalkyl (meth)acrylamide, a N— $C_2$-$C_8$ linear or branched trihydroxyalkyl (meth)acrylamide, a N,N-bis $C_2$-$C_8$ linear or branched trihydroxyalkyl (meth)acrylamide, or mixtures thereof.

21. The tri-block prepolymer of claim 20, wherein the third hydrophilic monomer comprises 2-hydroxyethyl (meth)acrylate, 2-hydroxypropyl (meth)acrylate, 3-hydroxypropyl (meth)acrylate, 2,3-dihydroxypropyl (meth)acrylate, 2-hydroxybutyl (meth)acrylate, 3-hydroxybutyl (meth)acrylate, 4-hydroxybutyl (meth)acrylate, N-(2-hydroxyethyl) (meth)acrylamide, N,N-bis(2-hydroxyethyl) (meth)acrylamide, N-(2-hydroxypropyl) (meth)acrylamide, N,N-bis(2-hydroxypropyl) (meth)acrylamide, N-(3-hydroxypropyl) (meth)acrylamide, N-(2-hydroxybutyl) (meth)acrylamide, N-(3-hydroxybutyl) (meth)acrylamide, N-(4-hydroxybutyl) (meth)acrylamide, or mixtures thereof.

22. The tri-block prepolymer of claim 21, wherein the first hydrophilic monomer and the third hydrophilic monomer both comprise 2-hydroxyethyl (meth)acrylate.

23. The tri-block prepolymer of claim 20, wherein the repeating units of the third hydrophilic monomer are present in segment [B] in the range of about 1 to about 70 mole percent.

24. The tri-block prepolymer of claim 23, wherein the repeating units of the third hydrophilic monomer are present in segment [B] in the range of about 10 to about 60 mole percent.

25. The tri-block prepolymer of claim 24, wherein the repeating units of the third hydrophilic monomer are present in segment [B] in the range of about 20 to about 60 mole percent.

26. The tri-block prepolymer of claim 25, wherein the repeating units of the third hydrophilic monomer are present in segment [B] in the range of about 30 to about 50 mole percent.

27. The tri-block prepolymer of claim 1, wherein the silicone-containing macromer comprises a polymerizable functional group selected from the group consisting of (meth)acrylate, (meth)acrylamide, styryl, vinyl, N-vinyl lactam, N-vinylamides, O-vinylethers, O-vinylcarbonates, and O-vinylcarbomates.

28. The tri-block prepolymer of claim 1, wherein the silicone-containing macromer comprises a chemical structure shown in Formula I:

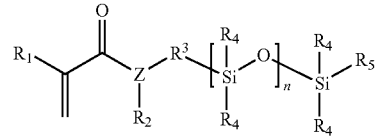

Formula I wherein Z is selected from O, N, S or $NCH_2CH_2O$; when Z=O or S, $R_2$ is not required; wherein $R_1$ is a hydrogen atom or methyl; wherein n is a whole number between 1 and 200; wherein $R_3$ is an alkylene segment $(CH_2)_y$, in which y is a whole number from 1 to 6, and each methylene group may be optionally further and independently substituted with a group selected from the group consisting of ethers, amines, esters, ketones, carbonyls, carboxylates, and carbamates, or when y is 2 or more a non-terminal methylene group is optionally replaced with a carbamate group; or wherein $R_3$ is an oxyalkylene segment $O(CH_2)_z$ in which z is a whole number from 1 to 3, or wherein $R_3$ is a mixture of alkylene and oxyalkylene segments and the sum of y and z is between 1 and 9; wherein $R_2$ and $R_4$ are independently a hydrogen atom, a linear, branched, or cyclic alkyl group containing between one and six carbon atoms, a linear, branched, or cyclic alkoxy group containing between one and six carbon atoms, a linear or branched polyethyelenoxyalkyl group, an alkyl-siloxanyl-alkyl group, a phenyl group, a benzyl group, a substituted or un-substituted aryl group, a fluoroalkyl group, a partially fluorinated alkyl group, a perfluoroalkyl group, a fluorine atom, a mono-, di, or tri-hydroxyalkyl group containing between one and six carbon atoms, or combinations thereof; and wherein $R_5$ is a substituted or un-substituted linear, branched, or cyclic alkyl group having 1 to 8 carbon atoms or an aryl group, any of which may be further substituted with one or more fluorine atoms or trimethylsiloxy groups.

29. The tri-block prepolymer of claim 28, wherein the silicone-containing macromer is selected from the group consisting of monoalkyl terminated, mono(meth)acrylate terminated poly(dialkylsiloxanes), monoalkyl terminated, monoalkyl terminated, mono(meth)acrylate terminated poly(diarylsiloxanes), monoalkyl terminated, mono(meth)acrylate terminated poly(alkylarylsiloxanes), and mixtures thereof.

30. The tri-block prepolymer of claim 29, wherein the silicone-containing macromer is mono-n-butyl terminated monomethacryloxypropyl terminated polydimethylsiloxane.

31. The tri-block prepolymer of claim 1, wherein the silicone-containing macromer comprises a chemical structure shown in Formula VIII:

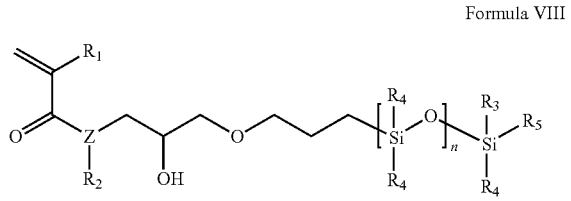

Formula VIII wherein Z is selected from O, N, S or NCH$_2$CH$_2$O; wherein R$_1$ is independently hydrogen atom or methyl group; wherein R$_2$, R$_3$, and R$_4$ are independently a hydrogen atom or a linear, branched, or cyclic alkyl group containing one to eight carbon atoms, any of which may be further substituted with at least one hydroxy group, and which may be optionally substituted with amido, ether, amino, carboxyl, carbonyl groups and combinations thereof; for Z=O and S, R$_2$ is not required; wherein n is the number of siloxane repeating units and is from 4 to 200; and wherein R$_5$ is selected from straight or branched C$_1$ to C$_8$ alkyl groups.

32. The tri-block prepolymer of claim 31, wherein the silicone-containing macromer is mono-n-butyl terminated mono-(2-hydroxy-3-methacryloxypropyl)-propyl ether terminated polydimethylsiloxane.

33. The tri-block prepolymer of claim 1, wherein the silicone-containing macromer is selected from the group consisting of mono-n-butyl terminated monomethacryloxypropyl terminated polydimethylsiloxane, mono-n-butyl terminated mono-(2-hydroxy-3-methacryloxypropyl)-propyl ether terminated polydimethylsiloxane, and mixtures thereof.

34. The tri-block prepolymer of claim 1, wherein the silicone-containing macromer has a number average molecular weight greater than 500 Daltons.

35. The tri-block prepolymer of claim 34, wherein the silicone-containing macromer has a number average molecular weight between about 500 Daltons and about 20,000 Daltons.

36. The tri-block prepolymer of claim 35, wherein the silicone-containing macromer has a number average molecular weight between about 500 Daltons and about 10,000 Daltons.

37. The tri-block prepolymer of claim 36, wherein the silicone-containing macromer has a number average molecular weight between about 500 Daltons and about 5,000 Daltons.

38. The tri-block prepolymer of claim 37, wherein the silicone-containing macromer has a number average molecular weight between about 500 Daltons and about 2,000 Daltons.

39. The tri-block prepolymer of claim 1, wherein the repeating units of the silicone-containing macromer are present in the range of about 30 and about 80 weight percent of the total weight of the tri-block prepolymer.

40. The tri-block prepolymer of claim 39, wherein the repeating units of the silicone-containing macromer are present in the range of about 30 and about 70 weight percent of the total weight of the tri-block prepolymer.

41. The tri-block prepolymer of claim 40, wherein the repeating units of the silicone-containing macromer are present in the range of about 40 and about 70 weight percent of the total weight of the tri-block prepolymer.

42. The tri-block prepolymer of claim 1, wherein segment [B] is a copolymer of the silicone-containing macromer and the third hydrophilic monomer, and the repeating units of the silicone-containing macromer are present in the range of about 75 and about 99 weight percent of the total weight of segment [B].

43. The tri-block prepolymer of claim 42, wherein the repeating units of the silicone-containing macromer are present in the range of about 85 and about 99 weight percent of the total weight of segment [B].

44. The tri-block prepolymer of claim 43, wherein the repeating units of the silicone-containing macromer are present in the range of about 90 and about 99 weight percent of the total weight of segment [B].

45. The tri-block prepolymer of claim 1, wherein segment [B] is a copolymer of the silicone-containing macromer and the third hydrophilic monomer, and the repeating units of the silicone-containing macromer are present in the range of about 30 and about 99 mole percent of segment [B].

46. The tri-block prepolymer of claim 45, wherein the repeating units of the silicone-containing macromer are present in the range of about 40 and about 75 mole percent of segment [B].

47. The tri-block prepolymer of claim 46, wherein the repeating units of the silicone-containing macromer are present in the range of about 55 and about 75 mole percent of segment [B].

48. The tri-block prepolymer of claim 1, wherein the silicone-containing monomer is selected from the group consisting of: 3-methacryloxypropyl tris(trimethylsiloxy)silane, 3-acryloxypropyl tris(trimethylsiloxy)silane, 3-methacrylamidopropyl tris(trimethylsiloxy)silane, 3-acrylamidopropyl tris(trimethylsiloxy)silane, tris(trimethylsiloxy) silyl styrene, 2-methyl-2-hydroxy-3-[3-[1,3,3,3-tetramethyl-1-[(trimethylsilyl)oxy]disiloxanyl]propoxy]propyl ester, N-(2,3-dihydroxylpropyl) N-(3-tetra(dimethylsiloxy)dimethylbutylsilane)propyl) acrylamide and mixtures thereof.

49. The tri-block prepolymer of claim 48, wherein the repeating units of the silicone-containing monomer are present in segment [B] in the range of about 1 to about 50 mole percent.

50. The tri-block prepolymer of claim 49, wherein the repeating units of the silicone-containing monomer are present in segment [B] in the range of about 1 to about 25 mole percent.

51. The tri-block prepolymer of claim 50, wherein the repeating units of the silicone-containing monomer are present in segment [B] in the range of about 1 to about 15 mole percent.

52. The tri-block prepolymer of claim 51, wherein the repeating units of the silicone-containing monomer are present in segment [B] in the range of about 1 to about 10 mole percent.

53. The tri-block prepolymer of claim 1, wherein the segments [A], [B], and [C] are all homopolymers.

54. The tri-block prepolymer of claim 53, wherein the segments [A] and [C] are the same homopolymer.

55. The tri-block prepolymer of claim 1, wherein the segments [A], [B], and [C] are all copolymers.

56. The tri-block prepolymer of claim 1, wherein the segments [A], [B], and [C] are independently selected from the group consisting of homopolymers, copolymers, and terpolymers.

57. The tri-block prepolymer of claim 1, wherein the segments [A] and [C] are homopolymers and segment [B] is a copolymer.

58. The tri-block prepolymer of claim 57, wherein the segments [A] and [C] are the same homopolymer.

59. The tri-block prepolymer of claim 1, wherein the segments [A] and [C] are homopolymers of a hydroxyalkyl (meth)acrylate and segment [B] is selected from the group consisting of a homopolymer of mono-alkyl terminated monomethacryloxypropyl terminated polydimethylsiloxane, a homopolymer of mono-alkyl terminated mono-(2-hydroxy-3-methacryloxypropyl)-propyl ether terminated polydimethylsiloxane, a copolymer comprising repeating units derived from a mono-alkyl terminated monomethacryloxypropyl terminated polydimethylsiloxane and a hydroxyalkyl (meth)acrylate, and a copolymer comprising repeating units derived from a mono-alkyl terminated mono-(2-hydroxy-3-methacryloxypropyl)-propyl ether terminated polydimethylsiloxane and a hydroxyalkyl (meth)acrylate.

60. The tri-block prepolymer of claim 59, wherein segments [A] and [C] are homopolymers of a 2-hydroxyethyl (meth)acrylate and the [B] segment is a copolymer comprising repeating units derived from mono-n-butyl terminated monomethacryloxypropyl terminated polydimethylsiloxane and the 2-hydroxyethyl (meth)acrylate.

61. The tri-block prepolymer of claim 59, wherein segments [A] and [C] are homopolymers of a 2-hydroxyethyl (meth)acrylate and the [B] segment is a copolymer comprising repeating units derived from mono-n-butyl terminated mono-(2-hydroxy-3-methacryloxypropyl)-propyl ether terminated polydimethylsiloxane and the 2-hydroxyethyl (meth)acrylate.

62. The tri-block prepolymer of claim 1, which is effective to compatibilize components of a reactive monomer mixture for making ophthalmic devices.

63. The tri-block prepolymer of claim 1, which upon exposure to cross-linking conditions forms a silicone hydrogel that is effective to form an ophthalmic device.

64. The tri-block prepolymer of claim 3, wherein the one or more monovalent reactive pendant groups comprise pendant (meth)acrylate groups which are residues of an acylating agent comprising (meth)acryloyl chloride, (meth)acrylic anhydride, 2-isocyanatoethyl (meth)acrylate, 3-isopropenyl-α α-dimethylbenzyl isocyanate, and mixtures thereof.

65. The tri-block prepolymer of claim 64, wherein the acylating agent is methacryloyl chloride.

66. A silicone hydrogel formed from a reactive monomer mixture comprising:
 (a) the tri-block prepolymer according to claim 1;
 (b) at least one other fourth hydrophilic monomer independent of the hydrophilic monomers of segments [A], [B] and [C]; and
 (c) at least one silicone-containing component independent of the tri-block prepolymer and the optional silicone-containing monomer of [B].

67. The silicone hydrogel of claim 66, wherein the fourth hydrophilic monomer comprises acrylic acid, methacrylic acid, N,N-dimethylacrylamide, N-vinylpyrrolidone, N-vinyl acetamide, N-vinyl-N-methyl acetamide, polyethyleneglycol monomethacrylate, 2-hydroxyethyl (meth)acrylate, 2-hydroxypropyl (meth)acrylate, 3-hydroxypropyl (meth) acrylate, 2,3-dihydroxypropyl (meth)acrylate, 2-hydroxybutyl (meth)acrylate, 3-hydroxybutyl (meth)acrylate, 4-hydroxybutyl (meth)acrylate, N-(2-hydroxyethyl) (meth) acrylamide, N,N-bis(2-hydroxyethyl) (meth)acrylamide, N-(2-hydroxypropyl) (meth)acrylamide, N,N-bis(2-hydroxypropyl) (meth)acrylamide, N-(3-hydroxypropyl) (meth)acrylamide, N-(2-hydroxybutyl) (meth)acrylamide, N-(3-hydroxybutyl) (meth)acrylamide, N-(4-hydroxybutyl) (meth)acrylamide, or mixtures thereof.

68. The silicone hydrogel of claim 66, wherein the fourth hydrophilic monomer comprises one or more alkylamine monomers selected from the group consisting of 2-aminoethyl (meth)acrylate, 3-aminopropyl (meth)acrylate, 2-aminopropyl (meth)acrylate, N-2-aminoethyl (meth)acrylamides), N-3-aminopropyl (meth)acrylamide, N-2-aminopropyl (meth)acrylamide, N,N-bis-2-aminoethyl (meth) acrylamides, N,N-bis-3-aminopropyl (meth)acrylamide), N,N-bis-2-aminopropyl (meth)acrylamide, and mixtures thereof.

69. The silicone hydrogel of claim 66, wherein the at least one silicone-containing component is selected from the group consisting of: mono-n-butyl terminated monomethacryloxypropyl terminated polydimethylsiloxane (mPDMS), mono-n-butyl terminated mono-(2-hydroxy-3-methacryloxypropyl)-propyl ether terminated polydimethylsiloxane (HO-mPDMS), 2-hydroxy-3-[3-methyl-3,3-di(trimethylsiloxy)silylpropoxy]-propyl methacrylate (SiMAA), N-(2,3-dihydroxylpropyl) N-(3-tetra(dimethylsiloxy)dimethylbutylsilane)propyl) acrylamide (SA2), 3-methacryloxypropyl tris(trimethylsiloxy)silane, 3-acryloxypropyl tris(trimethylsiloxy)silane, 3-methacrylamidopropyl tri(trimethylsiloxy)silane, 3-acrylamidopropyl tri(trimethylsiloxy)silane, tris(trimethylsiloxy)silyl styrene, and mixtures thereof.

70. The silicone hydrogel of claim 66 comprising an oxygen permeability (Dk) is at least 80 barrers.

71. The silicone hydrogel of claim 70, wherein the oxygen permeability (Dk) is at least 85 barrers.

72. The silicone hydrogel of claim 66, wherein the reactive monomer mixture comprises by weight percent of components of the reactive monomer mixture, excluding any diluents:
 (a) the tri-block prepolymer in an amount in the range of about 1% to about 99%;
 (b) the at least one other fourth hydrophilic monomer in an amount in the range of about 0.1% to about 80%; and
 (c) the at least one silicone-containing component in an amount in the range of about 0.1% to about 60%.

73. The silicone hydrogel of claim 72, wherein the reactive monomer mixture comprises by weight percent of the components of the reactive monomer mixture, excluding any diluents:
 (a) the tri-block prepolymer in an amount in the range of about 5% to about 40%;
 (b) the at least one other fourth hydrophilic monomer in an amount in the range of about 5% to about 65%;
 (c) the at least one silicone-containing component in an amount in the range of about 10% to about 50%.

74. The silicone hydrogel of claim 73, wherein the reactive monomer mixture comprises by weight percent of the components of the reactive monomer mixture, excluding any diluents:
 (a) the tri-block prepolymer in an amount in the range of about 10% to about 30%;
 (b) the at least one other fourth hydrophilic monomer in an amount in the range of about 10% to about 45%;
 (c) the at least one silicone-containing component in an amount in the range of about 10% to about 40%.

75. A silicone hydrogel formed from a reactive monomer mixture comprising:
(a) a tri-block prepolymer of the formula [A]-[B]-[C], wherein [A] and [C] are homopolymeric segments based on a hydroxyalkyl (meth)acrylate, and [B] is a copolymeric segment based on repeating units of the hydroxyalkyl (meth)acrylate and mono-n-butyl terminated monomethacryloxypropyl terminated polydimethylsiloxanes, having a number average molecular weight in the range of about 500 Da to about 1500 Da, wherein said tri-block prepolymer comprises at least one polymerizable group selected from the group consisting of (meth)acrylate, (meth)acrylamide, styryl, vinyl, N-vinyl lactam, N-vinylamides, 0-vinylethers, 0-vinylcarbonates, and 0-vinylcarbomates and mixtures thereof, and wherein the tri-block prepolymer is formed using an organotellurium mediated living radical polymerization (TERP) mediator;
(b) at least one other fourth hydrophilic monomer;
(c) at least one at least one silicone-containing component;
(d) at least one charged monomer;
(e) at least one polyamide;
(f) at least one crosslinking agent;
(g) at least one photoinitiator; and
(h) one or more of the following: a UV absorber, a visible light absorber, a photochromic compound, a pharmaceutical, a nutraceutical, an antimicrobial substance, a tint, a pigment, a copolymerizable dye, a nonpolymerizable dye, a release agent, and combinations thereof.

76. The silicone hydrogel of claim 75, wherein the polyamide is selected from the group consisting of poly(N-vinyl pyrrolidone), poly(N,N-dimethyl acrylamide), poly(N-vinyl N-methyl acetamide), and mixtures thereof.

77. The silicone hydrogel of claim 75, wherein the polyamide is copolymer comprising two or more monomers selected from the group consisting of N-vinyl pyrrolidone (NVP), N,N-dimethyl acrylamide (DMA), N-vinyl N-methyl acetamide (VMA), and N-vinyl acetamide (NVA).

78. The silicone hydrogel of claim 75, wherein the other fourth hydrophilic monomer is selected from the group consisting of: N,N-dimethylacrylamide, N-vinylpyrrolidone, N-vinyl acetamide, N-vinyl-N-methyl acetamide, polyethyleneglycol monomethacrylate, 2-hydroxyethyl (meth)acrylate, 2-hydroxypropyl (meth)acrylate, 3-hydroxypropyl (meth)acrylate, 2,3-dihydroxypropyl (meth)acrylate, 2-hydroxybutyl (meth)acrylate, 3-hydroxybutyl (meth)acrylate, 4-hydroxybutyl (meth)acrylate, N-(2-hydroxyethyl) (meth)acrylamide, N,N-bis(2-hydroxyethyl) (meth)acrylamide, N-(2-hydroxypropyl) (meth)acrylamide, N,N-bis(2-hydroxypropyl) (meth)acrylamide, N-(3-hydroxypropyl) (meth)acrylamide, N-(2-hydroxybutyl) (meth)acrylamide, N-(3-hydroxybutyl) (meth)acrylamide, N-(4-hydroxybutyl) (meth)acrylamide, and mixtures thereof.

79. The silicone hydrogel of claim 75, wherein the silicone-containing component is selected from the group consisting of mono-n-butyl terminated monomethacryloxypropyl terminated polydimethylsiloxane (mPDMS), mono-n-butyl terminated mono-(2-hydroxy-3-methacryloxypropyl)-propyl ether terminated polydimethylsiloxane (HO-mPDMS), 2-hydroxy-3-[3-methyl-3,3-di(trimethylsiloxy)silylpropoxy]-propyl methacrylate (SiMAA), N-(2,3-dihydroxylpropyl) N-(3-tetra(dimethylsiloxy)dimethylbutylsilane)propyl) acrylamide (SA2), 3-methacryloxypropyl tris(trimethylsiloxy)silane, 3-acryloxypropyl tris(trimethylsiloxy)silane, 3-methacrylamidopropyl tri(trimethylsiloxy)silane, 3-acrylamidopropyl tri (trimethylsiloxy)silane, and mixtures thereof.

80. The silicone hydrogel of claim 75, wherein the charged monomer is selected from the group consisting of acrylic acid, methacrylic acid, N-[(ethenyloxy)carbonyl]-β-alanine, 3-acrylamidopropanoic acid, 5-acrylamidopropanoic acid, 2-(methacryloyloxy)ethyl trimethylammonium chloride, 2-acrylamido-2-methylpropane sulfonic acid, 1-propanaminium, N-(2-carboxyethyl)-N,N-dimethyl-3-[(1-oxo-2-propen-1-yl)amino]-, inner salt; carboxybetaine, 1-propanaminium, N,N-dimethyl-N-[3-[(1-oxo-2-propen-1-yl)amino]propyl]-3-sulfo-, inner salt; 3,5-dioxa-8-aza-4-phosphaundec-10-en-1-aminium, 4-hydroxy-N,N,N-trimethyl-9-oxo-, inner salt, 4-oxide (9CI), [2-methacryloyloxy)ethyl]trimethylammonium chloride, and mixtures thereof.

81. A contact lens comprising the silicone hydrogel according to claim 66.

82. The contact lens of claim 81 comprising a lysozyme uptake of greater than 100 μg/lens.

83. The contact lens of claim 81 comprising a lipid uptake of less than 15%; or even less than 10%.

84. The contact lens of claim 81 comprising an advancing contact angle of less than 100 degrees; or less than 80 degrees; or less than 60 degrees.

85. A method of making a silicone hydrogel comprising:
(a) obtaining a tri-block prepolymer according to claim 1;
(b) preparing a reactive monomer mixture from the tri-block prepolymer and optionally with other components;
(c) introducing the reactive monomer mixture onto a first mold;
(d) placing a second mold on top the first mold filled with the reactive monomer mixture; and
(e) curing the reactive monomer mixture by free radical copolymerization to form the silicone hydrogel in the shape of a contact lens.

86. The method of claim 85, wherein the tri-block prepolymer is formed using an organotellurium mediated living radical polymerization (TERP) mediator.

* * * * *